(12) United States Patent
Xue et al.

(10) Patent No.: US 12,348,316 B2
(45) Date of Patent: Jul. 1, 2025

(54) SEMI-PERSISTENT SCHEDULING OPPORTUNITIES FOR JITTERED PERIODIC TRAFFIC

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US); Ozcan Ozturk, San Diego, CA (US); Tao Luo, San Diego, CA (US); Juan Montojo, San Diego, CA (US); Peter Gaal, San Diego, CA (US); Mostafa Khoshnevisan, San Diego, CA (US); Piyush Gupta, Bridgewater, NJ (US); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 17/904,784

(22) PCT Filed: Apr. 30, 2021

(86) PCT No.: PCT/CN2021/091455
§ 371 (c)(1),
(2) Date: Aug. 22, 2022

(87) PCT Pub. No.: WO2021/219129
PCT Pub. Date: Nov. 4, 2021

(65) Prior Publication Data
US 2022/0416955 A1 Dec. 29, 2022

(30) Foreign Application Priority Data

May 1, 2020 (WO) ................ PCT/CN2020/088538
May 6, 2020 (WO) ................ PCT/CN2020/088659

(51) Int. Cl.
*H04L 1/18* (2023.01)
*H04L 1/1822* (2023.01)
(Continued)

(52) U.S. Cl.
CPC .......... *H04L 1/1854* (2013.01); *H04L 1/1822* (2013.01); *H04L 1/1887* (2013.01); *H04W 72/20* (2023.01); *H04W 72/52* (2023.01)

(58) Field of Classification Search
CPC ... H04W 28/04; H04W 72/04; H04W 72/042; H04W 88/08; H04W 72/20; H04W 72/52;
(Continued)

(56) References Cited

U.S. PATENT DOCUMENTS

| 8,595,579 | B2 * | 11/2013 | Yang | ................ H04L 1/1822 370/252 |
| 11,646,832 | B2 * | 5/2023 | Rastegardoost | .. H04W 74/0816 370/329 |

(Continued)

FOREIGN PATENT DOCUMENTS

| CN | 103875201 A | * | 6/2014 | .......... H04L 1/0026 |
| CN | 109565676 A | | 4/2019 | |

(Continued)

OTHER PUBLICATIONS

3GPP TSG-RAN WG2 Meeting #108, Reno, USA, Nov. 18-Nov. 22, 2019, R2-1914403, Agenda Item: 6.2.2.5, Source: OPPO, Title: Remaining issues on NR-U configured grant. (Year: 2019).*

(Continued)

*Primary Examiner* — Peter G Solinsky
*Assistant Examiner* — Sanjay K Dewan
(74) *Attorney, Agent, or Firm* — Arent Fox, LLP

(57) ABSTRACT

A method, a computer-readable medium, and an apparatus are provided for wireless communication at a user equipment (UE) and a base station. The UE receives a configu-
(Continued)

ration for a plurality of semi-persistent scheduling (SPS) occasions each SPS occasion including multiple opportunities for a downlink transmission by a base station. The UE monitors for the downlink transmission during one or more opportunities of an SPS occasion. The base station transmits a packet to the UE in an opportunity of an SPS occasion based on an arrival time of the packet. In various configurations, a base station may transmit first information via a first communication opportunity and second information via a second communication opportunity of that same SPS occasion. A wireless communication device may monitor all communication opportunities of an SPS occasion to decode the information sent in two or more of the communication opportunities of the SPS occasion.

26 Claims, 33 Drawing Sheets

(51) Int. Cl.
*H04L 1/1829* (2023.01)
*H04L 1/1867* (2023.01)
*H04W 72/12* (2023.01)
*H04W 72/20* (2023.01)
*H04W 72/52* (2023.01)

(58) Field of Classification Search
CPC .......... H04W 72/1252; H04W 71/1278; H04L 5/0007; H04L 1/1854; H04L 1/1822; H04L 1/1887
USPC .......................................................... 370/329
See application file for complete search history.

(56) References Cited

U.S. PATENT DOCUMENTS

| | | | | |
|---|---|---|---|---|
| 2015/0139155 A1* | 5/2015 | Wang | ................... | H04W 72/23 370/329 |
| 2019/0132092 A1* | 5/2019 | Chen | ................... | H04L 1/1887 |
| 2019/0191416 A1* | 6/2019 | Xie | ................... | H04W 72/04 |
| 2019/0268971 A1* | 8/2019 | Talarico | ................. | H04W 76/27 |
| 2019/0281606 A1* | 9/2019 | Liu | ................... | H04W 72/542 |
| 2019/0356455 A1* | 11/2019 | Yang | ................... | H04L 1/1812 |
| 2022/0191900 A1* | 6/2022 | Takeda | ............... | H04W 72/1268 |
| 2023/0112147 A1* | 4/2023 | Chien | ................... | H04L 1/1861 370/329 |
| 2023/0135551 A1* | 5/2023 | Gao | ................... | H04L 1/1812 370/329 |
| 2023/0164764 A1* | 5/2023 | Chen | ................... | H04L 1/1854 370/329 |
| 2023/0239077 A1* | 7/2023 | Gerami | ............. | H04W 72/1273 370/329 |

FOREIGN PATENT DOCUMENTS

| | | | | |
|---|---|---|---|---|
| EP | 3 780 717 A1 * | 2/2021 | ............ | H04W 28/04 |
| WO | WO 2019/112186 A1 * | 6/2019 | ............ | H04W 72/04 |
| WO | 2019193700 A1 | 10/2019 | | |
| WO | WO 2019/243249 A1 * | 12/2019 | ............ | H04W 72/04 |
| WO | 2020188815 A1 | 9/2020 | | |
| WO | 2022006580 A1 | 1/2022 | | |

OTHER PUBLICATIONS

3GPP TSG-RAN WG2 #106, Reno, US, May 13-17, 2019, Tdoc R2-1906838, Agenda Item: 11.7.2.2, Source: Ericsson, Title: On configuration aspects for multiple SPS and CG. (Year: 2019).*
Supplementary Partial European Search Report—EP21797402—Search Authority—The Hague—Apr. 9, 2024.
Ericsson: "On Configuration Aspects for Multiple SPS and CG", 3GPP TSG-RAN WG2 #106 Tdoc, R2-1906838, May 17, 2019 (May 17, 2019), 4 Pages, section 2.1.
International Search Report and Written Opinion—PCT/CN2020/088538—ISA/EPO—Feb. 3, 2021.
International Search Report and Written Opinion—PCT/CN2021/091455—ISA/EPO—Aug. 2, 2021.
OPPO: "Remaining Issues on NR-U Configured Grant", 3GPP TSG-RAN WG2 Meeting #108, R2-1914403, Nov. 22, 2019 (Nov. 22, 2019), 7 Pages, section 2.1.
Supplementary European Search Report—EP21797402—Search Authority—The Hague—Jul. 25, 2024.

* cited by examiner

SEMI-PERSISTENT SCHEDULING OPPORTUNITIES FOR JITTERED PERIODIC TRAFFIC

CROSS-REFERENCE TO RELATED APPLICATIONS

This application is a National Phase entry of PCT Application No. PCT/CN2021/091455, entitled "SEMI-PERSISTENT SCHEDULING OPPORTUNITIES FOR JITTERED PERIODIC TRAFFIC" and filed on Apr. 30, 2021, which claims priority to PCT Application No. PCT/CN2020/088538, entitled "SEMI-PERSISTENT SCHEDULING OPPORTUNITIES FOR JITTERED PERIODIC TRAFFIC" and filed on May 1, 2020, and PCT Application No. PCT/CN2020/088659, entitled "MULTIPLE COMMUNICATION OPPORTUNITIES FOR SEMI-PERSISTENT SCHEDULING OCCASION" and filed on May 6, 2020, the disclosures of which are expressly incorporated by reference herein in their entirety.

BACKGROUND

Technical Field

The present disclosure relates generally to communication systems, and more particularly, to wireless communication including semi-persistent scheduling (SPS).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives a configuration for a plurality of semi-persistent scheduling (SPS) occasions each SPS occasion including multiple opportunities for a downlink transmission by a base station. The apparatus monitors for the downlink transmission during one or more opportunities of an SPS occasion.

In another aspect of the disclosure, a method, a computer-readable medium, and an apparatus are provided for wireless communication at a base station. The apparatus configures a UE for a plurality of SPS occasions, each SPS occasion including multiple opportunities for downlink transmission by the base station. The apparatus transmits a packet to the UE in an opportunity of an SPS occasion based on an arrival time of the packet.

Various aspects of the disclosure relate to communicating information via a plurality of communication opportunities of a semi-persistent scheduling (SPS) occasion. For example, a base station may transmit first information via a first communication opportunity of an SPS occasion and transmit second information via a second communication opportunity of that same SPS occasion. In addition, a wireless communication device may monitor all communication opportunities of an SPS occasion to decode the information sent in two or more of the communication opportunities of the SPS occasion.

In another aspect of the disclosure, a method of wireless communication at a wireless communication device may include receiving a message from a base station. The message may indicate a periodicity between semi-persistent scheduling (SPS) occasions for a configured SPS. The method may also include receiving, from the base station, a transmission for a first SPS occasion of the SPS occasions. The first SPS occasion may include a plurality of communication opportunities. The method may further include decoding downlink information included in at least two of the plurality of communication opportunities.

In another aspect of the disclosure, a wireless communication device may include a transceiver, a memory, and a processor communicatively coupled to the transceiver and the memory. The processor and the memory may be configured to receive a message from a base station via the transceiver. The message may indicate a periodicity between semi-persistent scheduling (SPS) occasions for a configured SPS. The processor and the memory may also be configured to receive, from the base station via the transceiver, a transmission for a first SPS occasion of the SPS occasions. The first SPS occasion may include a plurality of communication opportunities. The processor and the memory may be further configured to decode downlink information included in at least two of the plurality of communication opportunities.

In another aspect of the disclosure, a wireless communication device may include means for receiving a message from a base station. The message may indicate a periodicity between semi-persistent scheduling (SPS) occasions for a configured SPS. The means for receiving may be configured for receiving a transmission for a first SPS occasion of the SPS occasions. The first SPS occasion may include a plurality of communication opportunities. The wireless communication device may also include means for decoding downlink information included in at least two of the plurality of communication opportunities.

In another aspect of the disclosure, an article of manufacture for use by a wireless communication device includes a computer-readable medium having stored therein instructions executable by one or more processors of the wireless communication device to receive a message from a base station. The message may indicate a periodicity between semi-persistent scheduling (SPS) occasions for a configured SPS. The computer-readable medium may also have stored therein instructions executable by one or more processors of the wireless communication device to receive, from the base station, a transmission for a first SPS occasion of the SPS occasions. The first SPS occasion may include a plurality of communication opportunities. The computer-readable medium may have stored therein further instructions executable by one or more processors of the wireless communication device to decode downlink information included in at least two of the plurality of communication opportunities.

In another aspect of the disclosure, a method of wireless communication at a base station may include generating a message indicating a periodicity between semi-persistent scheduling (SPS) occasions for a configured SPS, transmitting the message to a wireless communication device, and transmitting, to the wireless communication device, a transmission for a first SPS occasion of the SPS occasions. The first SPS occasion may include a plurality of communication opportunities. At least two of the plurality of communication opportunities may include downlink information.

In another aspect of the disclosure, a base station may include a transceiver, a memory, and a processor communicatively coupled to the transceiver and the memory. The processor and the memory may be configured to generate a message indicating a periodicity between semi-persistent scheduling (SPS) occasions for a configured SPS, transmit the message to a wireless communication device via the transceiver, and transmit, to the wireless communication device via the transceiver, a transmission for a first SPS occasion of the SPS occasions. The first SPS occasion may include a plurality of communication opportunities. At least two of the plurality of communication opportunities may include downlink information.

In another aspect of the disclosure, a base station may include means for generating a message indicating a periodicity between semi-persistent scheduling (SPS) occasions for a configured SPS and means for transmitting the message to a wireless communication device. The means for transmitting may be configured for transmitting a transmission for a first SPS occasion of the SPS occasions. The first SPS occasion may include a plurality of communication opportunities. At least two of the plurality of communication opportunities may include downlink information.

In another aspect of the disclosure, an article of manufacture for use by a base station includes a computer-readable medium having stored therein instructions executable by one or more processors of the base station to generate a message indicating a periodicity between semi-persistent scheduling (SPS) occasions for a configured SPS, transmit the message to a wireless communication device, and transmit, to the wireless communication device, a transmission for a first SPS occasion of the SPS occasions. The first SPS occasion may include a plurality of communication opportunities. At least two of the plurality of communication opportunities may include downlink information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
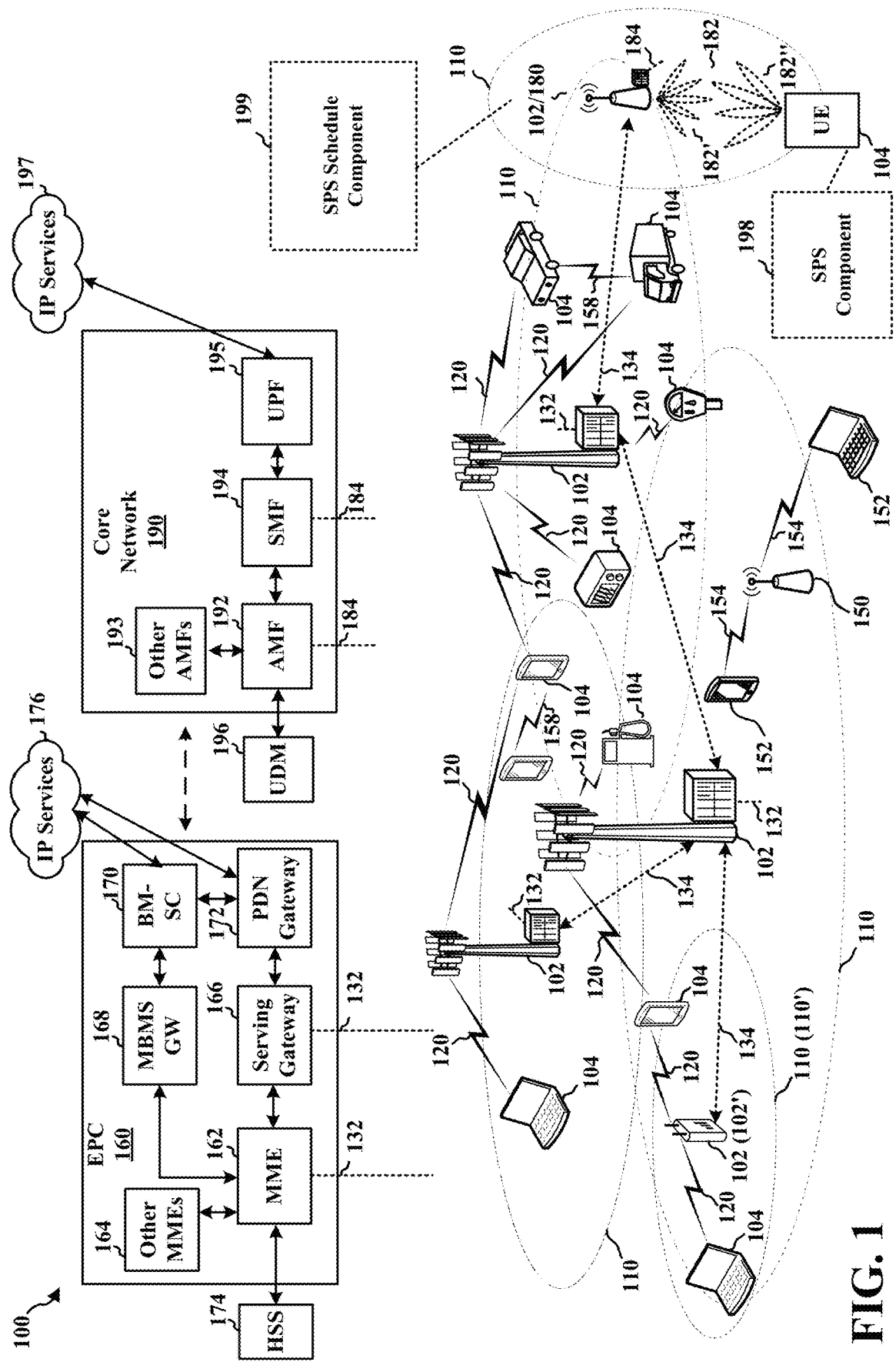
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. The description that follows provides illustrative examples, without limitation, of various aspects of the present disclosure.

FIG. 1 is a diagram illustrating an example of a wireless communications system and an access network 100. Downlink packets may arrive at a base station 102 or 180 in a periodic manner, and SPS resources may be provided for the transmission of the downlink packets to a UE 104. In some examples, the downlink traffic may have a jittered arrival. Aspects presented herein provide SPS resources that enable the periodic transmission of downlink packets that may experience a jittered arrival at a base station 102 or 180 for transmission to the UE 104. The aspects presented herein may enable low latency downlink traffic to be communicated to the UE 104 in a manner that balances the latency of the communication with efficient scheduling of resources and reducing processing complexity for the UE. As presented in more detail in connection with FIGS. 7-17, the base station 102 or 180 may include an SPS schedule component 199 that configures a UE 104 for monitoring a plurality of SPS occasions, each SPS occasion including multiple opportunities for downlink transmission by the base station 102 or 180. Then, the base station 102 or 180 may transmit a packet to the UE 104 in an opportunity of an SPS occasion based on an arrival time of the packet. The UE 104 may include an SPS component 198 that receives the configuration for the plurality of SPS occasions from the base station 102 or 180, each SPS occasion including multiple opportunities for a downlink transmission by the base station 102 or 180. Then, the UE 104 may monitor for the downlink transmission during one or more opportunity of the SPS occasion, e.g., until an opportunity in which the UE receives the downlink packet(s). Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNB s), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions.

The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2A:
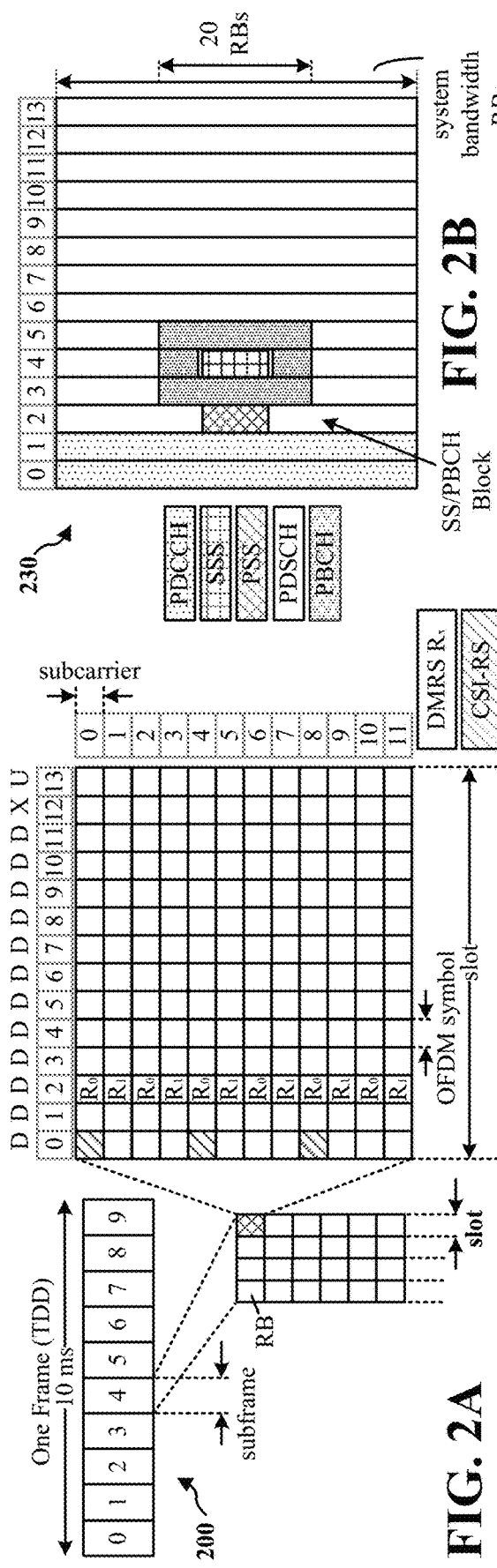
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
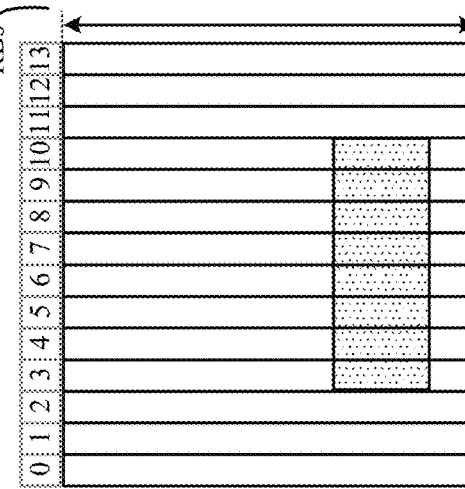
Figure 2C:
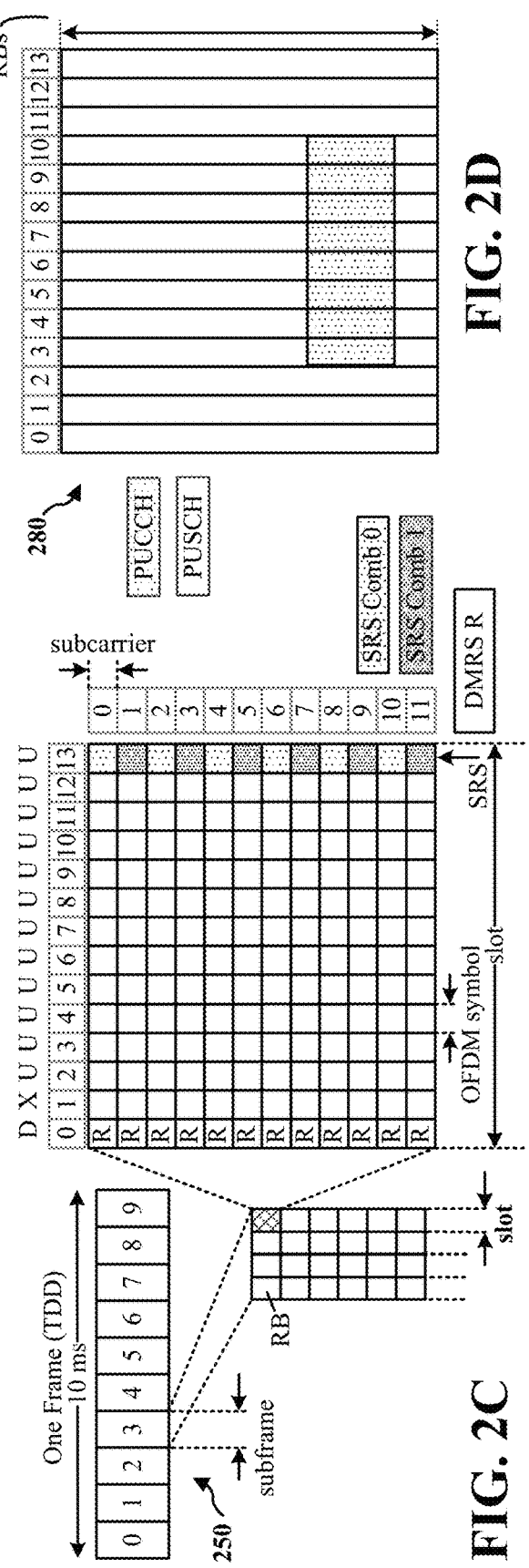
Figure 2D:
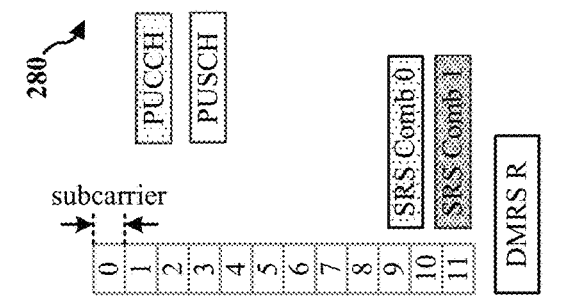

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
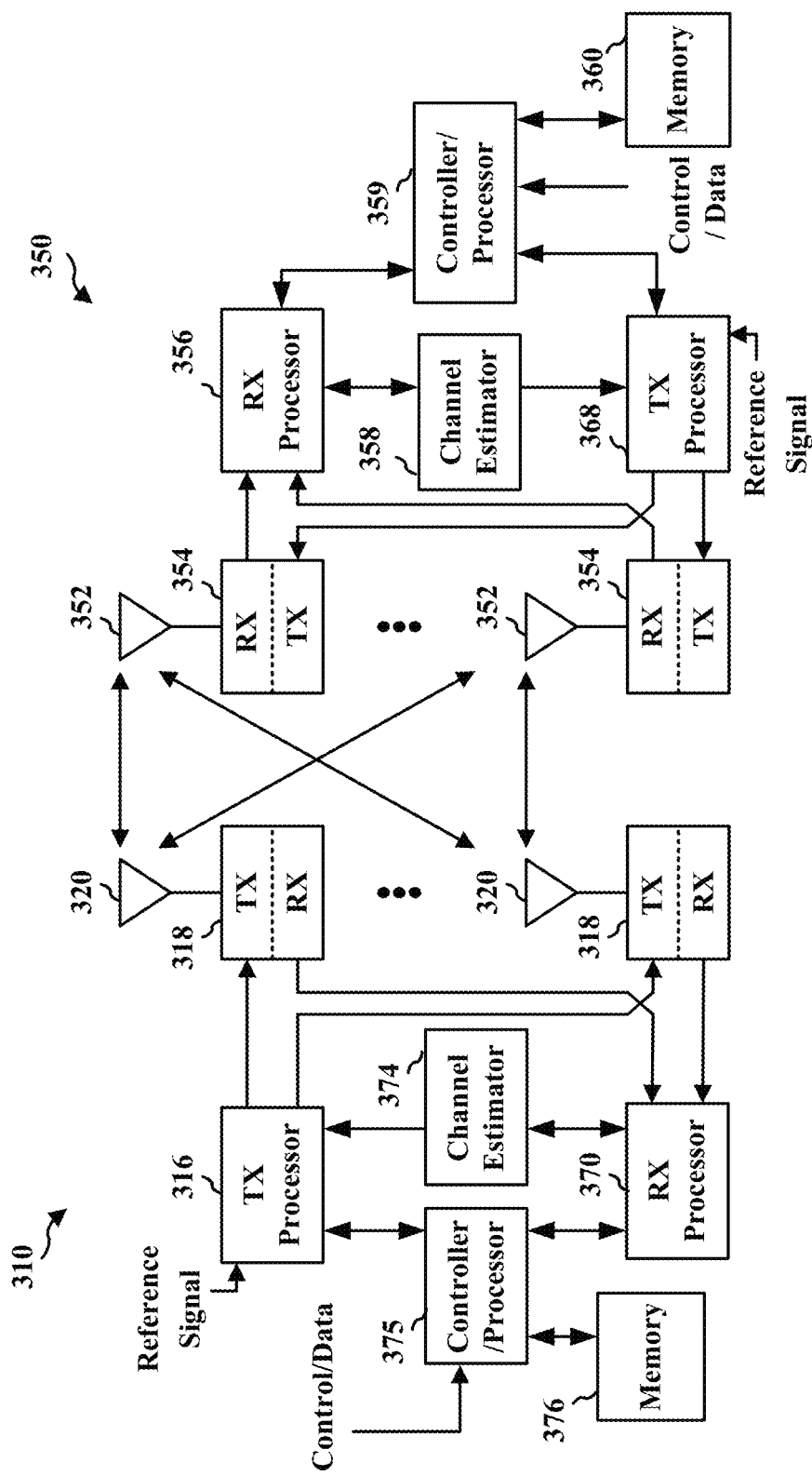
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
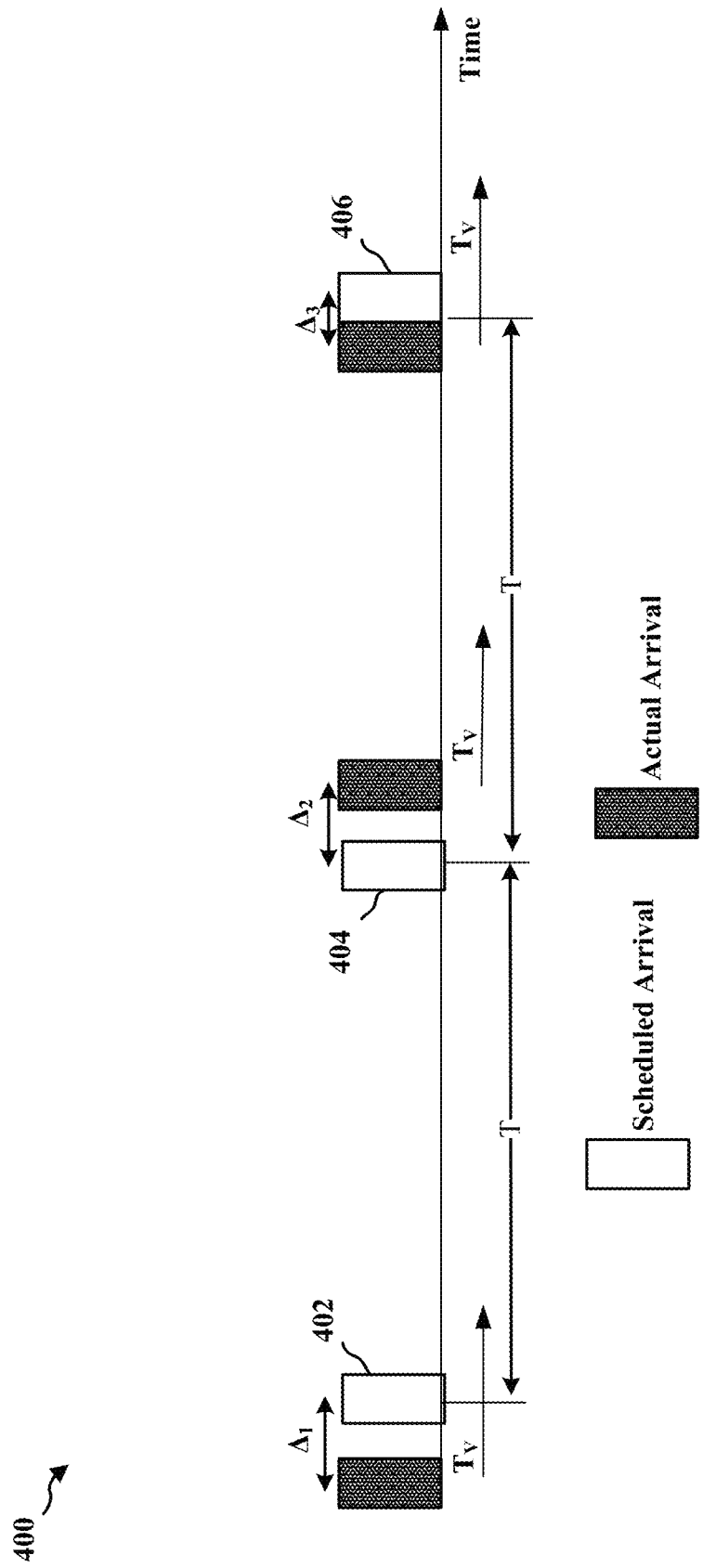
FIG. 4 illustrates example aspects of jittered period traffic.

Downlink packets may arrive at a base station (e.g., the base station 102 or 180) in a periodic manner. The base station may allocate SPS resources for the transmission of the downlink packets to a UE (e.g., the UE 104). However, in some examples, the downlink traffic may have a jittered arrival. FIG. 4 illustrates an example timeline 400 showing the scheduled arrival times 402, 404, and 406 of periodic downlink packets. The arrival time may correspond to a time at which a base station expects to receive the downlink packets for transmission to the UE. For example, the pattern in FIG. 4 illustrates packets having a nominal arrival time of every T seconds. However, the actual arrival time of the downlink packet may vary, e.g., may arrive at a non-deterministic instant. For example, the packets may have a jittered arrival with respect to the scheduled arrival pattern. The packet may comprise a small size packet, e.g., of less than 50 bytes, e.g., a 40 byte or smaller packet. FIG. 4 illustrates the actual arrival of the first packet at the first scheduled arrival time 402 being $\Delta_1$ prior to the scheduled arrival time 402. The second packet arrives $\Delta_2$ following the scheduled arrival time 404. The third packet arrives $\Delta_3$ following the scheduled arrival time 406. In some examples, the actual arrival time may be within a random amount of time $\Delta_i$ around (e.g., before or after) the ith epoch. $|\Delta_i|$ may be smaller than the period T, for example. $|\Delta_i| \ll T$. However, $|\Delta_i|$ may be larger than the over the air (OTA) transmission time for the packet. As noted above, the packet may have a small packet size. The packets may be associated with a low latency, e.g., for correct delivery within an interval $T_v$ that may be smaller than the period T, e.g., $T_v < T$. As an example, the communication may include industrial IoT (IIoT) that includes periodic, low-latency downlink traffic.

The characteristics and periodicity of the downlink packets may be scheduled in an efficient manner based on SPS resources. The efficient scheduling of the transmissions may be helpful, e.g., to a base station that supports a massive number of UEs and may provide periodic downlink packets to the UEs. However, the jittered arrival of the downlink packets presents a challenge to the base station in scheduling the downlink transmission using SPS resources. While the base station may schedule the downlink transmissions using dynamic grants, the dynamic grants involve a significant amount of added signaling between the base station and the UEs. The added overhead may become especially difficult for a base station supporting a number of such UEs.

Figure 5:
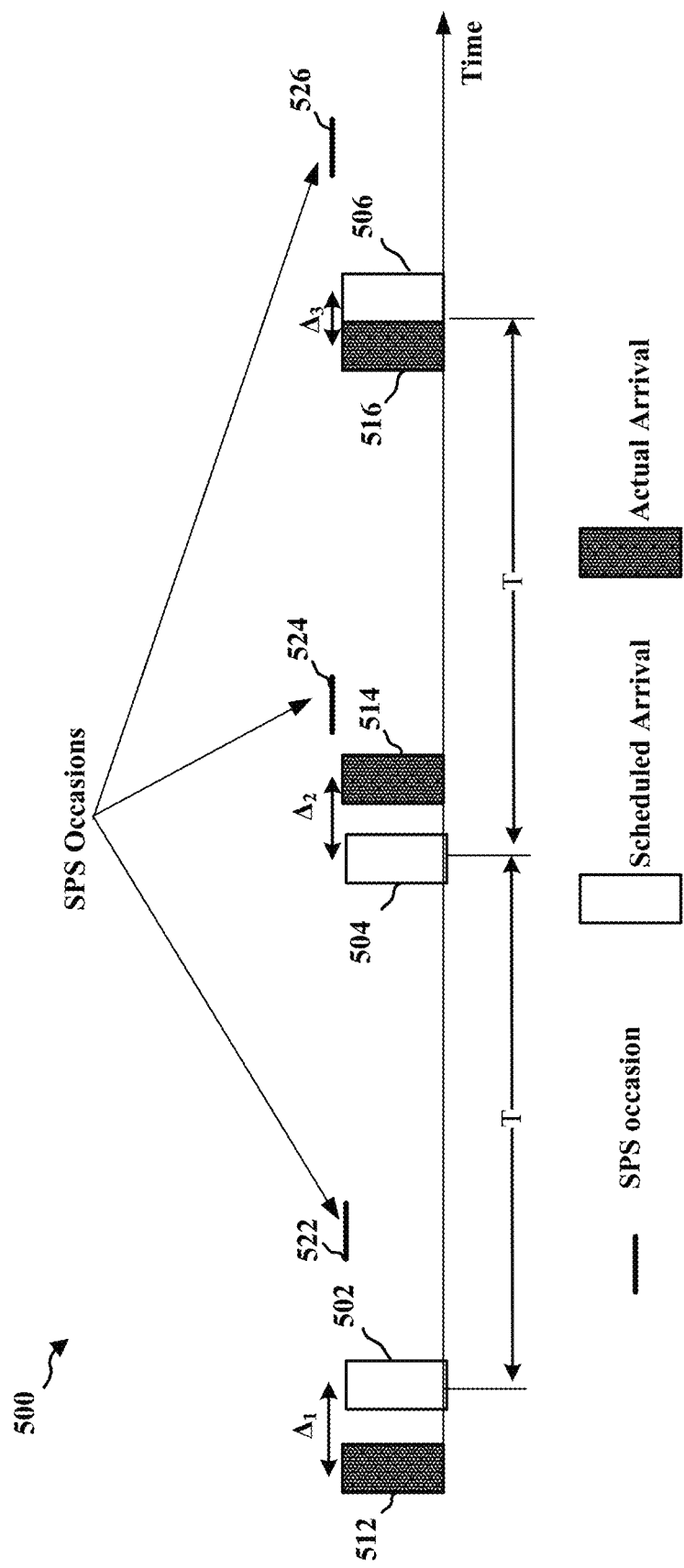
FIG. 5 illustrates an example of SPS occasions for jittered periodic traffic.

FIG. 5 illustrates an example timeline 500 showing the scheduled arrival times 502, 504, and 506 of periodic downlink packets and the jittered actual arrival times 512, 514, and 516 that is similar to the jittered arrival of packets in FIG. 4. In FIG. 5, the base station configures the SPS downlink occasion to be later than the possible $\Delta_i$ so that the traffic arrival is before the SPS occasions 522, 524, 526. In this way, the base station will be able to use the SPS downlink resource allocated for transmission of the periodic packets, e.g., without wasting an SPS resources that occurs before the packet arrives or without resorting to a dynamic grant. However, the SPS occasions add delay to the packet by waiting until after the latest time at which the packet may arrive even if the downlink packet arrives earlier.

Figure 6:
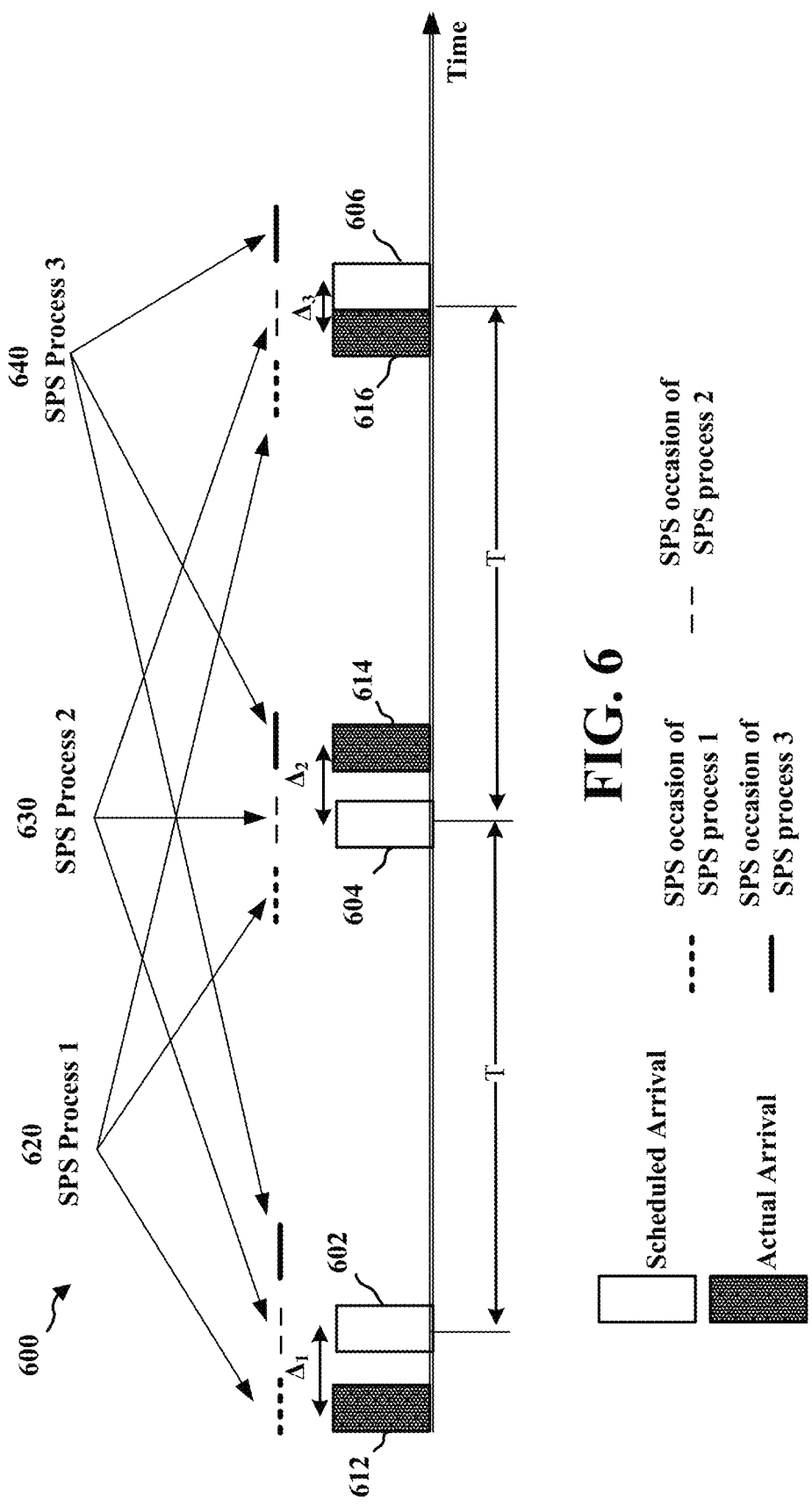
FIG. 6 illustrates SPS occasions for multiple hybrid automatic repeat request (HARQ) processes for jittered periodic traffic.

FIG. 6 illustrates an example timeline 600 showing the scheduled arrival times 602, 604, and 606 of periodic downlink packets and the jittered actual arrival times 612, 614, and 616 that is similar to the jittered arrival of packets in FIGS. 4 and 5. In FIG. 6, the base station may configure multiple SPS processes around the nominal arrival instant (e.g., providing times based on the potential for arrival before or after the nominal arrival time). For example, in FIG. 6, the base station configures a first SPS process 620, a second SPS process 630, and a third SPS process 640, each having an SPS occasion for each scheduled packet arrival. However, the example in FIG. 6 involves orthogonal sets of HARQ processes to be assigned together with multiple PUCCH transmissions from the UE providing feedback for the different SPS processes. The number of PUCCH transmissions may be reduced through the selection of the number of SPS processes. However, the use of multiple SPS processes may lead to multiple HARQ NACKs. Additional, the example involves added complexity at the UE in order to support multiple downlink SPS configurations. Some UEs, such as reduced capability UEs, may not support multiple downlink SPS configurations.

Aspects presented herein provide SPS resources that enable the periodic transmission of downlink packets that may experience a jittered arrival at a base station. The aspects presented herein may enable low latency downlink traffic to be communicated to the UE in a manner that balances the low latency of the communication with efficient scheduling of resources and reduced processing complexity for the UE. Aspects presented herein may improve the periodic communication of small, low-latency packets, e.g., to reduced capability UEs.

Figure 7:
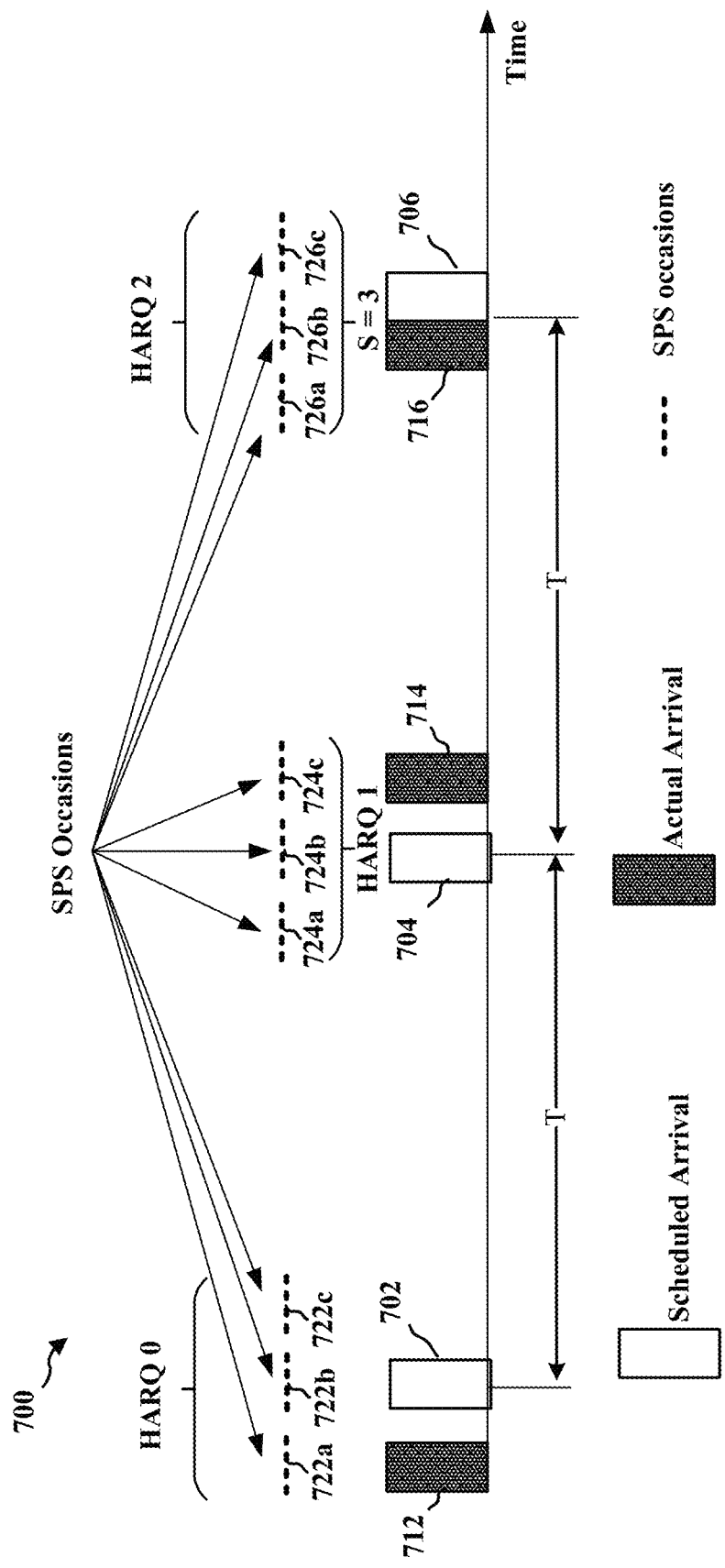
FIG. 7 illustrates an example of SPS occasions for a single HARQ process including multiple opportunities in accordance with aspects presented herein.

FIG. 7 illustrates an example timeline 700 showing the scheduled arrival times 702, 704, and 706 of periodic downlink packets and the jittered actual arrival times 712, 714, and 716 that is similar to the jittered arrival of packets in FIGS. 4, 5, and 6. In FIG. 7, the base station provides multiple opportunities for each SPS occasion. For example, at a first SPS occasion, the base station provides opportunities 722a, 722b, and 722c. The opportunities correspond to potential resources allocated for the downlink transmission. At a second SPS occasion, the base station provides opportunities 724a, 724b, and 724c, and at a third SPS occasion, the base station provides opportunities 726a, 726b, and 726c. For example, the base station may configure a multiple slot configured-grant (CG) for the downlink transmission from the base station. The base station may transmit the packet, according to its arrival, over the next slot, e.g., in any of the opportunities of the corresponding SPS occasion. For example, the packet with the actual arrival time of 712 may be transmitted in opportunity 722a, the packet with the actual arrival time of 714 may be transmitted in opportunity 724c, and the packet with the actual arrival time of 716 may be transmitted in opportunity 726b.

Aspects presented herein provide various options for the HARQ response from the UE. The multiple opportunities of the SPS configuration in FIG. 7 enables the downlink packet to be transmitted to the UE with reduced latency, e.g. in comparison to the example in FIG. 5. The SPS occasions may correspond to a single HARQ process and may involve a reduced HARQ response, e.g., in comparison to the example in FIG. 6. In some examples, the UE may send an ACK if CRC is passed over any slot of the SPS occasion. If not, the UE may send a NACK. Additionally, the aspects of FIG. 7 may enable the UE to turn off its receiver, e.g., after a passing CRC, which may enable power savings at the UE. Aspects may enable efficient communication with reduced capability devices that may not support the multiple SPS configurations described in connection with FIG. 6. The aspects presented herein support massive reduced capability UEs (which may be referred to in some examples as NR-light UEs) with jittered periodic traffic. The massive UE numbers may benefit from the SPS resources rather than a dynamic grant (DG)-based solution in which the PDCCH may be a bottleneck that limits communication. Massive UE numbers may also challenge the configuration and activation/re-activation of multi-SPS configurations, such as the described in connection with FIG. 6. The aspects presented herein operate with reduced HARQ processes and reduced HARQ responses in comparison with the multi-SPS configuration described in connection with FIG. 6.

The base station may configure the UE to support the multiple opportunity SPS downlink communication described in connection with FIG. 7. As an example, the base station may configure the UE via RRC to monitor for downlink communication based on a multiple opportunity SPS configuration. The base station may configure the UE to monitor a number of opportunities for each SPS occasion of the SPS configuration, e.g., a number s. In FIG. 7 s=3. The UE may be configured for any number of s>1 number of opportunities per SPS occasion. The number opportunities may correspond to a number of slots of SPS resources starting from an offset time from the scheduled arrival time. The offset may provide at least one opportunity prior to the scheduled arrival time, as illustrated in FIG. 7. The base station may transmit the packet to the UE in an opportunity of the corresponding SPS occasion. For example, the base station may transmit the packet to the UE in a single opportunity of the SPS occasion, e.g., without transmitting the packet in multiple opportunities of the SPS occasion. The UE may perform blind decoding of the SPS PDSCH at each opportunity (e.g., at 722a, 722b, and 722c for the first SPS occasion). Each SPS occasion may correspond to one HARQ process that is shared by the multiple opportunities of the SPS occasion, e.g., in contrast to the example in FIG. 6. The same HARQ ID determination mechanism may be used as for an SPS occasion having a single opportunity, such as described in connection with FIG. 5.

Figure 8:
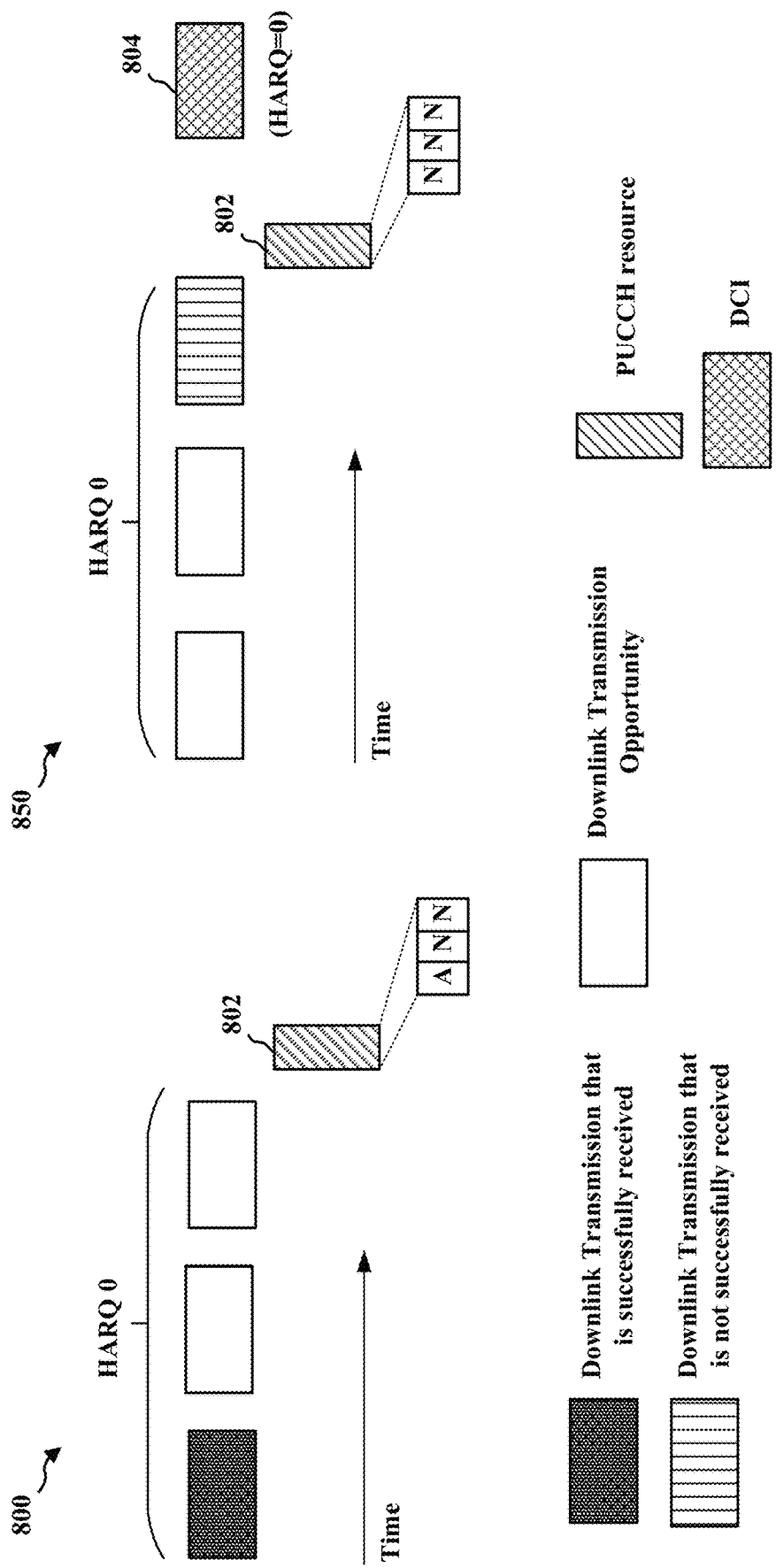
FIG. 8 illustrates an example of SPS occasions for a single HARQ process including multiple opportunities and example resources for feedback in accordance with aspects presented herein.

FIG. 8 illustrates an example in which the base station may allocate a single, shared resource for ACK/NACK feedback from the UE. In a first example 800, the UE successfully receives the downlink packet in a first opportunity of the SPS occasion corresponding to HARQ 0. The UE may transmit ACK/NACK feedback in the single PUCCH resource 802. In FIG. 8, each of the opportunities of the SPS occasion map to the same PUCCH reporting instance. The UE may reporting a multiple bit ACK/NACK that provides individual feedback for each of the opportunities. For example, for s opportunities, the UE may report an s bit ACK/NACK with 1 bit for each opportunity. As the UE successfully received the packet in the first opportunity in the example 800, the UE may indicate an ACK in a bit corresponding to the first opportunity, and may indicate a NACK in the bits of the other two opportunities. In the example 850, the downlink packet was transmitted in the second opportunity, but was not successfully received by the UE, e.g., due to low SINR. Therefore, the UE may indicate a NACK for each of the bits of the PUCCH. The timing of the PUCCH may be configured through DCI activation. In some examples, at most one ACK bit may be included in the ACK codebook. The sequence of ACK positions in the PUCCH may be used by the base station for proactive SPS reactivation if arrival drifting occurs. The base station may provide a dynamic grant, e.g. DCI 804, to schedule a retransmission of a downlink packet that was not successfully received for a particular SPS occasion. In the example 850, the base station may send a dynamic grant in the DCI 804 that indicates the HARQ ID of the corresponding SPS occasion (e.g., HARQ 0) as an index that indicates to the UE the downlink packet that will be retransmitted.

In some examples, the DCI might not identify the particular opportunity in which the initial packet was transmitted. In response to receiving the dynamic grant for the retransmission in the DCI 804, the UE may perform a HARQ combination of the retransmission with the SPS opportunity of the initial transmission. The UE may use the HARQ ID to identify the SPS occasion of the initial transmission. The UE may determine the opportunity of the identified SPS occasion that has a maximum likelihood of the downlink packet. The maximum likelihood may be based on the blind PDSCH decoding performed by the UE, e.g., based on a metric for the DMRS sequence detection, etc. After determining the opportunity with the highest likelihood of having the initial downlink packet, the UE may perform HARQ combining of the retransmission with the determined opportunity of the SPS occasion.

Figure 15:
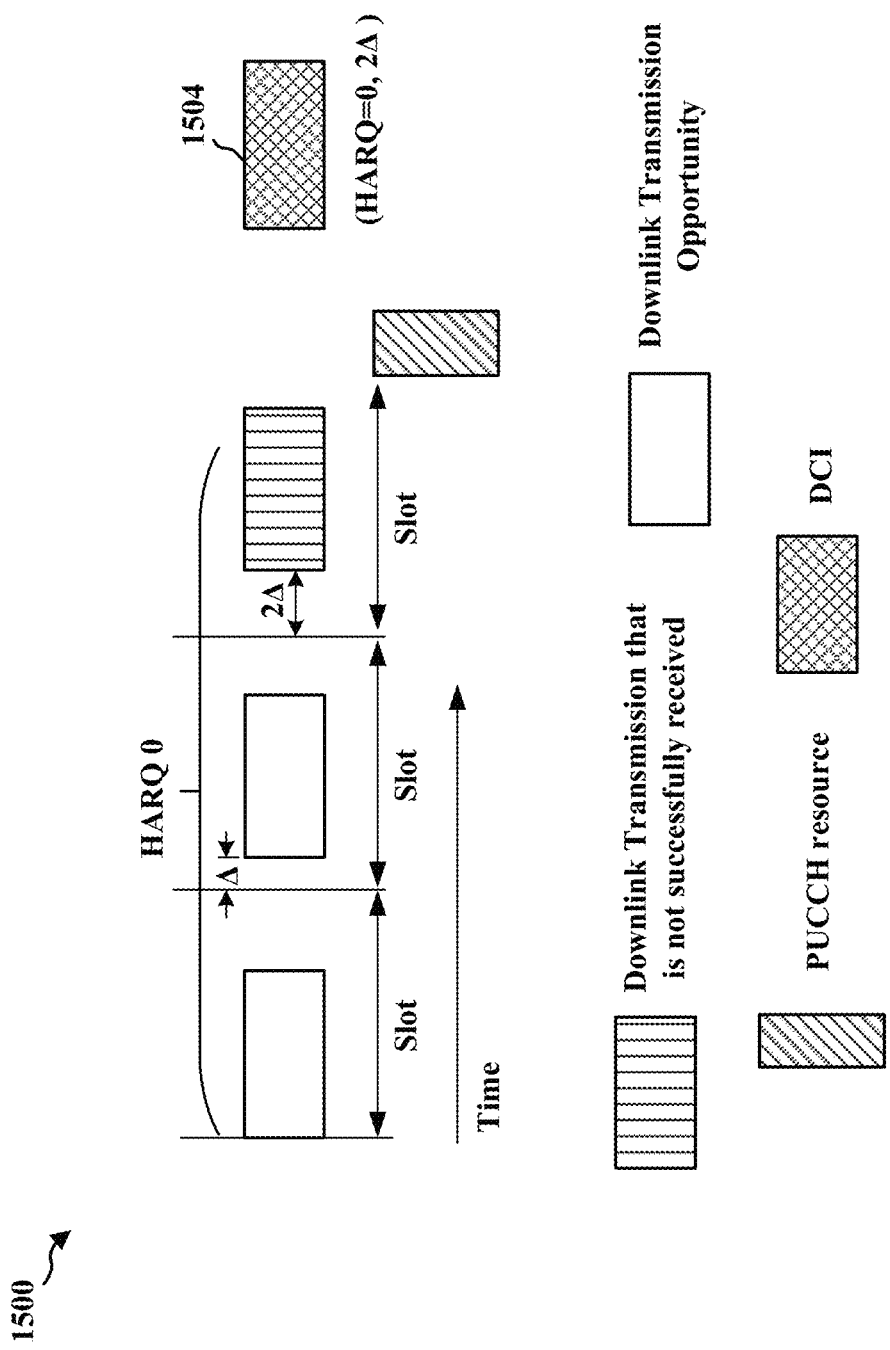
FIG. 15 illustrates an example of SPS occasions for a single HARQ process including multiple opportunities and example aspects for scheduling a retransmission in accordance with aspects presented herein.

In other examples, the base station may provide an indication to the UE that enables the UE to determine the opportunity of the SPS occasion to use for HARQ combining with the retransmission. FIG. 15 illustrates an example time diagram 1500 showing an example indication by the base station. As illustrated in FIG. 15, the base station may use a coincidence between a time domain resource allocation (TDRA) in a retransmission dynamic grant, e.g., in DCI 1504, and that of the SPS opportunity for the initial transmission of the downlink packet to indicate to the UE the opportunity for performing HARQ combination with the retransmission. In FIG. 15, the initial transmission for the SPS occasion associate with HARQ 0 may include multiple opportunities, such as described in connection with FIG. 7. Each opportunity in FIG. 15 may have a different time offset relative to a slot boundary. In FIG. 15, the first opportunity has a zero offset with respect to the slot boundary, the second opportunity has an offset of Δ relative to the slot boundary, and the third opportunity has an offset of 2Δ relative to the slot boundary. The base station may send a dynamic grant that indicates a corresponding starting time offset with respect to a slot boundary as the opportunity in which the packet was initially transmitted. For example, in FIG. 15, the packet was transmitted in the third opportunity of the SPS occasion, having a time offset of 2Δ relative to the slot boundary. The DCI 1504 indicates the HARQ process, e.g., HARQ0 and schedules the retransmission with the same time offset as the third opportunity, e.g., 2Δ relative to a slot boundary. The UE may use the time offset to identify the corresponding opportunity of the SPS occasion. After determining the opportunity that was indicated as including the initial downlink packet, the UE may perform HARQ combining of the retransmission with the determined opportunity of the SPS occasion.

Figure 9:
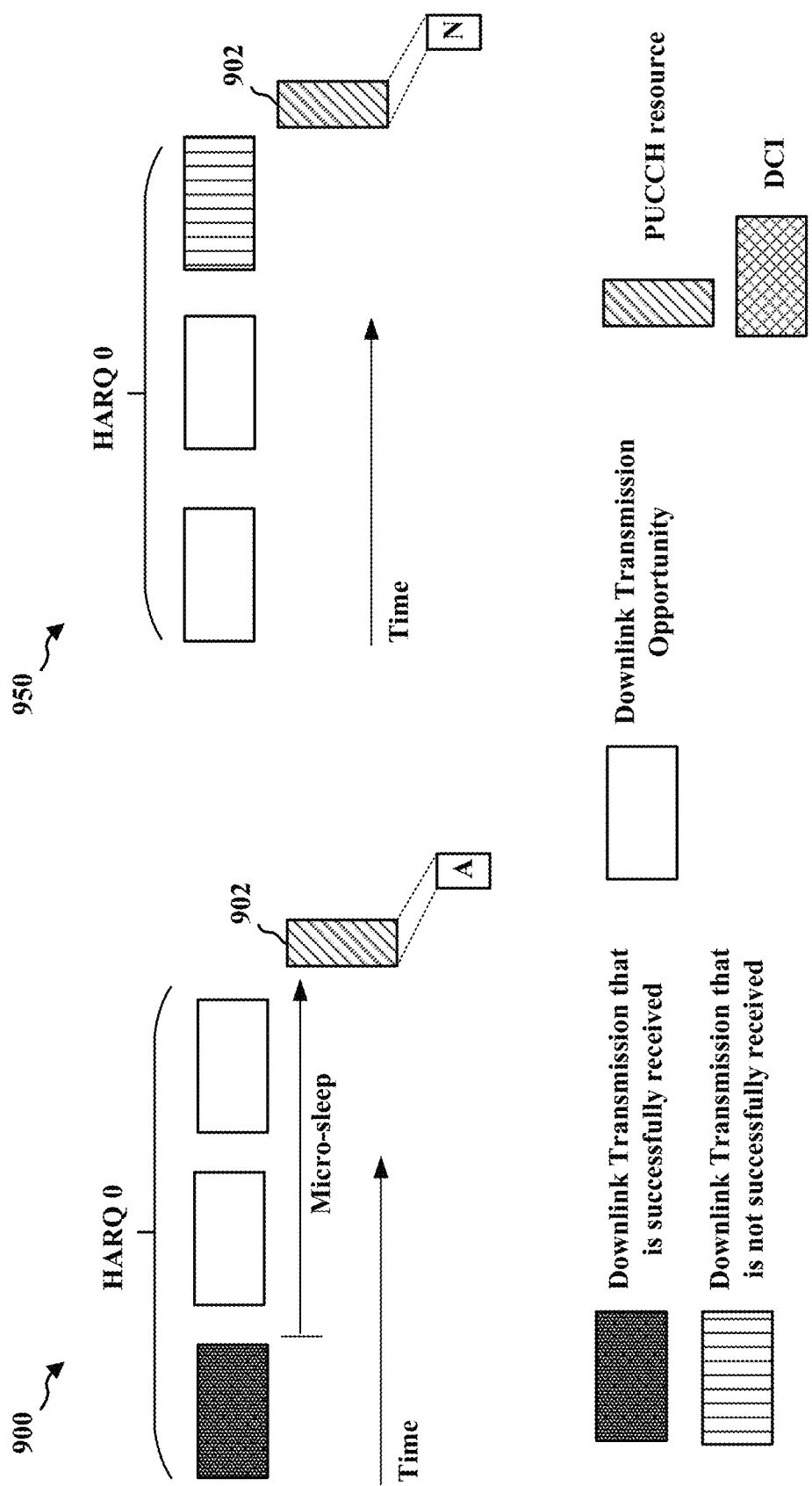
FIG. 9 illustrates an example of SPS occasions for a single HARQ process including multiple opportunities and example resources for feedback in accordance with aspects presented herein.

FIG. 9 illustrate examples 900 and 950 of a single PUCCH instance 902 having combined ACK/NACK feedback for each of the opportunities of the SPS occasion. Similar to FIG. 8, the UE may have a single configured PUCCH reporting instance 902. In contrast to FIG. 8, the base station may report a single ACK or a single NACK for the SPS occasion. In some examples, the UE may report a single bit ACK/NACK with respect to each of the opportunities of the SPS occasion. In the example 950, the UE did not successfully receive the downlink packet that was transmitted in the third opportunity of the SPS occasion corresponding to HARQ0. Therefore, the UE sends a NACK in the PUCCH 902. In the example 800, the UE successfully receives the downlink packet in the first opportunity of the SPS occasion and transmits an ACK in the PUCCH 902. The UE may transmit an ACK when the UE receives PDSCH that passes CRC in any opportunity of the SPS occasion. Otherwise, the UE may send a NACK. In some examples, the UE may enter a sleep state, e.g., a micro-sleep, a reduced power mode, turning of the receiver, etc., between the successful receipt of the downlink packet and the PUCCH 902. For example, the UE may conduct a micro-sleep after detecting a CRC pass, such as staying in a discontinuation reception (DRX) off mode. In some examples, each opportunity may correspond to a discontinuous transmission (DTX) by the base station. The base station may schedule the retransmission in a dynamic grant, as described in connection with FIG. 8. The UE may perform HARQ combination for the retransmission as described in connection with either FIG. 8 or FIG. 15.

Figure 10:
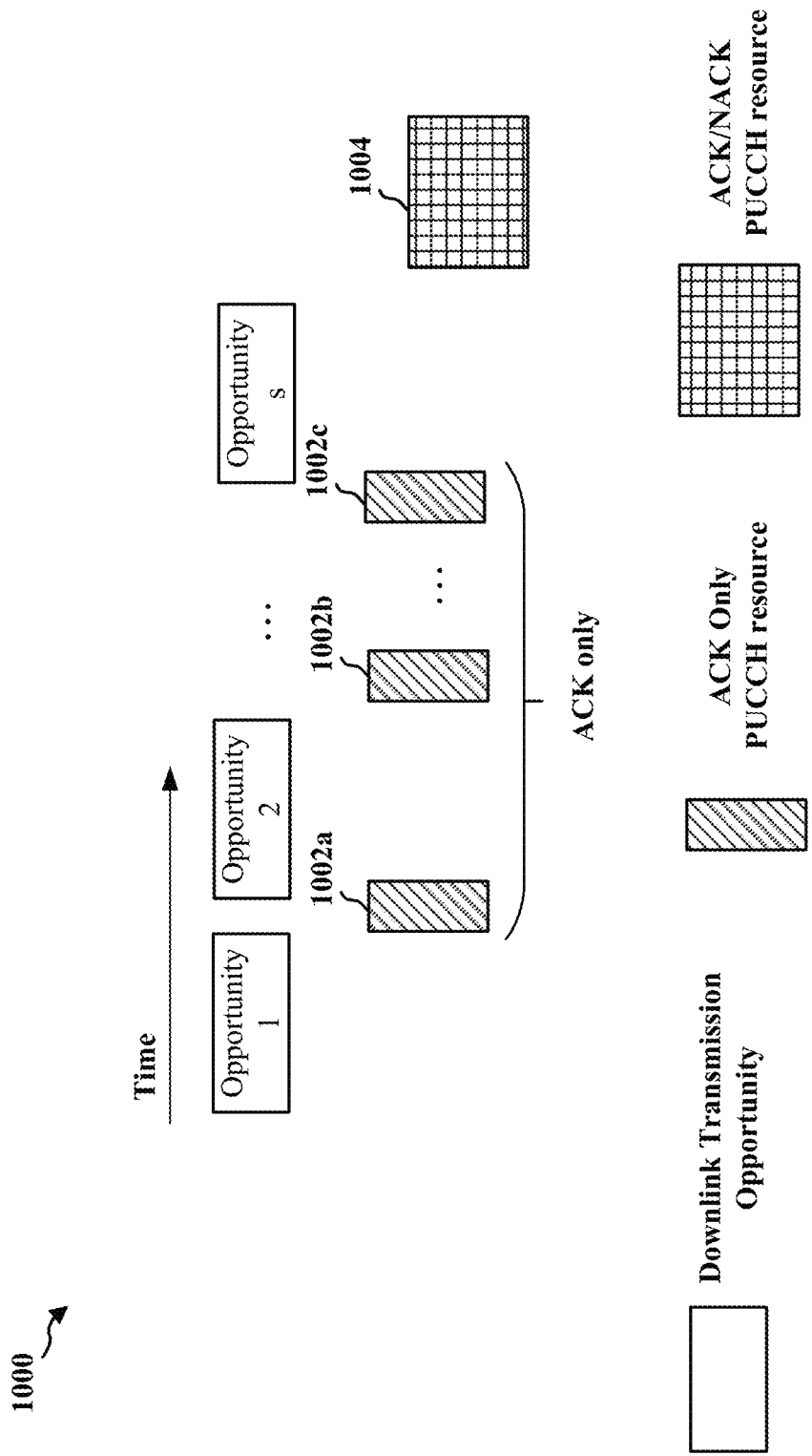
FIG. 10 illustrates an example of SPS occasions for a single HARQ process including multiple opportunities and example resources for feedback in accordance with aspects presented herein.

FIG. 10 illustrates an example 1000 having multiple PUCCH opportunities 1002a, 1002b, 1002c, and 1004. In some examples, the UE may transmit at most two PUCCH transmissions. For an SPS occasion having s opportunities, in FIG. 10, the base station may provide an ACK only PUCCH opportunity for each of s−1 SPS opportunities that enables an early ACK for a successfully received downlink packet. The PUCCH opportunities enable the UE to provide an ACK to the base station more quickly than the examples in FIGS. 8 and 9. Additionally, by limiting the feedback in the PUCCH resources 1002a, 1002b, and 1002c to an ACK helps to reduce the amount of signaling from the UE. The last PUCCH resources 1004 after the last opportunity of the SPS occasion may be configured in any of various ways. For example, for added reliability, the PUCCH resource 1004 may have a different time, frequency, and/or format than the other PUCCH resources 1002a, 1002b, and 1002c. In some examples, the PUCCH resource 1004 may be configured for ACK/NACK feedback, whereas the PUCCH resources 1002a, 1002b, and 1002c may be configured for ACK feedback but not for NACK feedback. In some examples, the UE may send an ACK in the PUCCH resource corresponding to the opportunity in which the downlink packet was received and may send an ACK in the PUCCH resource 1004, e.g., two ACKs. In other examples, the UE may send an ACK in the PUCCH resource corresponding to the opportunity in which the downlink packet was received without sending an ACK in the PUCCH resource 1004. If the packet is not successfully received in any of the opportunities, the base station may send a NACK in the PUCCH resource 1004. The base station may schedule the retransmission in a dynamic grant, as described in connection with FIG. 8. The UE may perform HARQ combination for the retransmission as described in connection with either FIG. 8 or FIG. 15.

Figure 11:
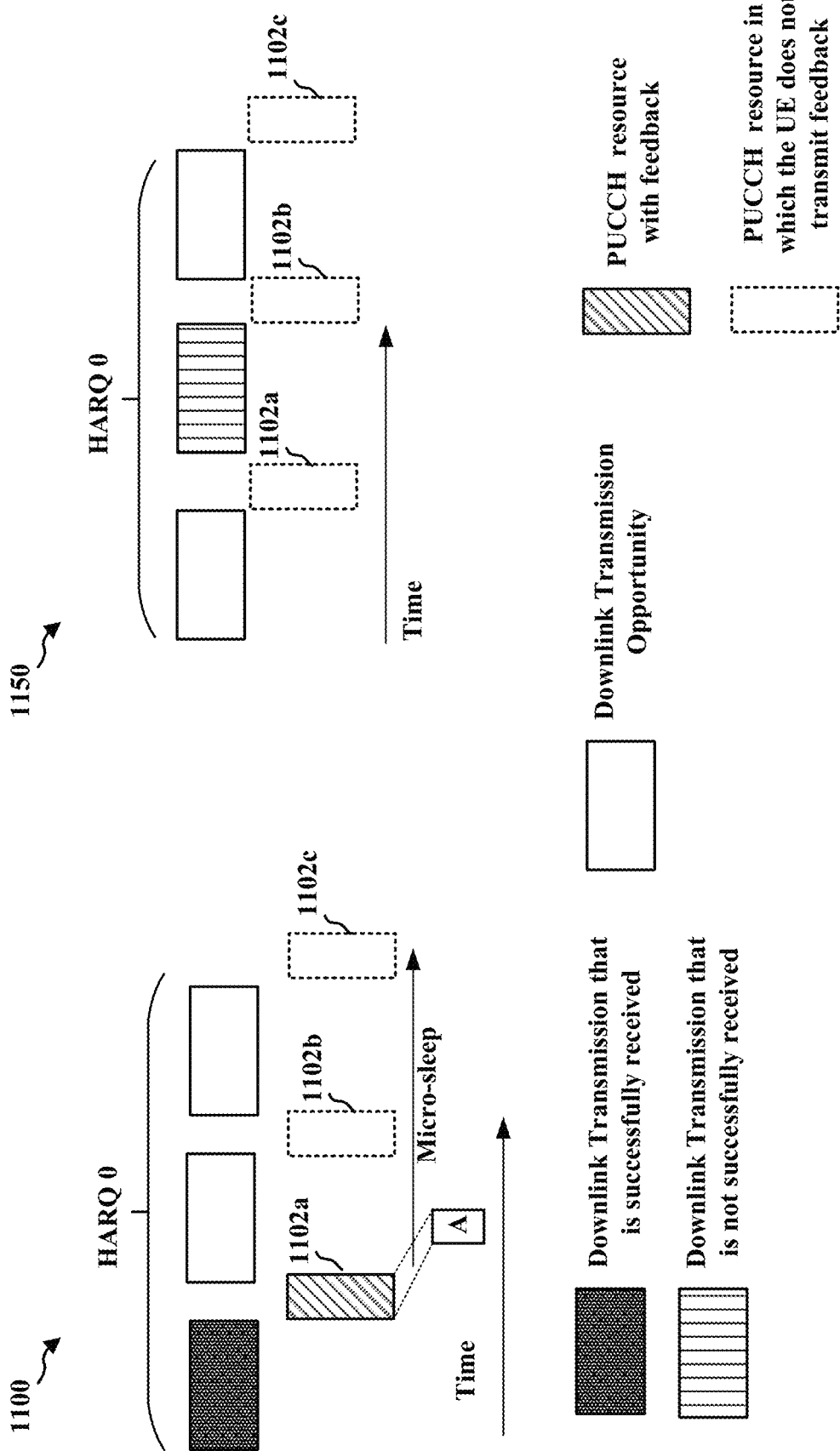
FIG. 11 illustrates an example of SPS occasions for a single HARQ process including multiple opportunities and example resources for feedback in accordance with aspects presented herein.

FIG. 11 illustrates a set of examples having multiple PUCCH opportunities 1102a, 1102b, 1102c, e.g., one for each opportunity of the SPS occasion. In some examples, the UE may transmit at most one PUCCH transmission. For an SPS occasion having s opportunities, in FIG. 11, the base station may provide s PUCCH opportunities, e.g., one for each of the s SPS opportunities. The PUCCH opportunities enables an early ACK for a successfully received downlink packet. Each of the PUCCH opportunities may be configured for ACK but not for NACK. Thus, in example 1100, the UE transmits an ACK in the PUCCH 1102a after successfully receiving the downlink packet in the first opportunity. In the example 1150, the UE does not transmit any feedback, e.g., does not transmit in the PUCCH 1102a, 1102b, or 1102c because the UE did not successfully receive the downlink packet in any of the opportunities of the SPS occasion. The PUCCH opportunities enable the UE to provide an ACK to the base station more quickly than the examples in FIGS. 8 and 9. In contrast to the example in FIG. 10, in FIG. 11, the last PUCCH 1102c is for ACK and not for NACK. As illustrated in the example 1100, the UE may transition to a micro-sleep after transmitting the ACK, e.g., operating during the remaining opportunities of the SPS occasion in a DRX off mode. The base station may schedule the retransmission in a dynamic grant, as described in connection with FIG. 8. The UE may perform HARQ combination for the retransmission as described in connection with either FIG. 8 or FIG. 15.

Figure 12:
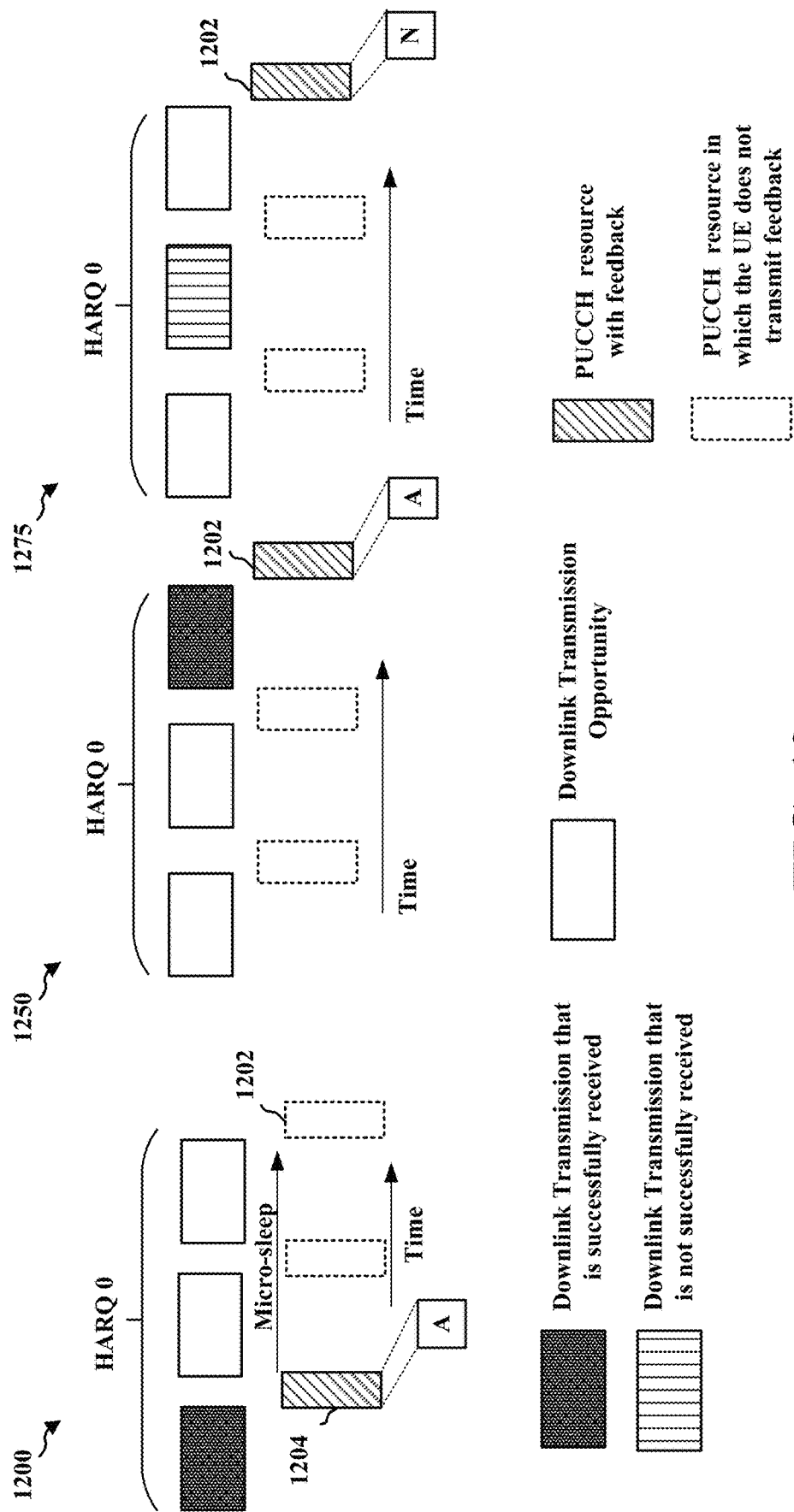
FIG. 12 illustrates an example of SPS occasions for a single HARQ process including multiple opportunities and example resources for feedback in accordance with aspects presented herein.

FIG. 12 illustrates a set of examples showing a single PUCCH resource 1202 that is configured for ACK/NACK feedback. For example, the PUCCH resource 1202 may correspond to a PUCCH resource for the last SPS opportunity of the SPS occasion. As illustrated in the example 1200, the UE may perform DTX in the PUCCH resource 1202 by not transmitting any feedback in the PUCCH resource 1202, e.g., if the UE has previously sent an ACK in another PUCCH resource 1204. As illustrated in the example 1250, the UE may transmit an ACK in the PUCCH resource 1202. For example, the UE may transmit the ACK if a successfully received downlink packet has not previously been acknowledged. As illustrated in the example 1275, the UE may transmit a NACK in the PUCCH resource 1202 if the downlink packet was not successfully received in any of the opportunities of the SPS occasion. As described in connection with FIG. 10, the UE may be configured with other PUCCH resources that are for ACK but not NACK. The base station may schedule the retransmission in a dynamic grant, as described in connection with FIG. 8 if the base station detects a NACK in the PUCCH resource 1202 or if the base station detects DTX in PUCCH resources for each of the SPS opportunities. The UE may perform HARQ combination for the retransmission as described in connection with either FIG. 8 or FIG. 15.

Figure 13:
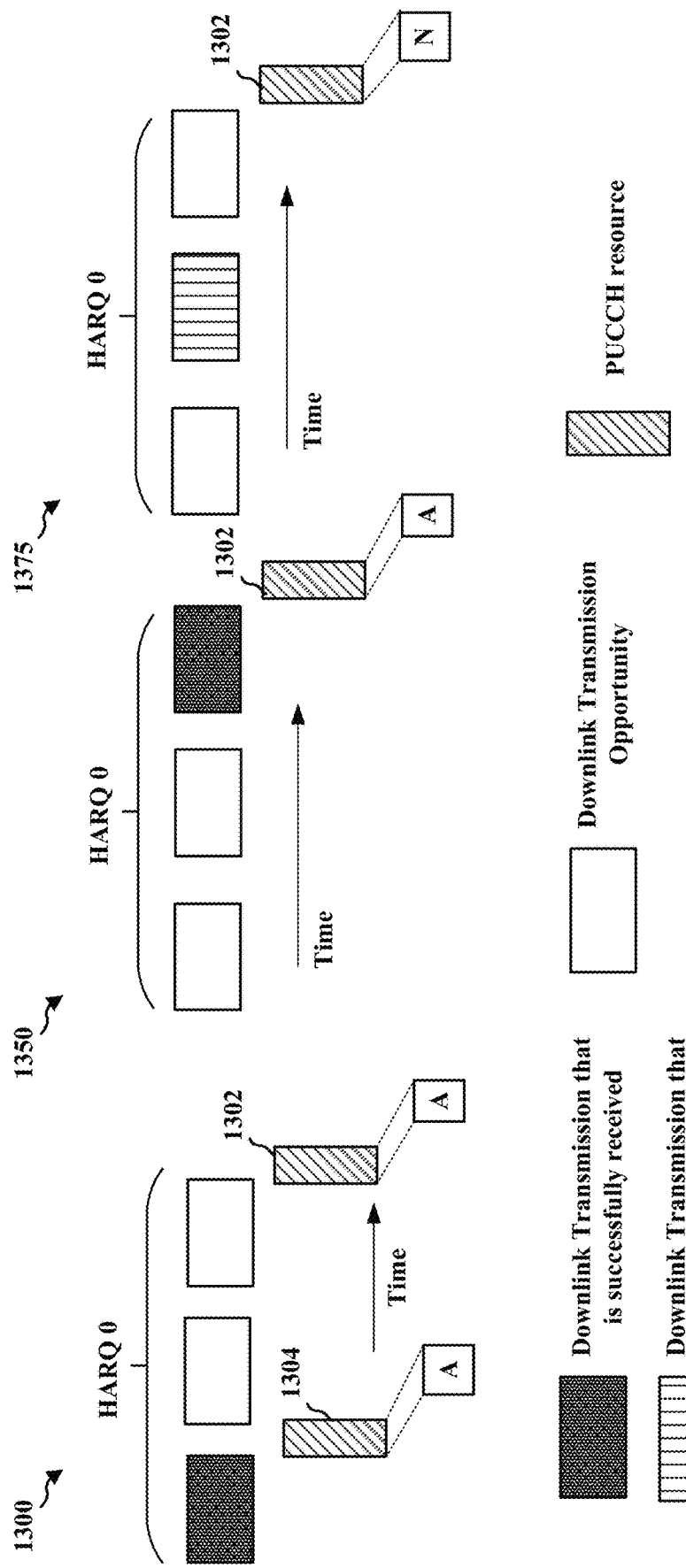
FIG. 13 illustrates an example of SPS occasions for a single HARQ process including multiple opportunities and example resources for feedback in accordance with aspects presented herein.

FIG. 13 illustrates a set of examples showing a single PUCCH resource 1302 that is configured for ACK/NACK feedback. For example, the PUCCH resource 1302 may correspond to a PUCCH resource for the last SPS opportunity of the SPS occasion. In the example 1300, the UE may transmit an ACK in the PUCCH resource 1302 even though the UE sent an ACK in another PUCCH resource 1304, in contrast to the example 1200 in FIG. 12. As illustrated in the example 1350, the UE may transmit a single ACK in the PUCCH resource 1302 if the UE successfully receives the downlink packet in the last SPS opportunity of the SPS occasion. As illustrated in the example 1375, the UE may transmit a NACK in the PUCCH resource 1302 if the downlink packet was not successfully received in any of the opportunities of the SPS occasion. As described in connection with FIG. 10, the UE may be configured with other PUCCH resources that are for ACK but not NACK. Thus, the UE may send up to two ACKs, e.g., as in the example 1300, but may send a single NACK. The base station may schedule the retransmission in a dynamic grant, as described in connection with FIG. 8 if the base station detects a NACK in the PUCCH resource 1302 or if the base station detects DTX in PUCCH resources for each of the SPS opportunities. The UE may perform HARQ combination for the retransmission as described in connection with either FIG. 8 or FIG. 15.

Figure 14:
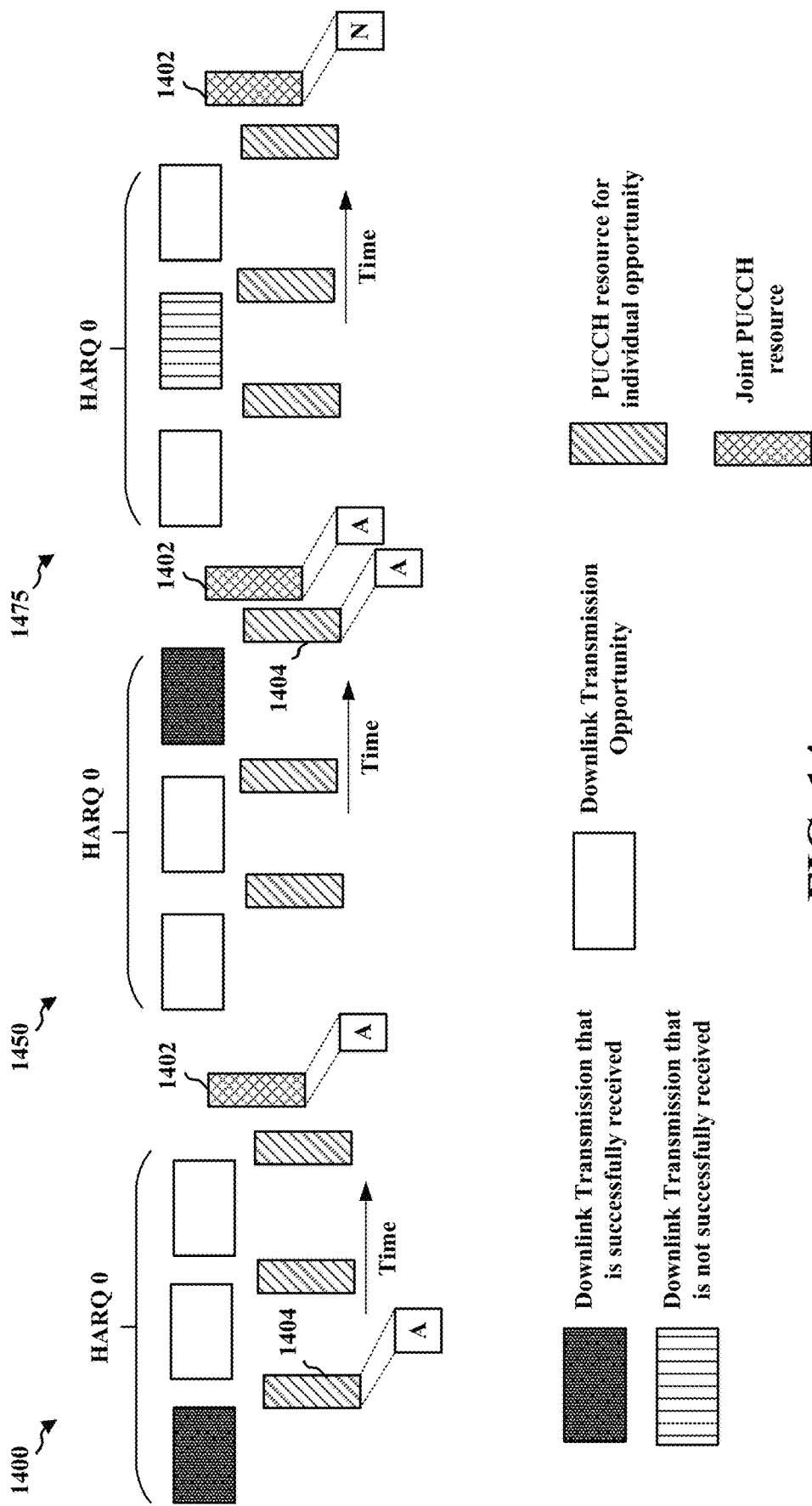
FIG. 14 illustrates an example of SPS occasions for a single HARQ process including multiple opportunities and example resources for feedback in accordance with aspects presented herein.

FIG. 14 illustrates a set of examples showing an additional PUCCH resource 1402 that is provided in addition to the individual PUCCH resources for each SPS opportunity of the SPS occasion. For example, the additional PUCCH resource 1402 may be provided after the last SPS opportunity of the SPS occasion. In FIG. 13, the PUCCH resource 1302 corresponded to the PUCCH resource for the last SPS occasion. In contrast to FIG. 13, in FIG. 14, the additional PUCCH resource 1402 is provided in addition to a PUCCH resource for the last SPS opportunity. As described in connection with FIG. 10, the other PUCCH resources may be configured for ACK but not NACK. The additional PUCCH resource 1402 may be configured to ACK and NACK. The additional PUCCH resource may be delayed in time compared to the other PUCH resources. The additional PUCCH resource may be separated, e.g., separated in time and/or frequency from the other PUCCH resources corresponding to individual SPS opportunities. In the example 1400, the UE may transmit an ACK in the PUCCH resource 1402 even though the UE sent an ACK in another PUCCH resource 1404. As illustrated in the example 1450, the UE may transmit an ACK in the PUCCH resource 1402 1402 even though the UE sent an ACK in another PUCCH resource 1404. As illustrated in the example 1475, the UE may transmit a NACK in the PUCCH resource 1402 if the downlink packet was not successfully received in any of the opportunities of the SPS occasion. Thus, the UE may send up to two ACKs, e.g., as in the examples 1400 and 1450, but may send a single NACK. The base station may schedule the retransmission in a dynamic grant, as described in connection with FIG. 8 if the base station detects a NACK in the PUCCH resource 1402 or if the base station detects DTX in PUCCH resources for each of the SPS opportunities. The UE may perform HARQ combination for the retransmission as described in connection with either FIG. 8 or FIG. 15.

Although the examples in FIGs. illustrate the concepts using an example of three SPS opportunities per SPS occasion, the concepts may be applied to any number of SPS opportunities in an SPS occasion.

In some examples, the UE may transmit feedback differently when the UE transmits the ACK/NACK feedback in a PUSCH transmission, e.g., piggybacked with a PUSCH transmission or multiplexed with a PUSCH transmission. For example, if the UE is configured with a PUCCH resource for ACK but not NACK, e.g., an ACK only resource, the UE may determine to report either ACK or NACK for a PDSCH in the SPS occasion or the SPS opportunity if the UE multiplexes the HARQ feedback with PUSCH. Thus, the UE may transmit a NACK when the HARQ feedback is multiplexed with PUSCH, e.g., piggybacked with the PUSCH. For example, ACK only limitations may be applicable when the HARQ feedback is not multiplexed with PUSCH and may not be applicable when the HARQ feedback is multiplexed with the PUSCH.

Figure 16:
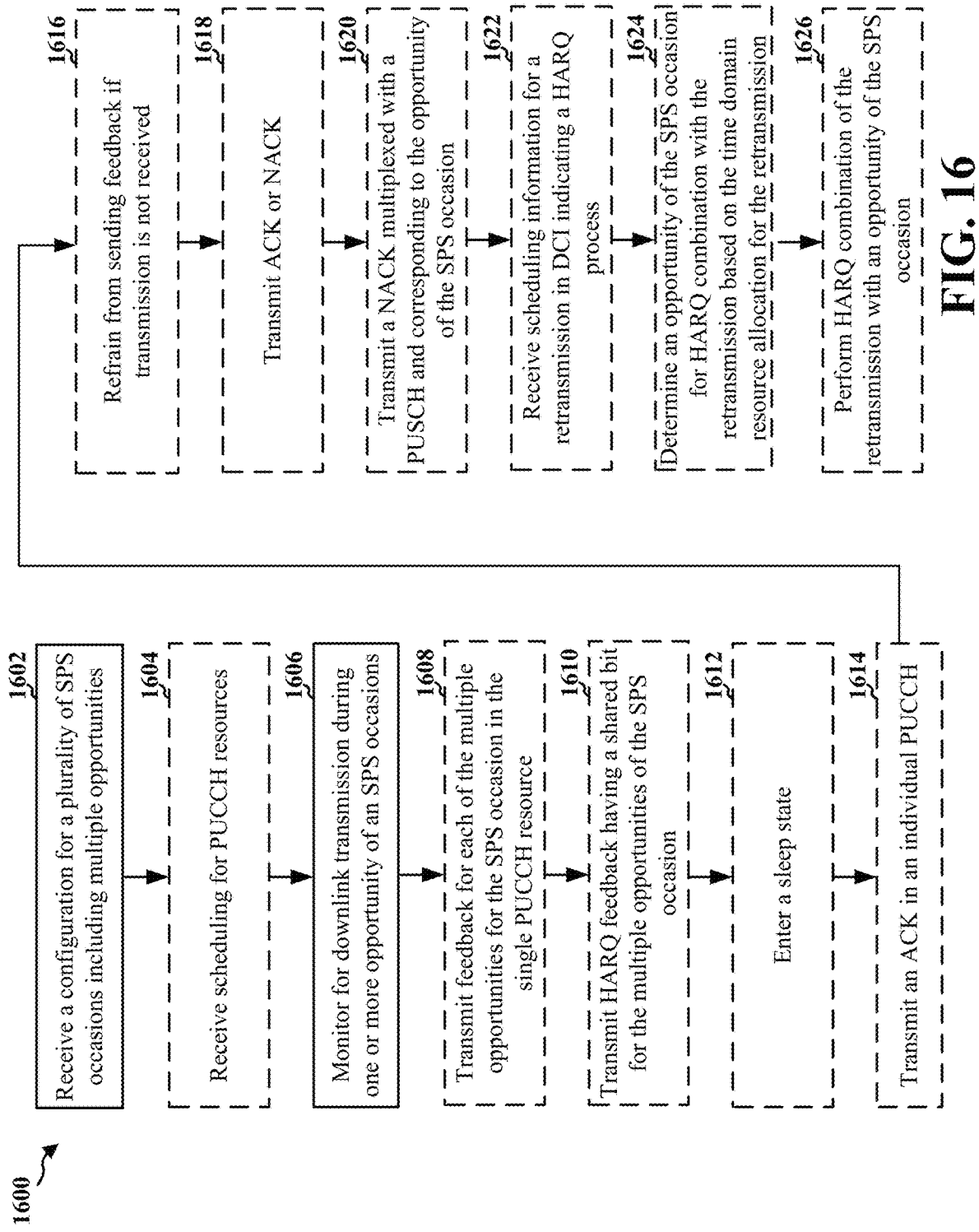
FIG. 16 is a flowchart of a method of wireless communication at a UE in accordance with aspects presented herein.

FIG. 16 is a flowchart 1600 of a method of wireless communication. The method may be performed by a UE or a component of a UE (e.g., the UE 104, 350; a processing system, which may include the memory 360 and which may be the entire UE 350 or a component of the UE 350, such as the TX processor 368, the RX processor 356, and/or the controller/processor 359). Optional aspects are illustrated with a dashed line. The method improves the efficient use of resources for jittered periodic traffic.

The 1602, the UE receives a configuration for a plurality of SPS occasions each SPS occasion including multiple opportunities for a downlink transmission by a base station. The plurality of SPS occasions may be for a single SPS configuration. The multiple opportunities of the SPS occasion may be associated with a same HARQ process. In some examples, each of the multiple opportunities may correspond to a slot starting from an offset for the SPS occasion. For example, each SPS occasion may include multiple opportunities, such as described in connection with FIG. 7.

At 1606, the UE monitors for the downlink transmission during one or more opportunity of an SPS occasion. Monitoring for the downlink transmission may include performing blind decoding for a PDSCH at each opportunity of the SPS occasion until the downlink transmission is successfully received. In some examples, the UE may monitor for the downlink transmission during each of the opportunities of the SPS occasion. In some examples, the UE may monitor for the downlink transmission during the opportunities of the SPS occasion until the UE successfully receives a downlink transmission. If the UE successfully receives the downlink transmission prior to the last opportunity, the UE may stop monitoring for the opportunities of the SPS occasion.

In some examples, each of the multiple opportunities for the SPS occasion may map to a single PUCCH resource for feedback, such as described in connection with FIG. 8 or FIG. 9. As illustrated at 1608, the UE may transmit feedback for each of the multiple opportunities for the SPS occasion in the single PUCCH resource, such as described in connection with FIG. 8 or FIG. 9. The feedback may comprise HARQ feedback including at least one bit for each of the multiple opportunities for the SPS occasion. In some examples, the HARQ feedback may provide individual feedback for each of the opportunities of the SPS occasion, such as described in connection with FIG. 8. In other examples, the HARQ feedback may include a single bit that provides overall HARQ feedback for the opportunities of the SPS occasion, such as described in connection with FIG. 9.

As illustrated at 1622, the UE may receive scheduling information for a retransmission in DCI indicating a HARQ process for the SPS occasion as an index for the retransmission. For example, as described in connection with FIG. 9, the DCI may identify the HARQ process to inform the UE which downlink transmission is being retransmitted.

As illustrated at 1626, the UE may perform HARQ combination of the retransmission. The UE may perform the HARQ combination of the retransmission with an opportunity of the SPS occasion having a highest detection metric. Thus, the UE may determine the opportunity of the SPS that was most likely to have included the downlink transmission and may perform the HARQ combination based on the UE's determination.

In some examples, the base station may provide information to the UE to assist the UE in determining which opportunity to use to perform HARQ combination. For example, the DCI scheduling the retransmission may further include a time domain resource allocation for the retransmission. As an example, the DCI may indicate a timing offset, such as described in connection with FIG. 15, that helps the UE to identify the opportunity of the SPS occasion that included the initial transmission. Then, at 1624, the UE may determine the opportunity of the SPS occasion for HARQ combination with the retransmission based on the time domain resource allocation for the retransmission.

As illustrated at 1610, the UE may transmit HARQ feedback having a shared bit for the multiple opportunities of the SPS occasion. The HARQ feedback may include aspects described in connection with any of FIG. 9, 10, 12, 13, or 14.

As illustrated at 1612, the UE may enter a sleep state between successfully receiving the downlink transmission in an opportunity of the SPS occasion and transmitting the HARQ feedback or following transmitting the HARQ feedback, e.g., following transmission of an early ACK. As examples, FIGS. 9, 11, and 12 illustrate examples in which the UE may transition to a sleep state, a reduced power state, or a state in which the UE does not monitor for the PDSCH following successful receipt of the PDSCH and/or transmission of the HARQ.

As illustrated at 1604, the UE may receive scheduling for PUCCH resources for providing HARQ feedback for the SPS occasion. The UE may receive scheduling for individual PUCCH resources for one or more of the multiple opportunities of the SPS occasion. FIGS. 10-14 illustrate various examples of PUCCH resources that include individual PUCCH resources for one or more of multiple opportunities of the SPS occasion. In some examples, the UE may receive scheduling for individual PUCCH resources for each of the multiple opportunities of the SPS occasions. In some examples, the scheduling may provide the individual PUCCH resources for a subset (e.g., s−1) of the multiple opportunities (e.g., for s opportunities) of the SPS occasion, such as in any of the examples in FIG. 10, 12, or 13. For example, the scheduling may provide one less individual PUCCH resource (e.g., s−1) than a number (e.g., s with s being an integer number) of the multiple opportunities. In some examples, the individual PUCCH resources may be limited to use for positive acknowledgments, e.g., such as described in connection with any of FIGS. 10-14. The scheduling may schedule an additional PUCCH resource following the SPS occasion. The additional PUCCH resource may comprise a different time, a different frequency, or a different format than the individual PUCCH resources, e.g., as described in connection with any of FIG. 10, 12, 13, or 14. The scheduling may provide the individual PUCCH resources for each of the multiple opportunities of the SPS occasion, such as described in connection with FIG. 11 or FIG. 14. In some examples, the individual PUCCH resources may be limited to use for positive ACKs, e.g., and may be limited from use for NACKs.

As illustrated at 1614, the UE may transmit an ACK in an individual PUCCH resource and enter a sleep mode following successful receipt of the downlink transmission, if the downlink transmission is successfully received. Then, at 1616, the UE may refrain from sending feedback if the downlink transmission is not successfully received in any of the multiple opportunities of the SPS occasion, e.g., as described in connection with FIG. 11.

In some examples, the scheduling at 1604 may schedule the individual PUCCH resources that are limited to ACKs for a subset (e.g., s−1) of the multiple opportunities of the SPS occasion and schedule a last PUCCH resource following a last opportunity of the SPS occasion for ACK/NACK, e.g., such as described in connection with any of FIGS. 12-14.

The UE may transmit a single ACK to the base station in an individual PUCCH resource or last PUCCH resource. If the UE does not successfully receive the downlink packet in any of the opportunities of the SPS occasion, the UE may transmit a NACK in the last PUCCH resource. FIG. 12 illustrates an example in which the UE may transmit a single ACK, e.g., in an individual PUCCH resource or the last PUCCH resource.

As illustrated at 1618, the UE may transmit the ACK to the base station in an individual PUCCH resource and the last PUCCH resource. If the UE does not successfully receive the downlink packet in any of the opportunities of the SPS occasion, the UE may transmit a NACK in the last PUCCH resource. FIG. 13 illustrates an example in which the UE may transmit the ACK multiple times, e.g., in an individual PUCCH resource and a final PUCCH resource.

The scheduling, at 1604, may schedule the individual PUCCH resources that are limited to ACKs for each of the multiple opportunities of the SPS occasion and may schedule an additional PUCCH resource following a last opportunity of the SPS occasion for an ACK/NACK, e.g., as described in connection with FIG. 14. In this example, the UE may transmit the ACK to the base station in an individual PUCCH resource and the additional PUCCH resource, at 1618, if the downlink is successfully received and may transmit the NACK in the additional resource if the packet is not successfully received in any of the opportunities of the SPS occasion.

In some examples, the UE may adjust feedback based on whether the feedback is piggybacked in PUSCH. For example, the UE may receive the scheduling, at 1604, for a PUCCH resource that is limited to positive ACKs for an opportunity of the SPS occasion. Then, at 1620, the UE may transmit a NACK multiplexed with a PUSCH and corresponding to the opportunity of the SPS occasion.

Each block in the aforementioned flowchart of FIG. 16 and/or the aspects that are performed by the UE in any of FIGS. 7-15 may be performed by a component of a UE apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the UE includes means for performing the method described in connection with FIG. 16 and/or the aspects performed by the UE in any of FIGS. 7-15. The aforementioned means may be one or more of the aforementioned components of an apparatus and/or a processing system of such an apparatus configured to perform the functions recited by the aforementioned means. The processing system may include a transmission processor, a reception processor, and a controller/processor. As such, in one configuration, the aforementioned means may be memory 360, such as the TX processor 368, the RX processor 356, and/or the controller/processor 359 configured to perform the functions recited by the aforementioned means.

Figure 17:
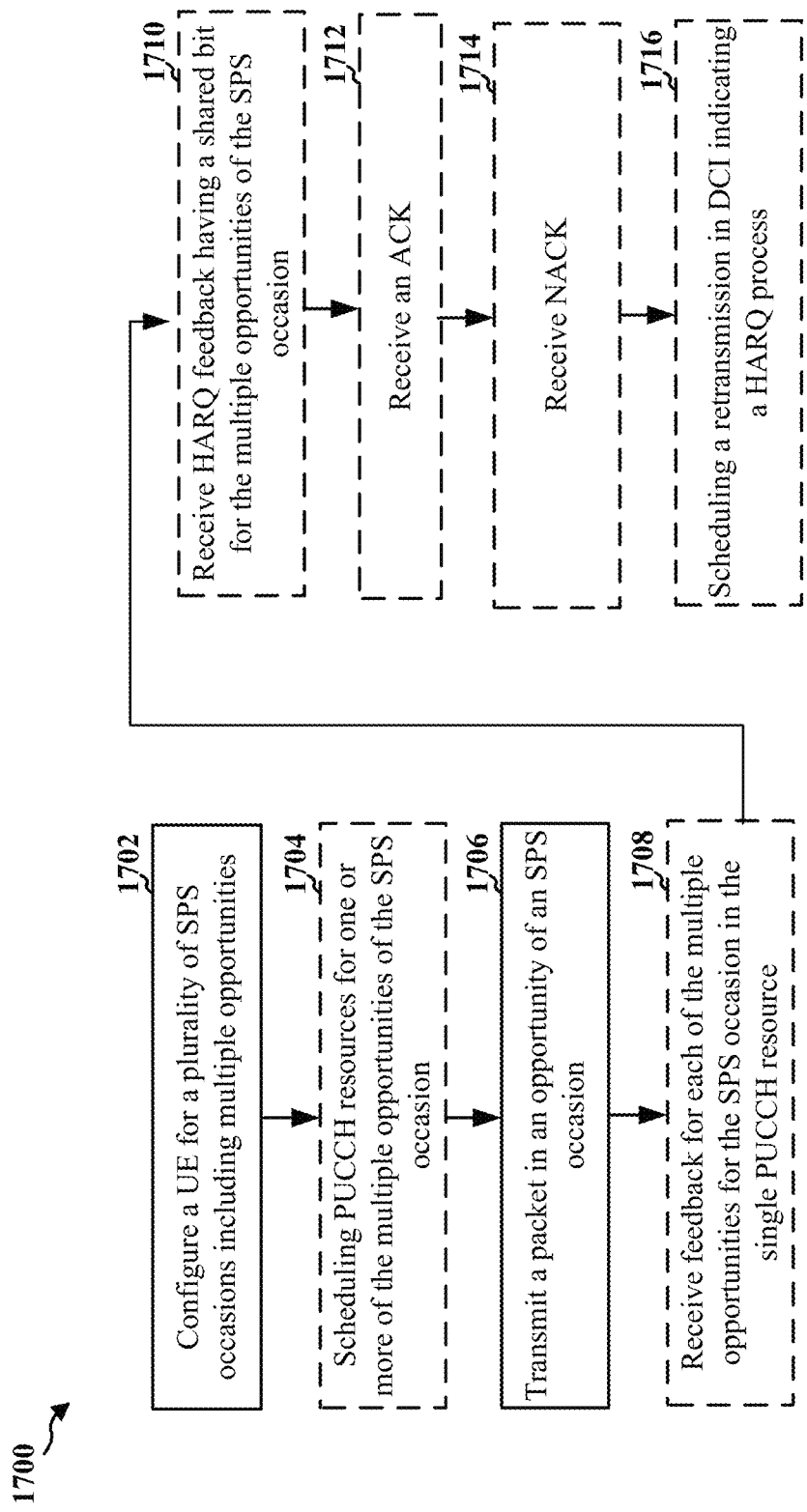
FIG. 17 is a flowchart of a method of wireless communication at a base station in accordance with aspects presented herein.

FIG. 17 is a flowchart 1700 of a method of wireless communication. The method may be performed by a base station or a component of a base station (e.g., the base station 102, 180, 310; a processing system, which may include the memory 376 and which may be the entire base station 310 or a component of the base station 310, such as the TX processor 316, the RX processor 370, and/or the controller/processor 375). Optional aspects are illustrated with a dashed line. The method improves the efficient use of resources for jittered periodic traffic.

At 1702, the base station configures a UE for a plurality of SPS occasions each SPS occasion including multiple opportunities for downlink transmission by the base station. The plurality of SPS occasions may be for a single SPS configuration. The multiple opportunities of the SPS occasion may be associated with a same HARQ process. In some examples, each of the multiple opportunities may correspond to a slot starting from an offset for the SPS occasion. For example, each SPS occasion may include multiple opportunities, such as described in connection with FIG. 7.

At 1706, the base station transmits a packet to the UE in an opportunity of an SPS occasion based on an arrival time of the packet. For example, the base station may transmit the packet to the UE in a single opportunity from the multiple opportunities of the SPS occasion.

In some examples, each of the multiple opportunities for the SPS occasion map to a single PUCCH resource for feedback, e.g., as described in connection with FIG. 8 or FIG. 9. In some examples, the base station receives HARQ feedback having at least one bit for each of the multiple opportunities for the SPS occasion, at 1708, such as described in connection with FIG. 8 or FIG. 9. The feedback may comprise HARQ feedback including at least one bit for each of the multiple opportunities for the SPS occasion. In some examples, the HARQ feedback may provide individual feedback for each of the opportunities of the SPS occasion, such as described in connection with FIG. 8. In other examples, the HARQ feedback may include a single bit that provides overall HARQ feedback for the opportunities of the SPS occasion, such as described in connection with FIG. 9.

As illustrated at 1716, the base station may schedule a retransmission in DCI indicating a HARQ process for the SPS occasion as an index for the retransmission, e.g., as described in connection with FIG. 9 and/or FIG. 15. In some examples, the DCI scheduling the retransmission may further include a time domain resource allocation for the retransmission that indicates the opportunity of the SPS occasion for the UE to use for a HARQ combination with the retransmission, e.g., as described in connection with FIG. 15.

As illustrated at 1710, the base station may receive HARQ feedback having a shared bit for the multiple opportunities of the SPS occasion. The HARQ feedback may include aspects described in connection with any of FIG. 9, 10, 12, 13, or 14.

As illustrated at 1704, the base station may schedule individual PUCCH resources for one or more of the multiple opportunities of the SPS occasion. FIGS. 10-14 illustrate various examples of PUCCH resources that include individual PUCCH resources for one or more of multiple opportunities of the SPS occasion. In some examples, the scheduling may provide the individual PUCCH resources for a subset of the multiple opportunities of the SPS occasion, such as in any of the examples in FIG. 10, 12, or 13. For example, the scheduling may provide one less individual PUCCH resource than a number of the multiple opportunities. In some examples, the individual PUCCH resources may be limited to use for positive acknowledgments, e.g., such as described in connection with any of FIGS. 10-14. In some examples, the base station may schedule an additional PUCCH resource following the SPS occasion. The additional PUCCH resource may comprise a different time, a different frequency, or a different format than the individual PUCCH resources, e.g., as described in connection with any of FIG. 10, 12, 13, or 14. In some examples, the base station may schedule individual PUCCH resources for each of the multiple opportunities of the SPS occasion, such as described in connection with FIG. 11 or FIG. 14. In some examples, the individual PUCCH resources may be limited to use for positive ACKs, e.g., and may be limited from use for NACKs. The base station may schedule a retransmission of the packet, e.g., at 1716, if a positive acknowledgment is not received in any of the individual PUCCH resources.

In some examples, at 1704, the base station may schedule the individual PUCCH resources that are limited to ACKs for a subset of the multiple opportunities of the SPS occasion and schedule a final PUCCH resource following a last opportunity of the SPS occasion for ACK/NACK, e.g., such as described in connection with any of FIGS. 12-14.

At 1712, the base station may receive an ACK in an individual PUCCH resource, if the downlink transmission is successfully received by the UE or may determine that the downlink transmission was not successfully received by the UE if the base station does not receive feedback, e.g., such as described in connection with FIG. 11.

At 1704, the base station may schedule s−1 individual PUCCH resources for individual opportunities of the SPS occasion, which are limited to positive ACKs and may schedule a single PUCCH resource following the SPS occasion for an ACK/NACK.

At 1712, the base station may receive a single ACK in an individual PUCCH resource or the last PUCCH resource if the downlink packet is successfully received or may receive a NACK in the last PUCCH resource if the downlink packet is not successfully received. FIG. 12 illustrates examples aspects of a single ACK or a single NACK.

At 1712, the base station may receive the ACK from the UE in an individual PUCCH resource and the final PUCCH resource. FIG. 13 illustrates an example in which the base station may receive the ACK multiple times, e.g., in an individual PUCCH resource and a final PUCCH resource.

The base station may schedule, at 1704, the individual PUCCH resources that are limited to ACKs for each of the multiple opportunities of the SPS occasion and may schedule an additional PUCCH resource following a last opportunity of the SPS occasion for an ACK/NACK, e.g., as described in connection with FIG. 14. In this example, the base station may receive an ACK in an individual PUCCH resource and the additional PUCCH resource, at 1714.

In some examples, the UE may adjust feedback based on whether the feedback is piggybacked in PUSCH. For example, the base station may schedule a PUCCH resource that is limited to positive ACKs for an opportunity of the SPS occasion. However, the base station receive a NACK from the UE multiplexed with a PUSCH and corresponding to the opportunity of the SPS occasion.

Each block in the aforementioned flowchart of FIG. 17 and/or the aspects that are performed by the base station in any of FIGS. 7-15 may be performed by a component of a base station apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the base station apparatus includes means for performing the method described in connection with FIG. 17 and/or the aspects performed by the base station in any of FIGS. 7-15. The aforementioned means may be one or more of the aforementioned components of an apparatus and/or a processing system of such an apparatus configured to perform the functions recited by the aforementioned means. The processing system may include a transmission processor, a reception processor, and a controller/processor. As such, in one configuration, the aforementioned means may be memory 360, such as the TX processor 368, the RX processor 356, and/or the controller/processor 359 configured to perform the functions recited by the aforementioned means.

Figure 18:
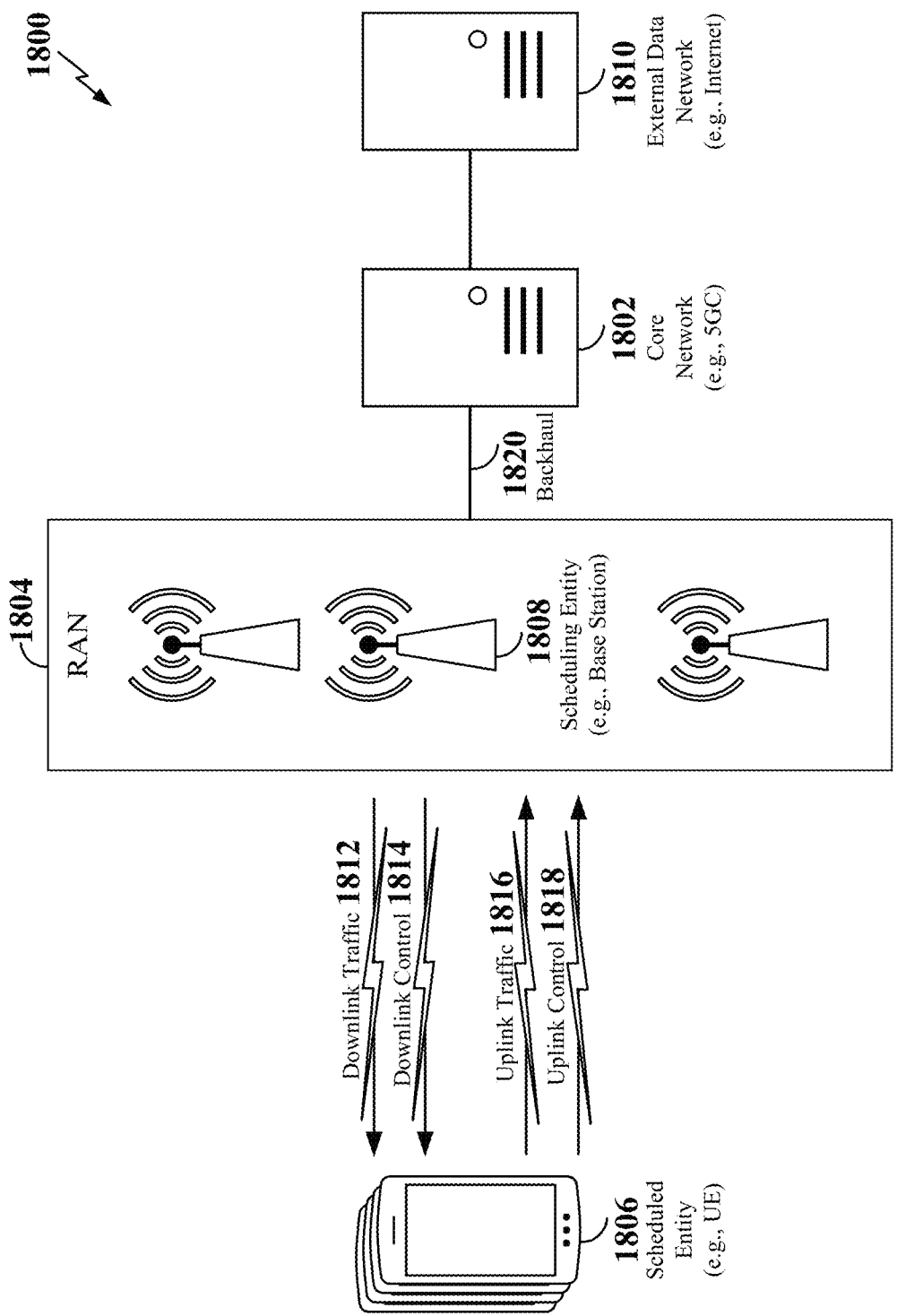
FIG. 18 is a schematic illustration of a wireless communication system according to some aspects of the disclosure.

FIG. 18 is a schematic illustration of a wireless communication system 1800 according to some aspects of the disclosure. The wireless communication system 1800 includes three interacting domains: a core network 1802, a radio access network (RAN) 1804, and at least one scheduled entity 1806. The at least one scheduled entity 1806 may be referred to as a user equipment (UE) 1806 in the discussion that follows. The RAN 1804 includes at least one scheduling entity 1808. The at least one scheduling entity 1808 may be referred to as a base station (BS) 1808 in the discussion that follows. By virtue of the wireless communication system 1800, the UE 1806 may be enabled to carry out data communication with an external data network 1810, such as (but not limited to) the Internet.

The RAN 1804 may implement any suitable wireless communication technology or technologies to provide radio access to the UE 1806. As one example, the RAN 1804 may operate according to $3^{rd}$ Generation Partnership Project (3GPP) New Radio (NR) specifications, often referred to as 5G. As another example, the RAN 1804 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 1804 includes a plurality of base stations 1808. Broadly, and as discussed above, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 1804 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 1804 and a UE 1806 may be described as utilizing an air interface. Transmissions over the air interface from a base station (e.g., base station 1808) to one or more UEs (e.g., UE 1806) may be referred to as downlink (DL) transmission. In accordance with certain aspects of the present disclosure, the term downlink may refer to a point-to-multipoint transmission originating at a scheduling entity (described further below; e.g., base station 1808). Another way to describe this scheme may be to use the term broadcast channel multiplexing. Transmissions from a UE (e.g., UE 1806) to a base station (e.g., base station 1808) may be referred to as uplink (UL) transmissions. In accordance with further aspects of the present disclosure, the term uplink may refer to a point-to-point transmission originating at a scheduled entity (described further below; e.g., UE 1806).

In some examples, access to the air interface may be scheduled, wherein a scheduling entity (e.g., a base station 1808) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 1806, which may be scheduled entities, may utilize resources allocated by the scheduling entity 1808.

Base stations 1808 are not the only entities that may function as scheduling entities. That is, in some examples, a UE may function as a scheduling entity, scheduling resources for one or more scheduled entities (e.g., one or more other UEs).

As illustrated in FIG. 18, a scheduling entity 1808 may broadcast downlink traffic 1812 to one or more scheduled entities 1806. Broadly, the scheduling entity 1808 is a node or device responsible for scheduling traffic in a wireless communication network, including the downlink traffic 1812 and, in some examples, uplink traffic 1816 from one or more scheduled entities 1806 to the scheduling entity 1808. On the other hand, the scheduled entity 1806 is a node or device that receives downlink control information 1814, including but not limited to scheduling information (e.g., a grant), synchronization or timing information, or other control information from another entity in the wireless communication network such as the scheduling entity 1808.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 1808 may include a backhaul interface for communication with a backhaul portion 1820 of the wireless communication system. The backhaul 1820 may provide a link between a base station 1808 and the core network 1802. Further, in some examples, a backhaul network may provide interconnection between the respective base stations 1808. Various types of backhaul interfaces may be employed, such as a direct physical connection, a virtual network, or the like using any suitable transport network.

The core network 1802 may be a part of the wireless communication system 1800, and may be independent of the radio access technology used in the RAN 1804. In some examples, the core network 1802 may be configured according to 5G standards (e.g., 5GC). In other examples, the core network 1802 may be configured according to a 4G evolved packet core (EPC), or any other suitable standard or configuration.

Figure 19:
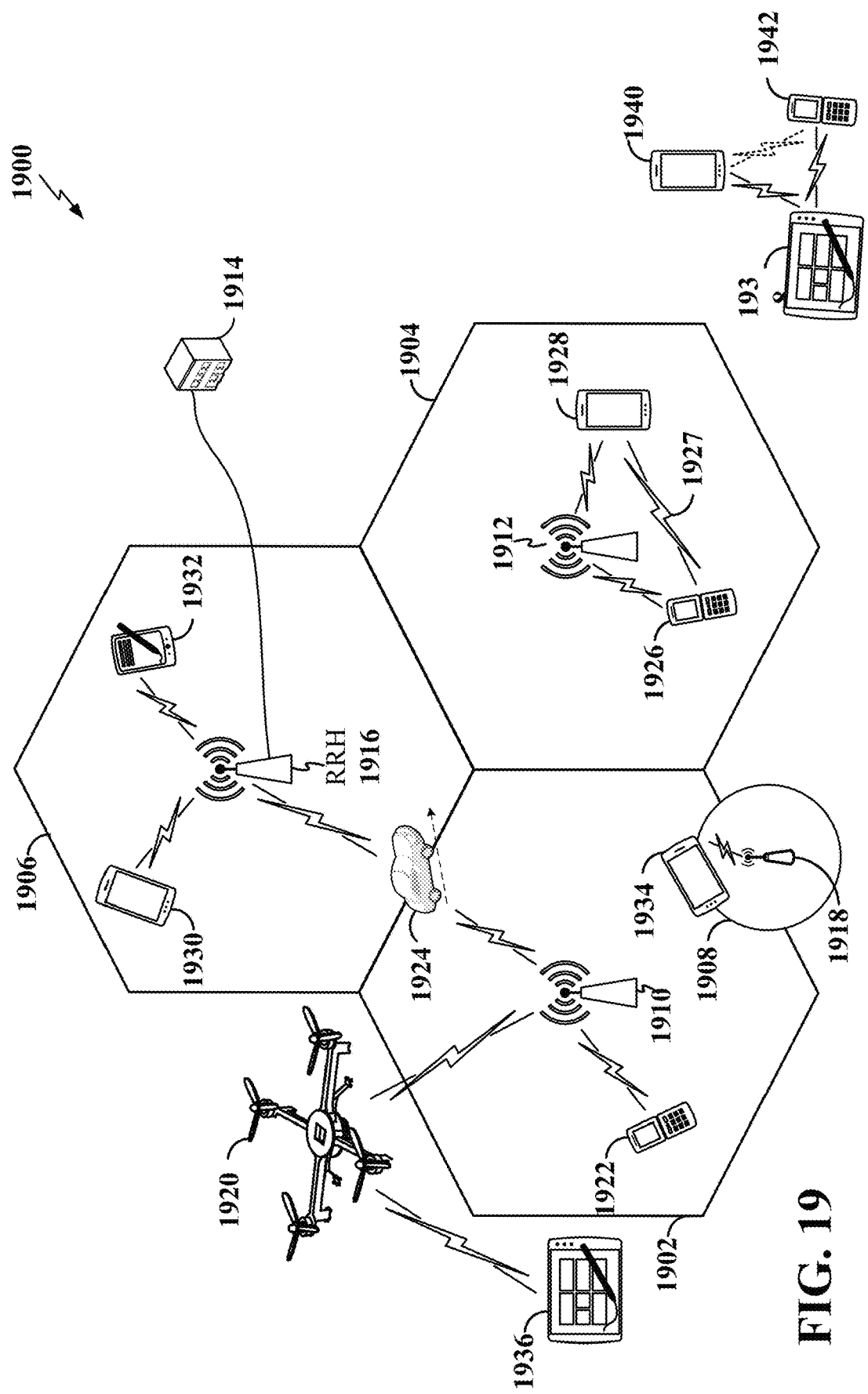
FIG. 19 is a conceptual illustration of an example of a radio access network (RAN) according to some aspects of the disclosure.

FIG. 19 is a conceptual illustration of an example of a radio access network (RAN) 1900 according to some aspects of the disclosure. In some examples, the RAN 1900 may be the same as the RAN 1804 described above and illustrated in FIG. 18. The geographic area covered by the RAN 1900 may be divided into cellular regions (cells) that can be uniquely identified by a user equipment (UE) based on an identification broadcasted from one access point or base station. FIG. 19 illustrates macrocells 1902, 1904, and 1906, and a small cell 1908, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 19, two base stations 1910 and 1912 are shown in cells 1902 and 1904; and a third base station 1914 is shown controlling a remote radio head (RRH) 1916 in cell 1906. That is, a base station can have an integrated antenna or can be connected to an antenna or RRH by feeder cables. In the illustrated example, the cells 1902, 1904, and 1906 may be referred to as macrocells, as the base stations 1910, 1912, and 1914 support cells having a large size. Further, a base station 1918 is shown in the small cell 1908 (e.g., a microcell, picocell, femtocell, home base station, home Node B, home eNode B, etc.) which may overlap with one or more macrocells. In this example, the cell 1908 may be referred to as a small cell, as the base station 1918 supports a cell having a relatively small size. Cell sizing can be done according to system design as well as component constraints.

It is to be understood that the radio access network 1900 may include any number of wireless base stations and cells. Further, a relay node may be deployed to extend the size or coverage area of a given cell. The base stations 1910, 1912, 1914, 1918 provide wireless access points to a core network for any number of mobile apparatuses. In some examples, the base stations 1910, 1912, 1914, and/or 1918 may be the same as the base station/scheduling entity 108 described above and illustrated in FIG. 18.

Within the RAN 1900, the cells may include UEs that may be in communication with one or more sectors of each cell. Further, each base station 1910, 1912, 1914, and 1918 may be configured to provide an access point to a core network (e.g., as illustrated in FIG. 1) for all the UEs in the respective cells. For example, UEs 1922 and 1924 may be in communication with base station 1910; UEs 1926 and 1928 may be in communication with base station 1912; UEs 1930 and 1932 may be in communication with base station 1914 by way of RRH 1916; and UE 1934 may be in communication with base station 1918. In some examples, the UEs 1922, 1924, 1926, 1928, 1930, 1932, 1934, 238, 1940, and/or 1942 may be the same as the UE/scheduled entity 1806 described above and illustrated in FIG. 18.

In some examples, an unmanned aerial vehicle (UAV) 1920, which may be a drone or quadcopter, can be a mobile network node and may be configured to function as a UE. For example, the UAV 1920 may operate within cell 1902 by communicating with base station 1910.

In a further aspect of the RAN 1900, sidelink signals may be used between UEs without necessarily relying on scheduling or control information from a base station. For example, two or more UEs (e.g., UEs 1926 and 1928) may communicate with each other using peer to peer (P2P) or sidelink signals 1927 without relaying that communication through a base station (e.g., base station 1912). In a further example, UE 1938 is illustrated communicating with UEs 1940 and 1942. Here, the UE 1938 may function as a scheduling entity or a primary sidelink device, and UEs 1940 and 1942 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 1940 and 1942 may optionally communicate directly with one another in addition to communicating with the UE 1938 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 1927 include sidelink traffic (e.g., a physical sidelink shared channel) and sidelink control (e.g., a physical sidelink control channel).

In the radio access network 1900, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 19) may include a security context management function (SCMF) that manages the security context for both the control plane and the user plane functionality, and a security anchor function (SEAF) that performs authentication.

A radio access network 1900 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 1924 (illustrated as a vehicle, although any suitable form of UE may be used) may move from the geographic area corresponding to its serving cell 1902 to the geographic area corresponding to a neighbor cell 1906. When the signal strength or quality from the neighbor cell 1906 exceeds that of its serving cell 1902 for a given amount of time, the UE 1924 may transmit a reporting message to its serving base station 1910 indicating this condition. In response, the UE 1924 may receive a handover command, and the UE may undergo a handover to the cell 1906.

In a network configured for UL-based mobility, UL reference signals from each UE may be utilized by the network to select a serving cell for each UE. In some examples, the base stations 1910, 1912, and 1914/1916 may broadcast unified synchronization signals (e.g., unified Primary Synchronization Signals (PSSs), unified Secondary Synchronization Signals (SSSs) and unified Physical Broadcast Channels (PBCH)). The UEs 1922, 1924, 1926, 1928, 1930, and 1932 may receive the unified synchronization signals, derive the carrier frequency and slot timing from the synchronization signals, and in response to deriving timing, transmit an uplink pilot or reference signal. The uplink pilot signal transmitted by a UE (e.g., UE 1924) may be concurrently received by two or more cells (e.g., base stations 1910 and 1914/1916) within the radio access network 1900. Each of the cells may measure a strength of the pilot signal, and the radio access network (e.g., one or more of the base stations 1910 and 1914/1916 and/or a central node within the core network) may determine a serving cell for the UE 1924. As the UE 1924 moves through the radio access network 1900, the network may continue to monitor the uplink pilot signal transmitted by the UE 1924. When the signal strength or quality of the pilot signal measured by a neighboring cell exceeds that of the signal strength or quality measured by the serving cell, the network 1900 may handover the UE 1924 from the serving cell to the neighboring cell, with or without informing the UE 1924.

Although the synchronization signal transmitted by the base stations 1910, 1912, and 1914/1916 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 1900 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 1900 may utilize one or more multiplexing and multiple access algorithms to enable simultaneous communication of the various devices. For example, 5G NR specifications provide multiple access for UL transmissions from UEs 1922 and 1924 to base station 1910, and for multiplexing for DL transmissions from base station 1910 to one or more UEs 1922 and 1924, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 1910 to UEs 1922 and 1924 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 1900 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancelation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 20:
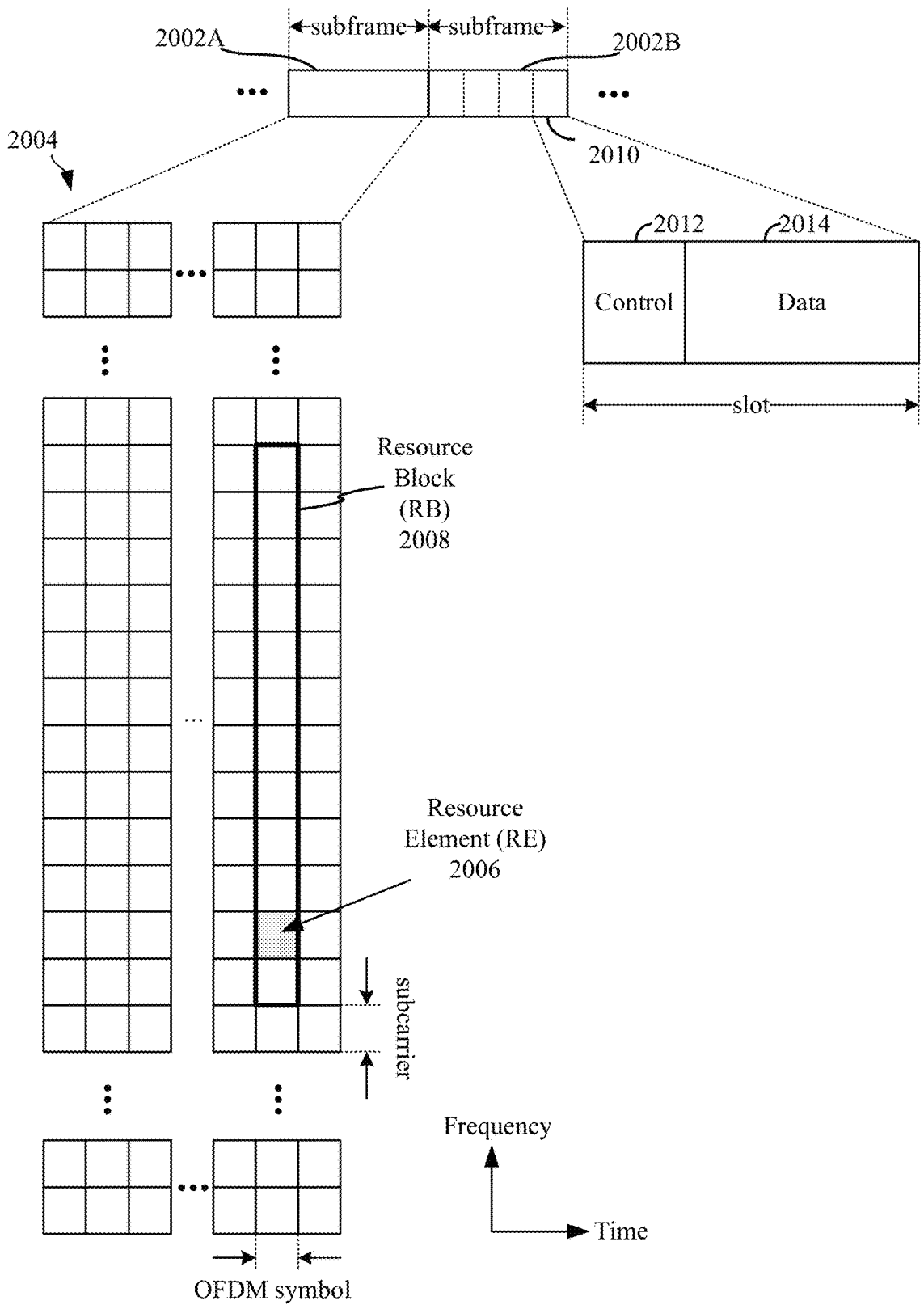
FIG. 20 is a schematic illustration of wireless resources in an air interface utilizing orthogonal frequency divisional multiplexing (OFDM) according to some aspects of the disclosure.

FIG. 20 is a schematic illustration of wireless resources in an air interface utilizing orthogonal frequency divisional multiplexing (OFDM) according to some aspects of the disclosure. In FIG. 20, an expanded view of an example DL subframe (SF) 2002A is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 2004 may be used to schematically represent time-frequency resources for a given antenna port. That is, in a multiple-input-multiple-output (MIMO) implementation with multiple antenna ports available, a corresponding multiple number of resource grids 2004 may be available for communication. The resource grid 2004 is divided into multiple resource elements (REs) 2006. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 2008, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 2008 entirely corresponds to a single direction of communication (either transmission or reception for a given device).

Scheduling of UEs (e.g., scheduled entities) for downlink or uplink transmissions typically involves scheduling one or more resource elements 2006 within one or more bandwidth parts (BWPs), where each BWP includes two or more contiguous or consecutive RBs. Thus, a UE generally utilizes only a subset of the resource grid 2004. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 2008 is shown as occupying less than the entire bandwidth of the subframe 2002A, with some subcarriers illustrated above and below the RB 2008. In a given implementation, the subframe 2002A may have a bandwidth corresponding to any number of one or more RBs 2008. Further, in this illustration, the RB 2008 is shown as occupying less than the entire duration of the subframe 2002A, although this is merely one possible example.

Each 1 ms subframe 2002A may consist of one or multiple adjacent slots. In the example shown in FIG. 20, one subframe 2002B includes four slots 2010, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 2010 illustrates the slot 2010 including a control region 2012 and a data region 2014. In general, the control region 2012 may carry control channels (e.g., PDCCH), and the data region 2014 may carry data channels (e.g., PDSCH or PUSCH). Of course, a slot may contain all DL, all UL, or at least one DL portion and at least one UL portion. The simple structure illustrated in FIG. 20 is merely exemplary in nature, and different slot structures may be utilized, and may include one or more of each of the control region(s) and data region(s).

Although not illustrated in FIG. 20, the various REs 2006 within a RB 2008 may be scheduled to carry one or more physical channels, including control channels, shared channels, data channels, etc. Other REs 2006 within the RB 2008 may also carry pilots or reference signals, including but not limited to a demodulation reference signal (DMRS) or a sounding reference signal (SRS). These pilots or reference signals may provide for a receiving device to perform channel estimation of the corresponding channel, which may enable coherent demodulation/detection of the control and/or data channels within the RB 2008.

In a DL transmission, the transmitting device (e.g., the scheduling entity) may allocate one or more REs 2006 (e.g., within a control region 2012) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 2006 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 2006 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 2006 (e.g., within the data region 2014) may be allocated for user data or traffic data. Such traffic may be carried on one or more traffic channels, such as, for a DL transmission, a PDSCH; or for an UL transmission, a physical uplink shared channel (PUSCH). In some examples, one or more REs 2006 within the data region 2014 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 18-20 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In some networks, a base station may use dynamic scheduling or semi-persistent scheduling (SPS) to schedule a UE. Dynamic scheduling may involve using a DCI to schedule an individual transmission or reception (e.g., on PDSCH or PUSCH). For example, a base station may use a first DCI to schedule a first PDSCH transmission, use a second DCI to schedule a second PDSCH transmission, and so on.

In contrast, for SPS, a base station may use a single DCI to schedule multiple transmissions (e.g., on PDSCH). In some implementations, a base station transmits an RRC message to configure an SPS (e.g., for a particular cell and a particular BWP). The base station may then send a DCI to activate the SPS.

The SPS configuration indicates an SPS periodicity between SPS occasions. In this way, the SPS configuration may schedule multiple SPS occasions at the indicated periodicity. In some examples, the periodicity may be referenced to a system frame number (SFN) and a sub-frame number of the DCI that initializes the SPS.

Thus, a UE can monitor the PDSCH at the SPS occasions according to the scheduled SPS periodicity to periodically obtain data from the base station. At some point in time, the base station may send a DCI to deactivate the SPS. In addition, the base station may send a DCI to reactivate the SPS.

The disclosure relates in some aspects to transmitting information in multiple communication opportunities of an SPS occasion. Here, an SPS occasion is defined to include multiple communication opportunities. For example, a given SPS occasion may be assigned several time slots (hereafter referred to simply as slots), where each communication occasion is associated with a corresponding one of the slots (or a corresponding subset of the slots). A base station may therefore transmit first information via a first communication opportunity of an SPS occasion and transmit second information via a second communication opportunity of that same SPS occasion. A wireless communication device (e.g., a UE) may blindly decode over all of the communication opportunities to recover information transmitted in any of the communication opportunities.

Figure 21:
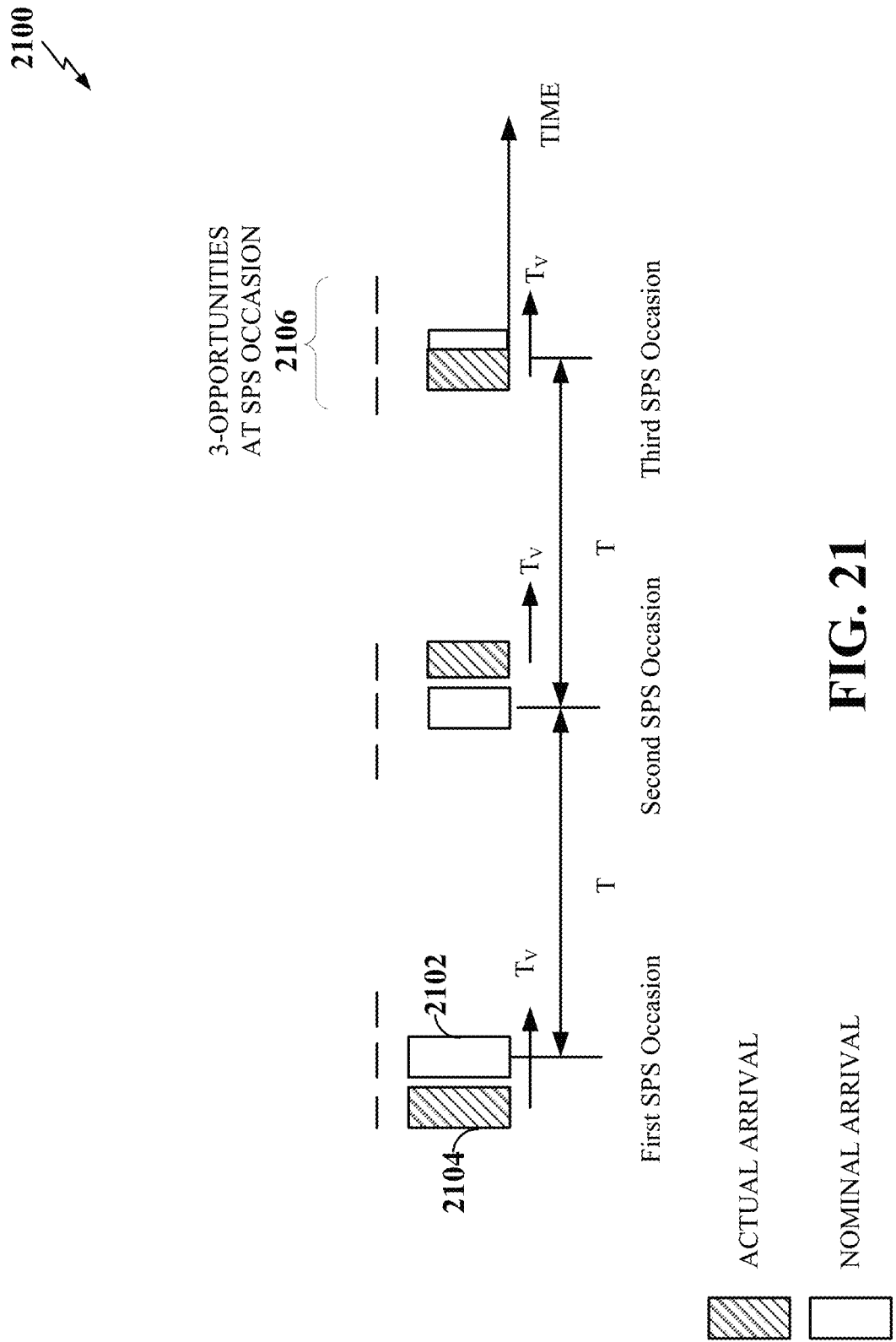
FIG. 21 is a conceptual illustration of an example of multiple communication opportunities of a semi-persistent scheduling (SPS) occasion according to some aspects of the disclosure.

FIG. 21 is a conceptual illustration of an example of multiple communication opportunities of an SPS occasion 2100 according to some aspects of the disclosure. Three SPS occasions are shown separated in time by a period of time T that is based on the configured SPS periodicity. DL traffic is scheduled by the SPS to arrive at a nominal arrival time (e.g., nominal arrival time 2102).

In practice, received data may be subject to jitter. FIG. 21 illustrates DL traffic with non-trivial jitter around a nominal arrival time and a low latency delivery requirement (within a window for delivery $T_V$). For example, a DL transmission may be received prior to the nominal arrival time (e.g., as illustrated by an actual arrival 2104), after the nominal arrival time, or partially overlapping with the nominal arrival time as illustrated. In a multiple-opportunity SPS, multiple communication opportunities are provided per SPS occasion for a UE to receive the DL traffic in a situation where the base station transmits according to a packet arrival over one communication opportunity (e.g., corresponding to the nominal arrival time).

As illustrated in FIG. 21, each SPS occasion is defined with (e.g., includes) three communication opportunities (e.g., as represented by the three lines 2106 for the third SPS occasion) in this example. A different number of communication opportunities could be used in other examples. A UE may decode over all three of the communication opportunities in FIG. 21 to receive the DL traffic. Thus, a UE will be able to successfully receive traffic within any of the three communication opportunities. Accordingly, a multiple-opportunity SPS may be used to accommodate jittered periodic DL traffic (e.g., as shown in FIG. 21).

A multiple-opportunity SPS may offer benefits over the use of multiple SPS configurations (e.g., where a base station establishes multiple SPS allocations, each of which is scheduled on different resources). For example, a multiple-opportunity SPS may use a smaller number of HARQ processes, use a smaller number of HARQ responses, and have lower overhead on RRC configurations and DCI activation/deactivation as compared to a scenario that uses multiple SPS configurations.

In some examples, the communication opportunities within an SPS occasion may be homogeneous in terms of radio resource allocation. For example, different communication opportunities within the same SPS occasion may have the same frequency domain resource allocation (FDRA), the same start and length indicator vector (SLIV), and the same MCS. This approach may be advantageous when transmitting a fixed-size packet with jittered arrival. For example, a smaller DCI (smaller number of bits) can be used for activation/re-activation since unique information is not needed for each communication opportunity.

The use of homogeneous radio resource allocations for different communication opportunities within an SPS occasion may provide other benefits as well. For example, listen-before-talk (LBT) uncertainties at a base station can be mitigated by allocating communication opportunities to different LBT bandwidth (BW) in the 5 GHz/6 GHz unlicensed band. In addition, more flexible scheduling can be supported (e.g., Frequency Range 2 (FR2) may be used) by allocating communication opportunities with different receive (RX) beams. Also, slot aggregation can be turned on over some communication opportunities for delivering ultra-reliably packets.

In some scenarios, a UE may need to carry more than one periodic flow. For example, an industrial IoT (IIoT) UE can be connected to more than one sensor and/or actuator. In addition, the associated concurrent traffic flows can have different periodicities and/or have different latency requirements.

The disclosure relates in some aspects to sending information over multiple communication opportunities of an SPS occasion. For example, a base station may transmit data on a first communication opportunity and a second communication opportunity of the same SPS occasion.

The disclosure also relates in some aspects, to sending information over multiple communication sub-opportunities for each SPS communication opportunity. This may be referred to as massive-opportunity SPS DL.

Figure 22:
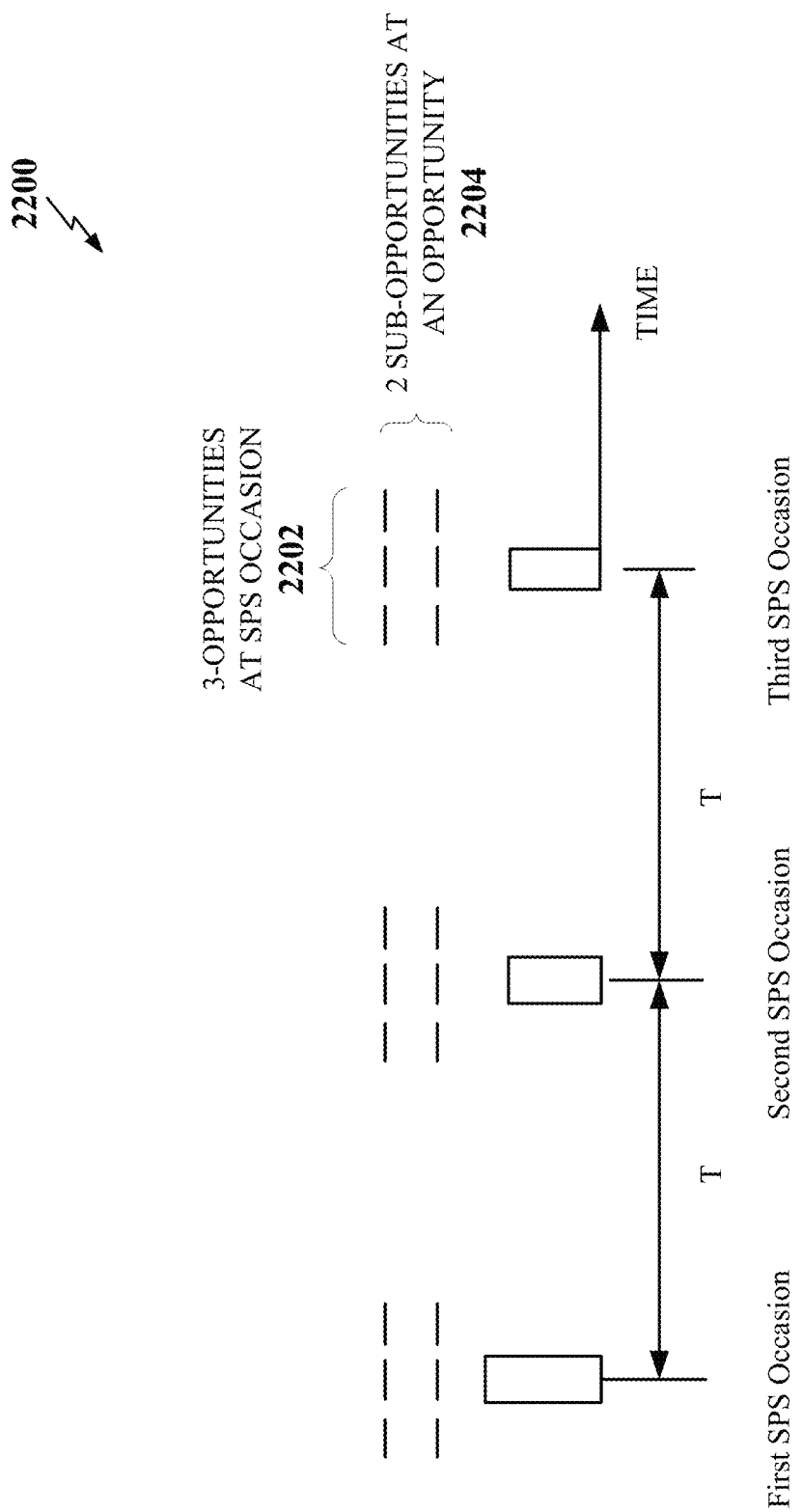
FIG. 22 is a conceptual illustration of an example of multiple communication opportunities and communication sub-opportunities of an SPS occasion according to some aspects of the disclosure.

FIG. 22 is a conceptual illustration of an example of multiple communication opportunities and communication sub-opportunities of SPS occasions 2200 according to some aspects of the disclosure. Similar to FIG. 21, each SPS occasion is defined with (e.g., includes) three communication opportunities (e.g., as represented by the three columns 2202 for the third SPS occasion) in this example. In addition, each communication opportunity is defined with (e.g., includes) two communication sub-opportunities (e.g., as represented by the two rows 2204 for the third SPS occasion)

A base station may transmit over any one or more of the communication opportunities. A UE may be configured via RRC to support a multiple-opportunity SPS DL. A parameter s (s≥1) may specify the number of communication opportunities starting from the offset in a given period.

In some examples, one HARQ process may be used per communication opportunity. A UE may perform blind decoding of the SPS PDSCH at each communication opportunity, and report s-bit ACK/NACK (A/N) feedback. Based on the A/N feedback, the base station can schedule a retransmission on a per-opportunity basis using dynamic grants (DGs).

In some examples, a base station may transmit one transport block (TB) per communication opportunity for an "opportunistic" massive opportunity. In some examples, a base station may transmit multiple TBs per communication opportunity for a massive opportunity. In some examples, a base station may transmit multiple transport blocks (TBs) over more than one communication opportunity in a SPS occasion.

As discussed herein, the use of communication opportunities may provide lower signaling overhead than other techniques. However, the use of communication opportunities may result in additional overhead associated with the per-opportunity HARQ process and per-opportunity A/N feedback. Nevertheless, the use of communication opportunities may still have lower RRC configuration (L3) overhead and lower DCI activation/re-activation (L1) overhead in comparison with multiple SPS configurations that require separate RRC messaging and DCIs for multiple SPS processes.

In some examples, the communication opportunities (e.g., for a given SPS or for a given SPS occasion) may be homogeneous. For example, the communication opportunities may share a common TDRA, a common FDRA (for FDM, including different component carriers), antenna ports and/or transmission configuration indicators (TCIs) (for spatial division multiplexing, SDM), or a combination thereof.

In some examples, the communication opportunities may be heterogeneous. The use of heterogeneous communication opportunities may involve the use of more bits in the activation/re-activation DCI than in the homogeneous scenario. Nevertheless, the L3 and L1 signaling overhead may still be lower than the L3 and L1 signaling overhead required by multiple SPS configurations.

Figure 23:
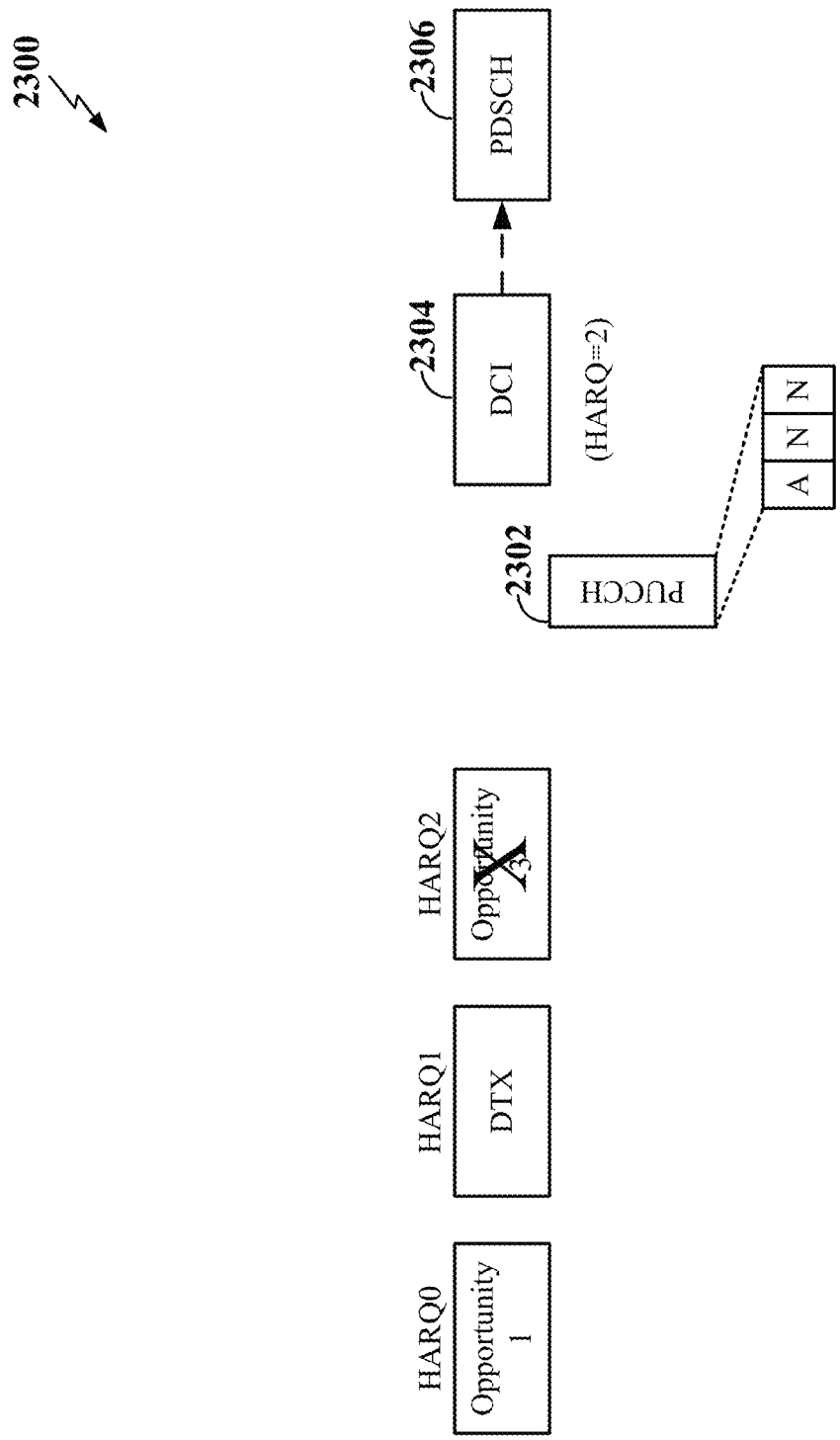
FIG. 23 is a conceptual illustration of an example of hybrid automatic repeat request (HARQ) processes for multiple communication opportunities of an SPS occasion according to some aspects of the disclosure.

FIG. 23 is a conceptual illustration of an example of hybrid automatic repeat request (HARQ) processes for multiple communication opportunities of an SPS occasion according to some aspects of the disclosure. Different HARQ processes (HARQ 0, HARQ 1, and HARQ 2) are used for the different communication opportunities. In this example, all of the communication opportunities are configured/activated with the same amount of radio resources for a homogeneous initial transmission. That is, the communication opportunities are simply shifted in time. In addition, the UE uses a single PUCCH to transmit s-bit A/N feedback.

In this example, the base station sends data via the first communication opportunity (opportunity 1) and the third communication opportunity (opportunity 3). The second communication opportunity is a discontinuous transmission (DTX). Since the UE was able to decode the first communication opportunity but was unable to decode the second and third communication opportunities, the UE sends corresponding (A/N) feedback in the PUCCH 2302 as shown in FIG. 23. In response, the base station schedules a retransmission for the third communication opportunity. Specifically, the base station sends a DCI 2304 that schedules the retransmission for HARQ2 in a PDSCH 2306.

Figure 24:
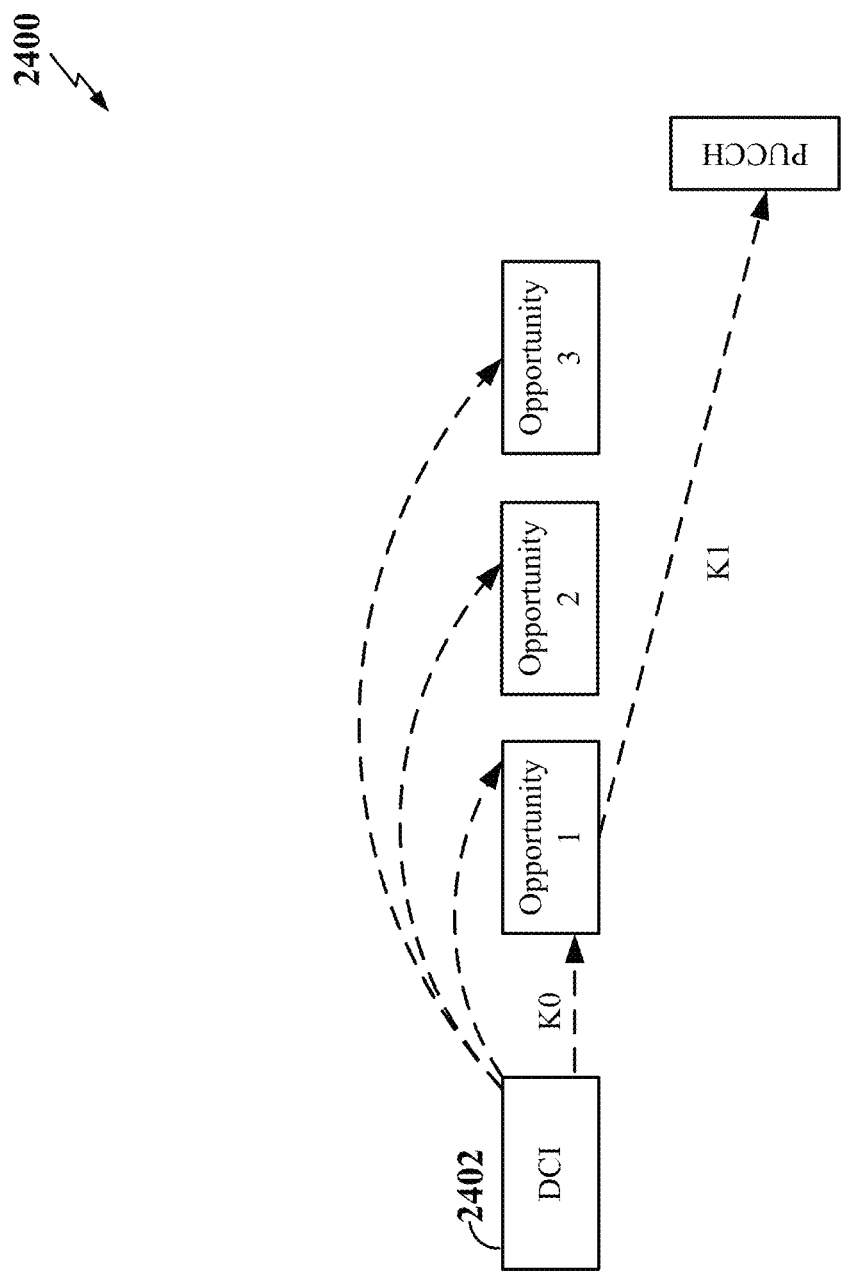
FIG. 24 is a conceptual illustration of an example of a downlink control information (DCI) activating/re-activating multiple communication opportunities of an SPS occasion according to some aspects of the disclosure.

The multi-opportunity SPS of FIG. 23 may be activated/de-activated by a compact-size DCI. FIG. 24 is a conceptual illustration of an example of a DCI activating/re-activating multiple communication opportunities of an SPS occasion according to some aspects of the disclosure. In this example, the SLIV applies to all s slots (i.e., all communication opportunities use the same SLIV) starting from the slot indicated by K0 in the SPS activation DCI 2402. In addition, the communication opportunities use the same FDRA, the same MCS(s), and the same TCI in this example. The indicated K1 timing can be with respect to the first communication opportunity (as shown in FIG. 24) or the last communication opportunity.

Figure 25:
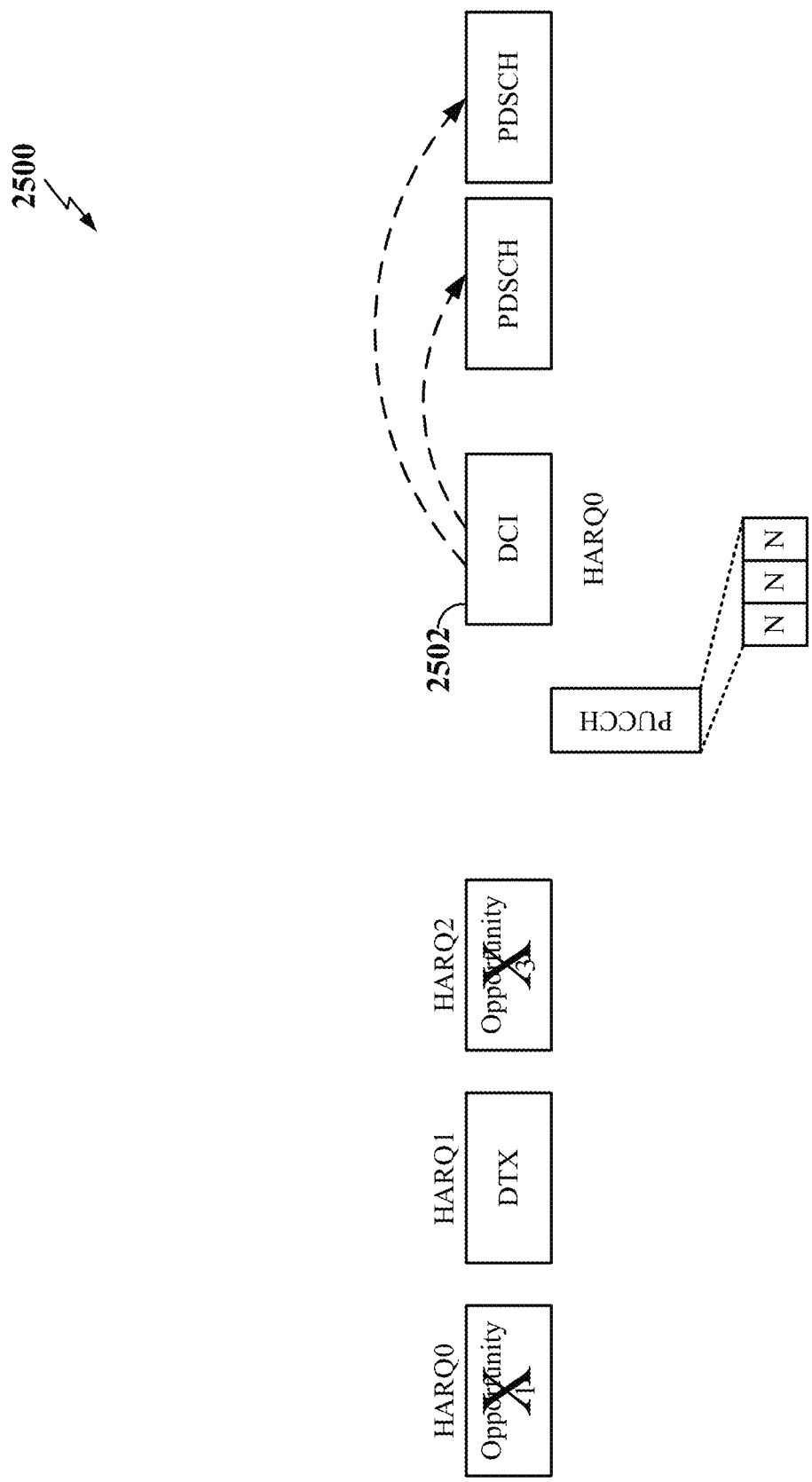
FIG. 25 is a conceptual illustration of an example of HARQ feedback and HARQ retransmission scheduling for multiple communication opportunities in an SPS occasion according to some aspects of the disclosure.

FIG. 25 is a conceptual illustration of an example of HARQ feedback and HARQ retransmission scheduling for multiple communication opportunities in an SPS occasion according to some aspects of the disclosure. After receiving multiple NACKs, a base station can use a composite DCI 2502 to schedule multiple PDSCH retransmissions. To reduce overhead, the composite DCI 2502 may have a single CRC, a common MCS (e.g., since the retransmissions are towards the same UE), a common FDRA, a common TCI, and/or the same SLIV in different slots.

The DCI 2502 may include an incremental HARQ process ID wrap-around within the HARQ process ID space of the SPS. The DCI 2502 may include a new data indicator (NDI) to indicate which communication opportunity is retransmitted due to the continuous HARQ ID restriction. This may assume a pre-configured redundancy vector (RV) sequence. In the example of FIG. 25, 4 bits (e.g., 2 bits for HARQ process ID=0 and 2 bits for the NDI-based retransmission indication for remaining HARQ processes) may be used to indicate a retransmission to HARQ 0 and to HARQ2.

Figure 26:
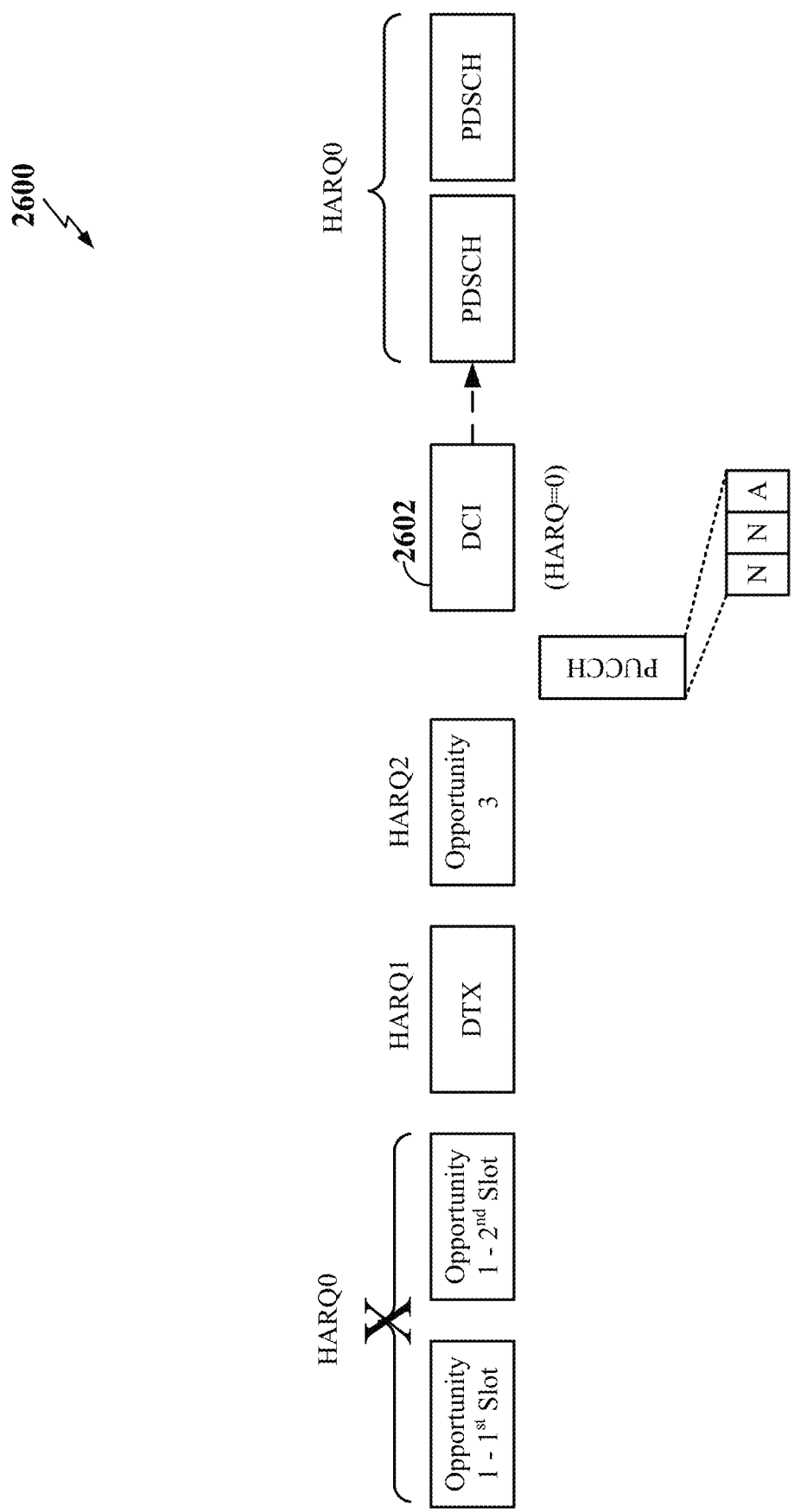
FIG. 26 is a conceptual illustration of an example of a HARQ process covering a multi-slot communication opportunity of an SPS occasion according to some aspects of the disclosure.

As an alternative to the homogeneous approach of FIG. 25, an SPS may have heterogeneous (with respect to the radio resource allocation) communication opportunities within an SPS occasion. FIG. 26 is a conceptual illustration of an example of a HARQ process (HARQ0 in this example) covering a multi-slot communication opportunity of an SPS occasion according to some aspects of the disclosure. In particular, FIG. 26 illustrates that the first communication opportunity supports slot-aggregation over two slots. Slot-aggregation over more than two slots could be used as well.

In the example of FIG. 26, a retransmission DG (e.g., in the DCI 2602) for the same HARQ ID may apply the same-level of slot aggregation. Other examples of heterogenous operation include the use of different MCSs, or the use of different SLIVs, or both. In some aspects, heterogenous operation may involve the use of a larger DCI for activation/re-activation (e.g., to specify different parameters for different communication opportunities).

Figure 27:
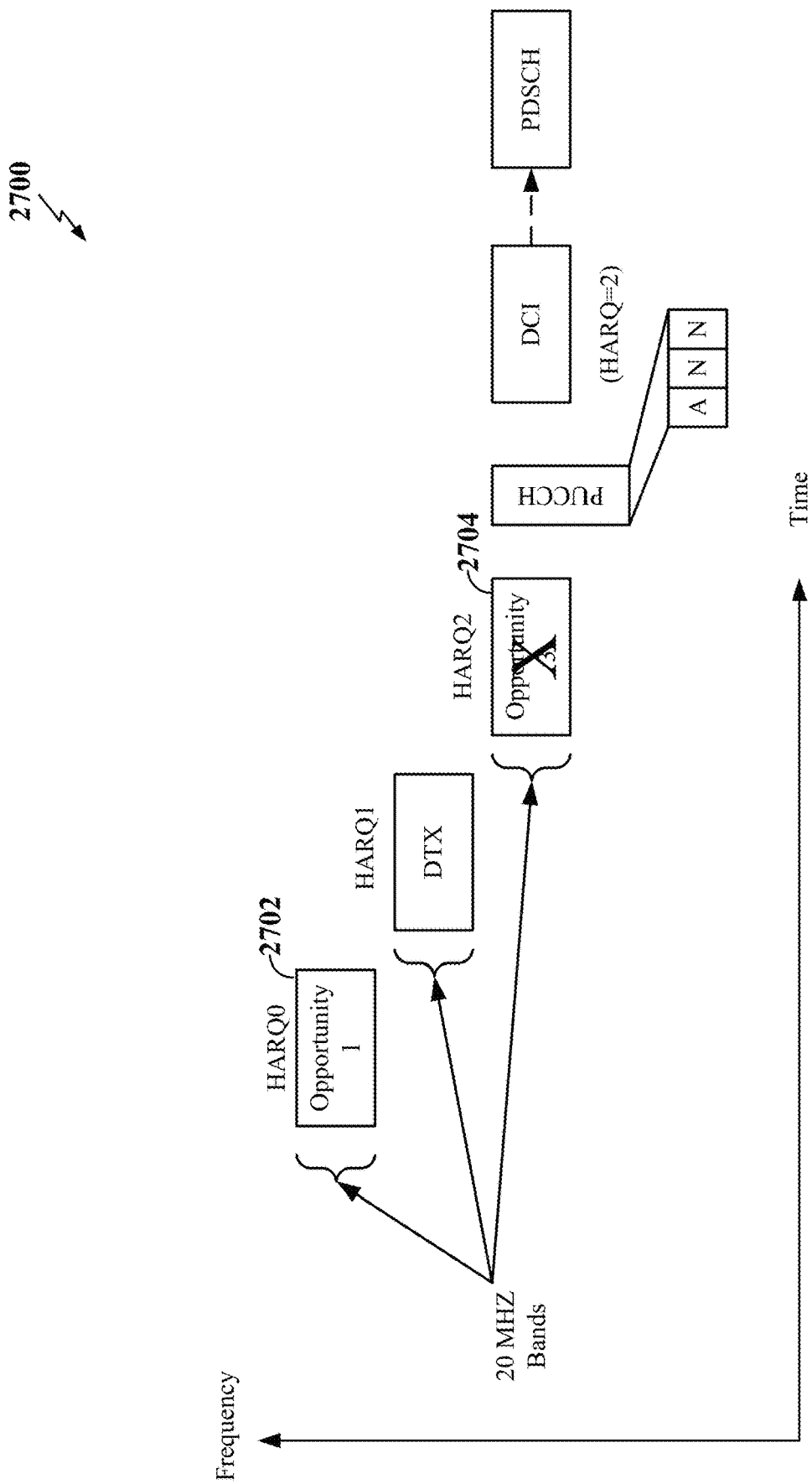
FIG. 27 is a conceptual illustration of an example of transmitting different communication opportunities of an SPS occasion via different radio frequency (RF) bands according to some aspects of the disclosure.

NR operation in an unlicensed band may be referred to as NR-U. For a reduced capability NR-U UE with an operating BW≤20 MHz and served by a wide-band (e.g., 80 MHz BW) base station, the communication opportunities of an SPS occasion can be heterogeneous with respect to the transmission frequency band. By using different LBT bandwidth for the communication opportunities, listen-before-talk (LBT) uncertainty at the base station may be mitigated. The FDRAs (e.g., the frequency bands) of the respective communication opportunities may be set/reset by the DCI activation/re-activation. FIG. 27 is a conceptual illustration of an example of transmitting different communication opportunities of an SPS occasion via different radio frequency (RF) bands according to some aspects of the disclosure. In this example, a base station transmits communication opportunity 1 2702 in one RF band and transmits communication opportunity 3 2704 in another RF band. Thus, for different communication opportunities, a UE may monitor different RF bands.

Figure 28:
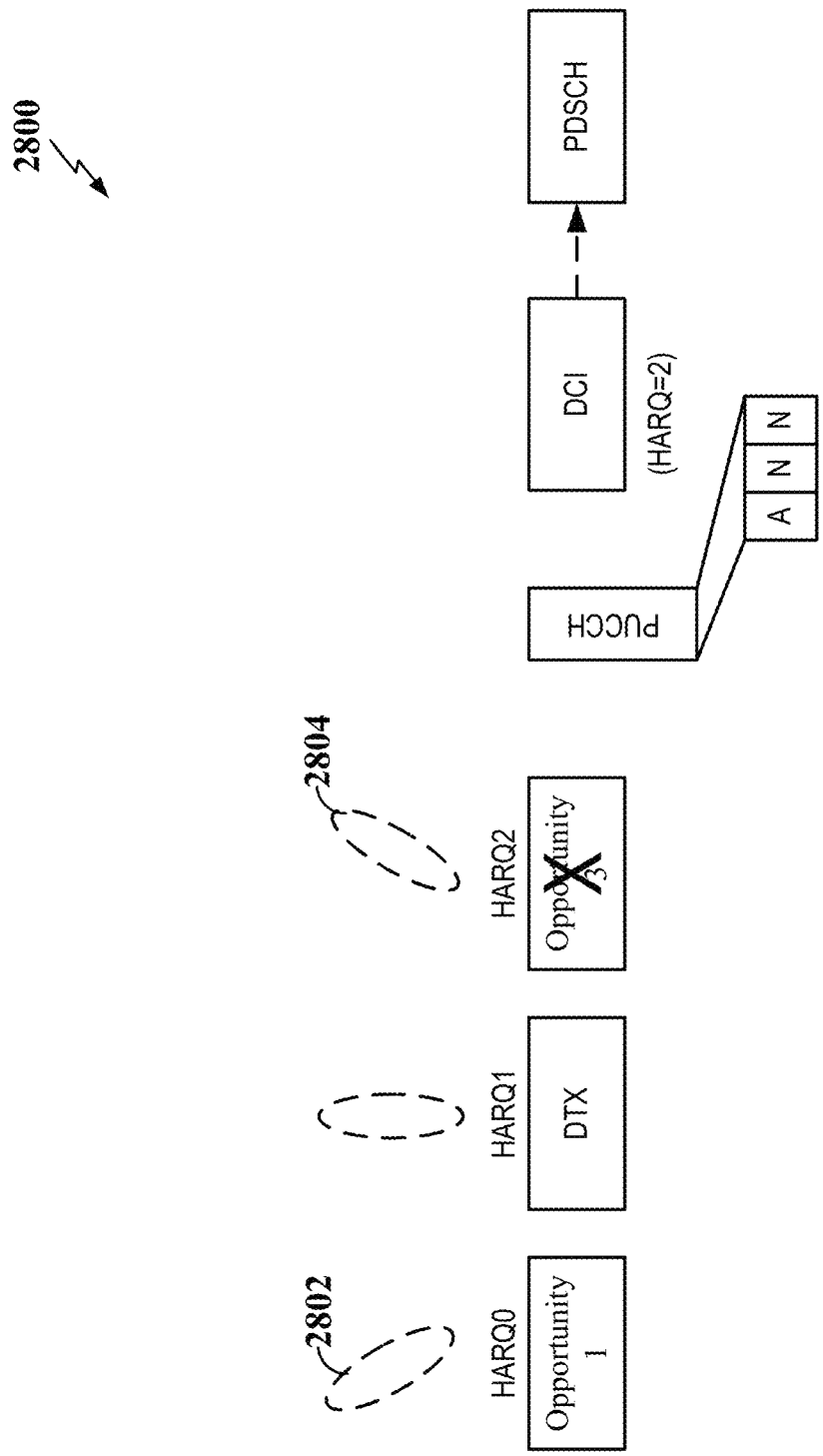
FIG. 28 is a conceptual illustration of an example of transmitting different communication opportunities of an SPS occasion via different RF beams according to some aspects of the disclosure.

For a UE in FR2 (or some other mmW band), the communication opportunities of an SPS occasion can be heterogenous in the spatial domain (e.g., a UE can tune to different beams transmitted by the base station). The beams to be used may be set/reset by DCI activations/re-activations. FIG. 28 is a conceptual illustration of an example of transmitting different communication opportunities of an SPS occasion via different RF beams according to some aspects of the disclosure. In this example, a base station transmits communication opportunity 1 via a one RF beam 2802 and transmits communication opportunity 3 via another RF beam 2804. Thus, for different communication opportunities, a UE may monitor different spatial domains.

As discussed above, the disclosure relates in some aspects to the use of communication sub-opportunities. For example, t (t≥1) sub-opportunities may be defined per communication opportunity. Among t communication sub-opportunities, a base station may elect to transmit on one of the sub-opportunities per communication opportunity in some examples. A base station may elect to transmit on more than one of the sub-opportunities per communication opportunity in other examples. For each communication opportunity, a UE may perform blind decoding at each sub-opportunity. In some examples, a UE may select the sub-opportunity with the largest likelihood of PDSCH decoding for HARQ combination.

Through the use of communication sub-opportunities, a UE may be configured with a massive-opportunity DL SPS. A base station may transmit a TB over any sub-opportunity (not being limited to one). One HARQ process may be used for each sub-opportunity. A UE may report s*t A/Ns per SPS occasion.

The above communication sub-opportunities may be allocated with different FDRAs. This may be used for frequency domain diversity (including different component carriers (CCs)). For example, different communication sub-opportunities may be used at different LBT BWs to mitigate LBT un-certainties in the unlicensed band. A DCI may be sent over a CC to activate/re-activate communication sub-opportunities in other CCs. The communication sub-opportunities discussed herein may be allocated to different beams (e.g., through the use of different antenna ports or different TCIs). The communication sub-opportunities discussed herein be allocated to different FDRAs and different beams.

Figure 29:
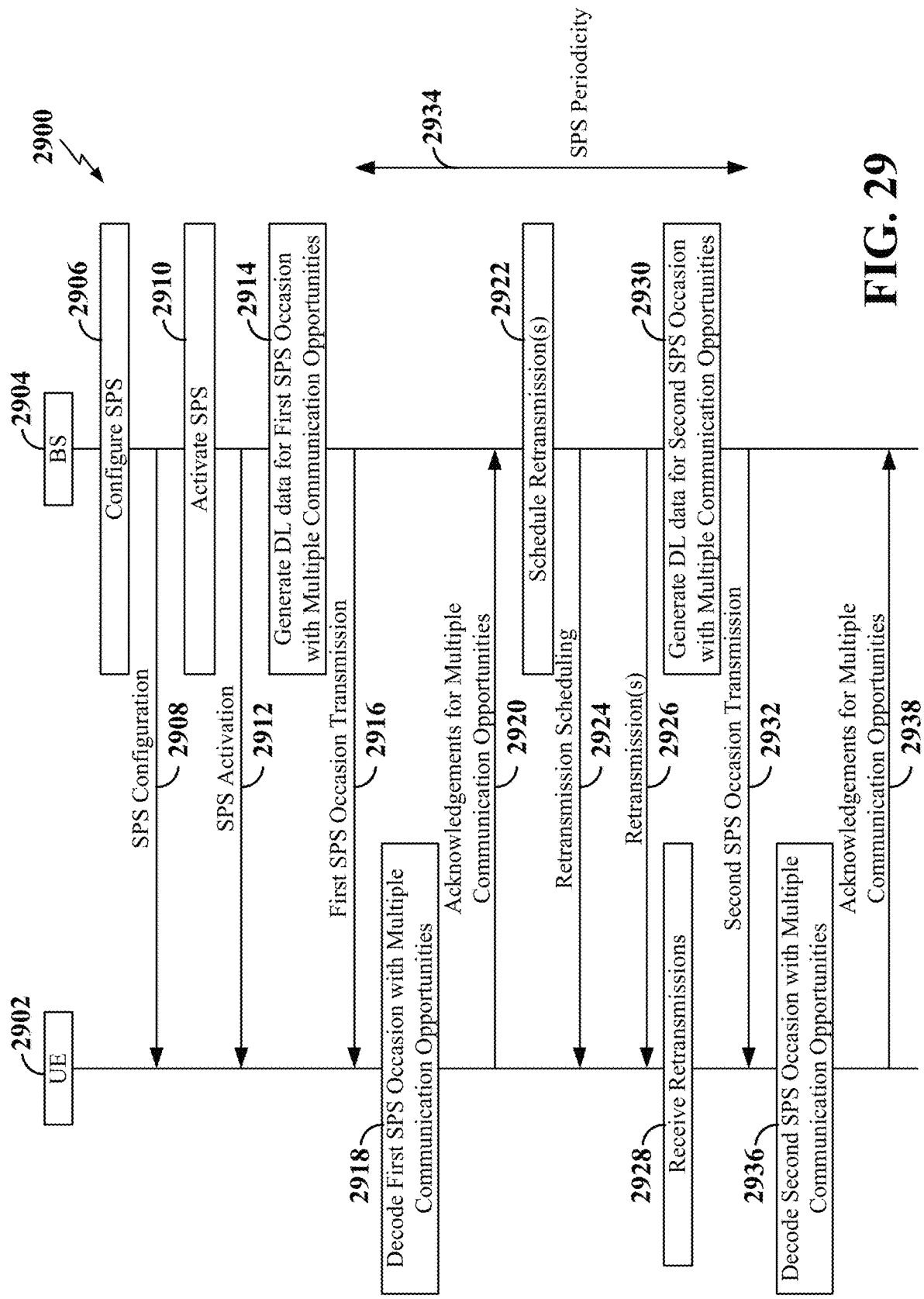
FIG. 29 is a signaling diagram illustrating SPS communication according to some aspects of the disclosure.

FIG. 29 is a signaling diagram illustrating SPS communication 2900 in a wireless communication network including a UE 2902 and a BS 2904. In some examples, the UE 2902 may correspond to one or more of the scheduled entity 1826 (e.g., a UE, etc.) of FIG. 18, or the UE 1922, 1924, 1926, 1928, 1930, 1932, 1934, 1938, 1940, or 1942 of FIG. 19. In some examples, the BS 2904 may correspond to one or more of the scheduling entity 1828 of FIG. 18, or the base station 1910, 1912, 1914, or 1916 of FIG. 19.

At step 2906 of FIG. 29, the BS 2904 configures an SPS. In some examples, the SPS configuration may specify that each SPS occasion includes multiple communication opportunities.

At step 2908, the BS 2904 transmits an RRC message that includes the SPS configuration.

At step 2910, the BS 2904 activates the SPS.

At step 2912, the BS 2904 sends a DCI to the UE 2902 indicating that the configured SPS is being activated. In some examples, the DCI may specify that data may be sent in multiple communication opportunities of an SPS occasion.

At step 2914, the BS 2904 generates DL data for a first SPS occasion that includes multiple communication opportunities.

At step 2916, the BS 2904 transmits the first SPS occasion. The first SPS occasion includes data in multiple communication opportunities (e.g., as discussed herein).

At step 2918, the UE 2902 decodes the first SPS occasion and determines whether each communication opportunity was successfully decoded. For example, the UE 1932 (FIG. 19) may conduct a separate HARQ process for each communication opportunity.

At step 2920, the UE 2902 sends a PUCCH message that includes a corresponding acknowledgement (e.g., a positive acknowledgement (ACK) or a negative acknowledgement (NACK) for each communication opportunity.

At step 2922, if the PUCCH included any NACKs, the BS 2904 schedules a retransmission for each corresponding communication opportunity.

At step 2924, if applicable, the BS 2904 sends a DCI that schedules a corresponding retransmission for each communication opportunity that was NACKed.

At step 2926, if applicable, the BS 2904 transmits each scheduled retransmission (e.g., on PDSCH).

At step 2928, if applicable, the UE 2902 receives and decodes each scheduled retransmission (e.g., on PDSCH). The above HARQ process may repeat, as need, if the UE 2902 has not successfully decoded all of the communication opportunities that include data.

At step 2930, the BS 2904 generates DL data for a second SPS occasion that includes multiple communication opportunities.

At step 2932, the BS 2904 transmits the second SPS occasion. The second SPS occasion includes data in multiple communication opportunities (e.g., as discussed herein). As represented by the line 2934, the BS 2904 transmits the second SPS occasion (relative to the first SPS occasion) according to the SPS periodicity specified by the SPS configuration.

At step 2936, the UE 2902 decodes the second SPS occasion and determines whether each communication opportunity was successfully decoded. Again, the UE 1032 may conduct a separate HARQ process for each communication opportunity.

At step 2938, the UE 2902 sends a PUCCH message that include a corresponding acknowledgement (e.g., an ACK or a NACK) for each communication opportunity.

Figure 30:
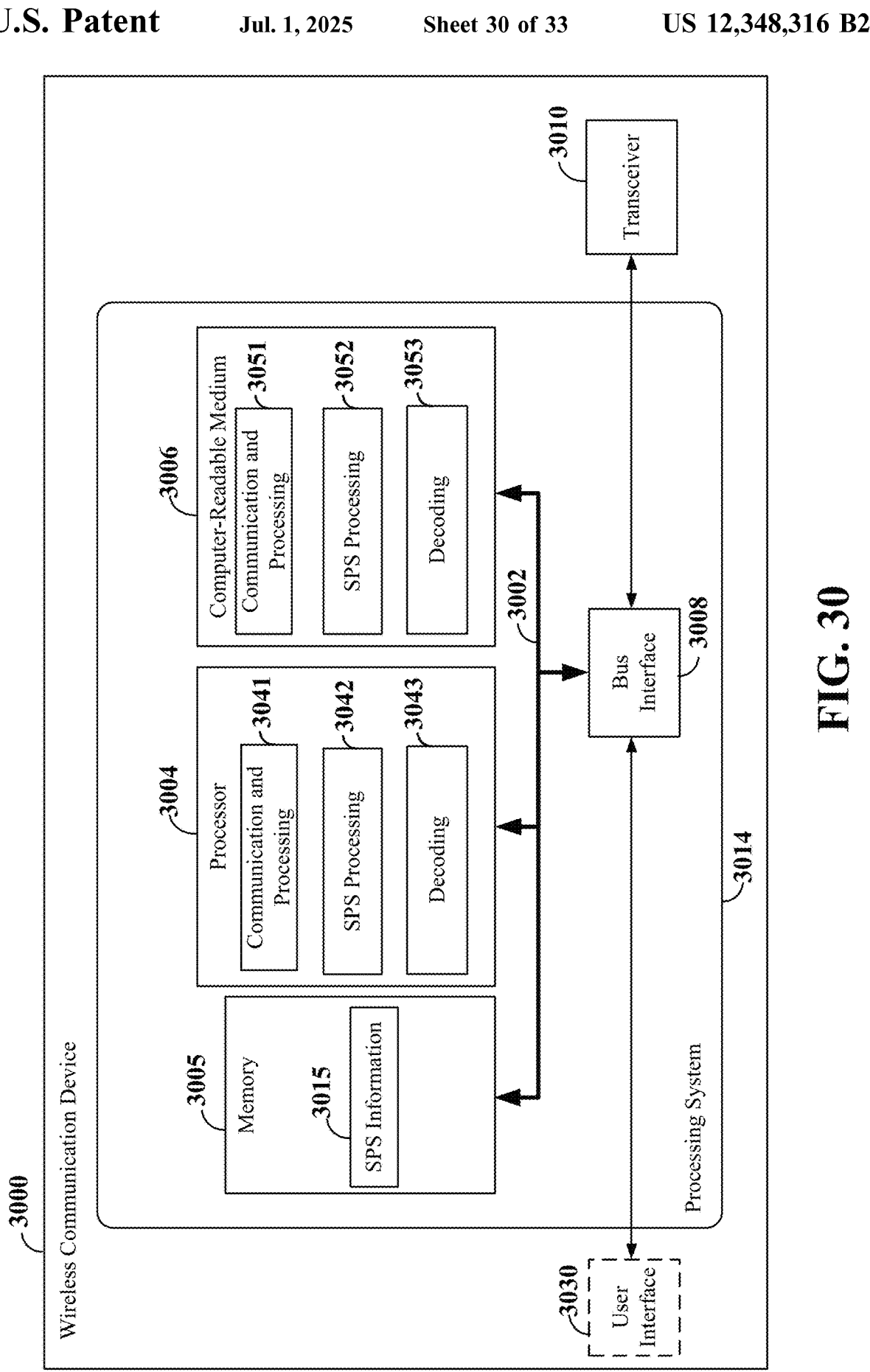
FIG. 30 is a block diagram conceptually illustrating an example of a hardware implementation for a wireless communication device employing a processing system according to some aspects of the disclosure.

FIG. 30 is a diagram illustrating an example of a hardware implementation for a wireless communication device 3000 employing a processing system 3014. For example, the wireless communication device 3000 may be a user equipment (UE) or other device configured to wirelessly communicate with a base station, as discussed in any one or more of FIGS. 18-29. In accordance with various aspects of the disclosure, an element, or any portion of an element, or any combination of elements may be implemented with a processing system 3014 that includes one or more processors 3004. In some implementations, the wireless communication device 3000 may correspond to one or more of the scheduled entity 1806 (e.g., a UE, etc.) of FIG. 19, the UE 1922, 1924, 1926, 1928, 1930, 1932, 1934, 1938, 1940, or 1942 of FIG. 19, or the UE 1902 of FIG. 19.

The wireless communication device 3000 may be implemented with a processing system 3014 that includes one or more processors 3004. Examples of processors 3004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 3000 may be configured to perform any one or more of the functions described herein. That is, the processor 3004, as utilized in a wireless communication device 3000, may be used to implement any one or more of the processes and procedures described below.

In this example, the processing system 3014 may be implemented with a bus architecture, represented generally by the bus 3002. The bus 3002 may include any number of interconnecting buses and bridges depending on the specific application of the processing system 3014 and the overall design constraints. The bus 3002 communicatively couples together various circuits including one or more processors (represented generally by the processor 3004), a memory 3005, and computer-readable media (represented generally by the computer-readable medium 3006). The bus 3002 may also link various other circuits such as timing sources, peripherals, voltage regulators, and power management circuits, which are well known in the art, and therefore, will not be described any further. A bus interface 3008 provides an interface between the bus 3002 and a transceiver 3010 and between the bus 3002 and an interface 3030. The transceiver 3010 provides a communication interface or means for communicating with various other apparatus over a wireless transmission medium. In some examples, the wireless communication device may include two or more transceivers 3010, each configured to communicate with a respective network type (e.g., terrestrial or non-terrestrial). The interface 3030 provides a communication interface or means of communicating with various other apparatuses and devices (e.g., other devices housed within the same apparatus as the wireless communication device or other external apparatuses) over an internal bus or external transmission medium, such as an Ethernet cable. Depending upon the nature of the apparatus, the interface 3030 may include a user interface (e.g., keypad, display, speaker, microphone, joystick). Of course, such a user interface is optional, and may be omitted in some examples, such as an IoT device.

The processor 3004 is responsible for managing the bus 3002 and general processing, including the execution of software stored on the computer-readable medium 3006. The software, when executed by the processor 3004, causes the processing system 3014 to perform the various functions described below for any particular apparatus. The computer-readable medium 3006 and the memory 3005 may also be used for storing data that is manipulated by the processor 3004 when executing software.

One or more processors 3004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 3006.

The computer-readable medium 3006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 3006 may reside in the processing system 3014, external to the processing system 3014, or distributed across multiple entities including the processing system 3014. The computer-readable medium 3006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 3000 may be configured to perform any one or more of the operations described herein (e.g., as described above in conjunction with FIGS. 18-29 and as described below in conjunction with FIG. 31). In some aspects of the disclosure, the processor 3004, as utilized in the wireless communication device 3000, may include circuitry configured for various functions.

The processor 3004 may include communication and processing circuitry 3041. The communication and processing circuitry 3041 may include one or more hardware components that provide the physical structure that performs various processes related to wireless communication (e.g., signal reception and/or signal transmission) as described herein. The communication and processing circuitry 3041 may further include one or more hardware components that provide the physical structure that performs various processes related to signal processing (e.g., processing a received signal and/or processing a signal for transmission) as described herein. In some examples, the communication and processing circuitry 3041 may include two or more transmit/receive chains, each configured to process signals in a different RAT (or RAN) type. The communication and processing circuitry 3041 may further be configured to execute communication and processing software 3051 included on the computer-readable medium 3006 to implement one or more functions described herein.

In some implementations where the communication involves receiving information, the communication and processing circuitry 3041 may obtain information from a component of the wireless communication device 3000 (e.g., from the transceiver 3010 that receives the information via radio frequency signaling or some other type of signaling suitable for the applicable communication medium), process (e.g., decode) the information, and output the processed information. For example, the communication and processing circuitry 3041 may output the information to another component of the processor 3004, to the memory 3005, or to the bus interface 3008. In some examples, the communication and processing circuitry 3041 may receive one or more of signals, messages, other information, or any combination thereof. In some examples, the communication and processing circuitry 3041 may receive information via one or more channels. In some examples, the communication and processing circuitry 3041 may include functionality for a means for receiving.

In some implementations where the communication involves sending (e.g., transmitting) information, the communication and processing circuitry 3041 may obtain information (e.g., from another component of the processor 3004, the memory 3005, or the bus interface 3008), process (e.g., encode) the information, and output the processed information. For example, the communication and processing circuitry 3041 may output the information to the transceiver 3010 (e.g., that transmits the information via radio frequency signaling or some other type of signaling suitable for the applicable communication medium). In some examples, the communication and processing circuitry 3041 may send one or more of signals, messages, other information, or any combination thereof. In some examples, the communication and processing circuitry 3041 may send information via one or more channels. In some examples, the communication and processing circuitry 3041 may include functionality for a means for sending (e.g., means for transmitting).

The processor 3004 may include SPS processing circuitry 3042 configured to perform SPS processing-related operations as discussed herein (e.g., determining the configuration of the communication opportunities or sub-opportunities to be used per SPS occasion). The SPS processing circuitry 3042 may include functionality for a means for receiving an SPS message. The SPS processing circuitry 3042 may further be configured to execute SPS processing software 3052 included on the computer-readable medium 3006 to implement one or more functions described herein.

The processor 3004 may include decoding circuitry 3043 configured to perform decoding-related operations as discussed herein. The decoding circuitry 3043 may include functionality for a means for decoding downlink information (e.g., decoding communication opportunities or sub-opportunities). The decoding circuitry 3043 may further be configured to execute decoding software 3053 included on the computer-readable medium 3006 to implement one or more functions described herein.

Figure 31:
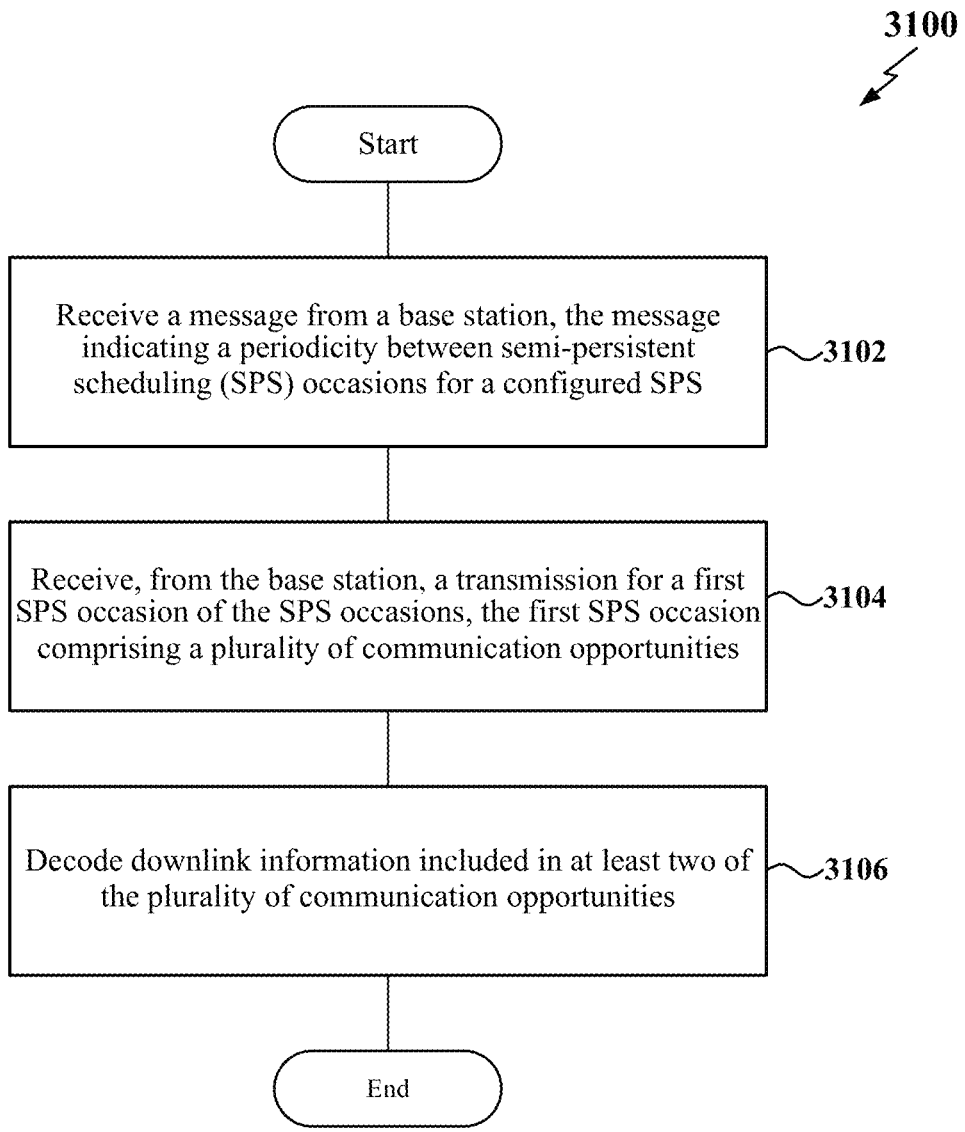
FIG. 31 is a flow chart illustrating an example wireless communication process for SPS communication according to some aspects of the disclosure.

FIG. 31 is a flow chart illustrating an example process 3100 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 3100 may be carried out by the wireless communication device 3000 illustrated in FIG. 30. In some aspects, the wireless communication device may be a user equipment. In some examples, the process 3100 may be carried out by any suitable apparatus or means for carrying out the functions or algorithm described below.

At block 3102, a wireless communication device may receive a message from a base station, the message indicating a periodicity between semi-persistent scheduling (SPS) occasions for a configured SPS. For example, the SPS processing circuitry 2942 in cooperation with the communication and processing circuitry 2941 and the transceiver 2910, shown and described above in connection with FIG. 29, may receive an RRC message from a base station, where the RRC message schedules an SPS.

At block 3104, the wireless communication device may receive, from the base station, a transmission for a first SPS occasion of the SPS occasions, the first SPS occasion including a plurality of communication opportunities. For example, the SPS processing circuitry 2942 in cooperation with the communication and processing circuitry 2941 and the transceiver 1310, shown and described above in connection with FIG. 30, may receive an SPS occasion (according to the SPS periodicity) from a base station, where the SPS occasion includes multiple communication opportunities.

At block 3106, the wireless communication device may decode downlink information included in at least two of the plurality of communication opportunities. For example, the decoding circuitry 2943, shown and described above in connection with FIG. 29, may decode an SPS occasion to recover information included in multiple communication opportunities of the SPS occasion.

In some examples, the downlink information may include first information in a first communication opportunity of the plurality of communication opportunities and second information in a second communication opportunity of the plurality of communication opportunities. The first communication opportunity may include a first communication sub-opportunity and the second communication opportunity may include a second communication sub-opportunity.

In some examples, the process may further include conducting a first hybrid automatic repeat request (HARQ) process for the first information and conducting a second HARQ process for the second information in the second communication opportunity. In some examples, the process may further include transmitting, to the base station, a physical uplink control channel (PUSCH) message that includes a first acknowledgement for the first information; and a second acknowledgement for the second information. In some aspects, the process may further include receiving a downlink control information (DCI) from the base station after transmitting the PUSCH message. The DCI may indicate at least one of a first resource for a retransmission of the first information; a second resource for a retransmission of the second information, or a combination thereof.

In some examples, the first information is for a first transport block and the second information is for a second transport block. In some examples, the first communication opportunity is two slots in length and the second communication opportunity is one slot in length. In some examples, the process may further include generating a first acknowledgement for the first information and generating a second acknowledgement for the second information.

In some examples, receiving, from the base station, the transmission for the first SPS occasion of the SPS occasions may include receiving the first information in the first communication opportunity on a first radio frequency (RF) band and receiving the second information in the second communication opportunity on a second RF band that is different from the first RF band. In some examples, receiving, from the base station, the transmission for the first SPS occasion of the SPS occasions may include receiving the first information in the first communication opportunity via a first (RF) beam and receiving the second information in the second communication opportunity on a second RF beam that is different from the first RF beam.

In some examples, the first communication opportunity and the second communication opportunity may include a plurality of communication sub-opportunities and decoding downlink information included in at least two of the plurality of communication opportunities may include decoding information included in at least two of the plurality of communication sub-opportunities. In some examples, the process may further include conducting a first hybrid automatic repeat request (HARQ) process for a first communication sub-opportunity of the plurality of communication sub-opportunities; and conducting a second HARQ process for a second communication sub-opportunity of the plurality of communication sub-opportunities. In some examples, receiving, from the base station, the transmission for the first SPS occasion of the SPS occasions may include receiving the first information in the first communication sub-opportunity on a first radio frequency (RF) band and receiving the second information in the second communication sub-opportunity on a second RF band that is different from the first RF band. In some examples, receiving, from the base station, the transmission for the first SPS occasion of the SPS occasions may include receiving the first information in the first communication sub-opportunity via a first (RF) beam and receiving the second information in the second communication sub-opportunity on a second RF beam that is different from the first RF beam.

In some examples, the process may further include receiving a downlink control information (DCI) from the base station. The DCI may indicate at least one of a start and length indicator (SLIV) for the plurality of communication opportunities, a frequency domain resource allocation (FDRA) for the plurality of communication opportunities, a time domain resource allocation (TDRA) for the plurality of communication opportunities, a modulation and coding scheme (MCS) for the plurality of communication opportunities, a transmission configuration indicator (TCI) for the plurality of communication opportunities, or any combination thereof.

In some examples, the process may further include receiving a downlink control information (DCI) from the base station. The DCI may indicate at least one of a first start and length indicator (SLIV) for the first communication opportunity and a second SLIV that is different from the first SLIV for the second communication opportunity, a first frequency domain resource allocation (FDRA) for the first communication opportunity and a second FDRA that is different from the first FDRA for the second communication opportunity, a first time domain resource allocation (TDRA) for the first communication opportunity and a second TDRA that is different from the first TDRA for the second communication opportunity, a first modulation and coding scheme (MCS) for the first communication opportunity and a second MCS that is different from the first MCS for the second communication opportunity, a first transmission configuration indicator (TCI) for the first communication opportunity and a second TCI that is different from the first TCI for the second communication opportunity, any combination thereof.

Figure 32:
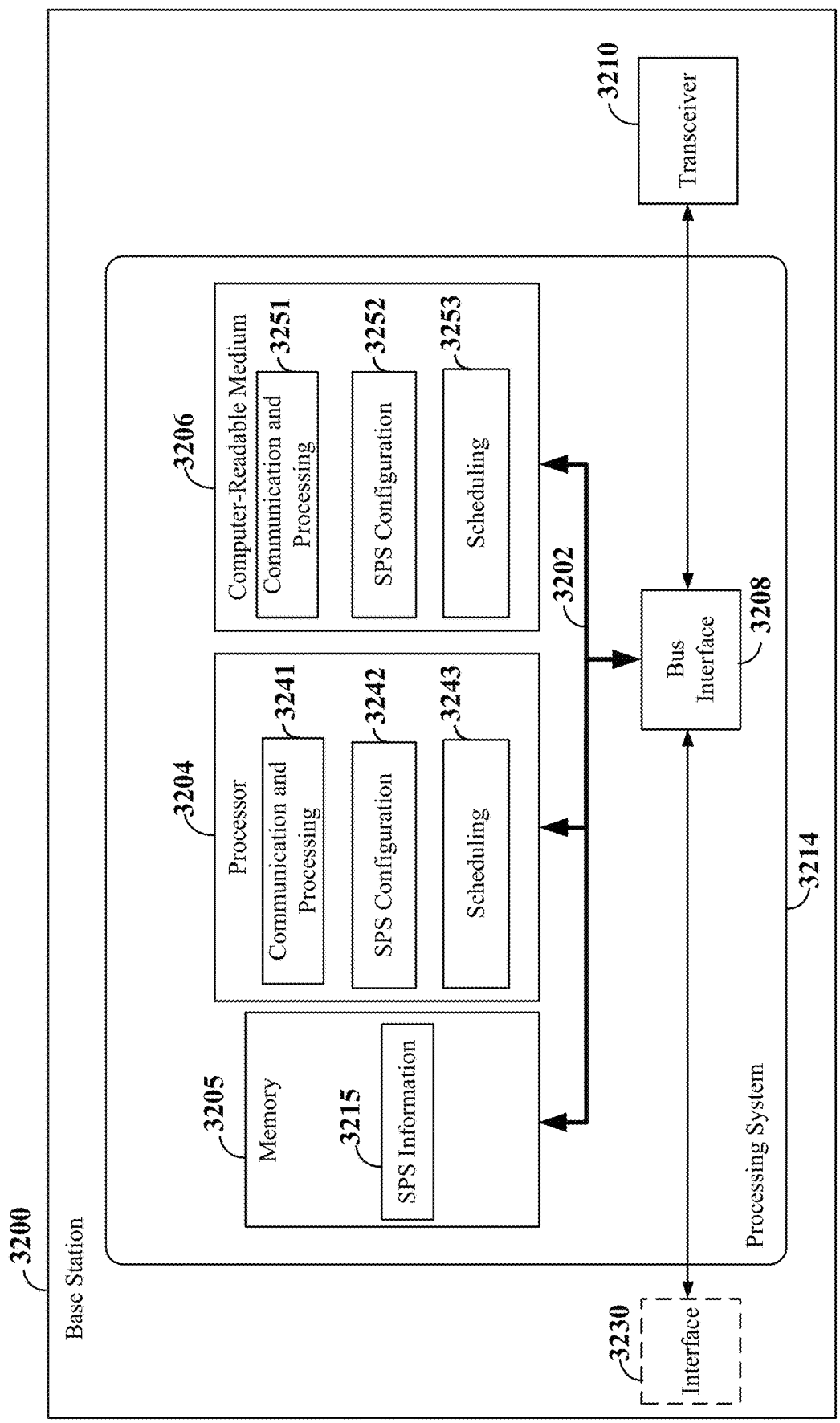
FIG. 32 is a block diagram conceptually illustrating an example of a hardware implementation for a base station employing a processing system according to some aspects of the disclosure.

FIG. 32 is a conceptual diagram illustrating an example of a hardware implementation for base station (BS) 3200 employing a processing system 3214. In accordance with various aspects of the disclosure, an element, or any portion of an element, or any combination of elements may be implemented with a processing system 3214 that includes one or more processors 3204. In some implementations, the BS 3200 may correspond to one or more of the scheduling entity 1808 (e.g., a gNB, a transmit receive point, a UE, etc.) of FIG. 18, the base station 1910, 1912, 1914, or 1918 of FIG. 19, or the BS 1204 of FIG. 29.

The processing system 3214 may be substantially the same as the processing system 3014 illustrated in FIG. 30, including a bus interface 3208, a bus 3202, memory 3205, a processor 3204, and a computer-readable medium 3206. Furthermore, the BS 3200 may include an interface 3230 (e.g., a network interface) that provides a means for communicating with at least one other apparatus within a core network and with at least one radio access network.

The BS 3200 may be configured to perform any one or more of the operations described herein (e.g., as described above in conjunction with FIGS. 18-29 and as described below in conjunction with FIG. 33). In some aspects of the disclosure, the processor 3204, as utilized in the BS 3200, may include circuitry configured for various functions.

In some aspects of the disclosure, the processor 3204 may include communication and processing circuitry 3241. The communication and processing circuitry 3241 may include one or more hardware components that provide the physical structure that performs various processes related to communication (e.g., signal reception and/or signal transmission) as described herein. The communication and processing circuitry 3241 may further include one or more hardware components that provide the physical structure that performs various processes related to signal processing (e.g., processing a received signal and/or processing a signal for transmission) as described herein. The communication and processing circuitry 3241 may further be configured to execute communication and processing software 3251 included on the computer-readable medium 3206 to implement one or more functions described herein.

In some implementations where the communication involves receiving information, the communication and processing circuitry 3241 may obtain information from a component of the BS 3200 (e.g., from the transceiver 3210 that receives the information via radio frequency signaling or some other type of signaling suitable for the applicable communication medium), process (e.g., decode) the information, and output the processed information. For example, the communication and processing circuitry 3241 may output the information to another component of the processor 3204, to the memory 3205, or to the bus interface 3208. In some examples, the communication and processing circuitry 3241 may receive one or more of signals, messages, other information, or any combination thereof. In some examples, the communication and processing circuitry 3241 may receive information via one or more channels. In some examples, the communication and processing circuitry 3241 may include functionality for a means for receiving.

In some implementations where the communication involves sending (e.g., transmitting) information, the communication and processing circuitry 3241 may obtain information (e.g., from another component of the processor 3204, the memory 3205, or the bus interface 3208), process (e.g., encode) the information, and output the processed information. For example, the communication and processing circuitry 3241 may output the information to the transceiver 3210 (e.g., that transmits the information via radio frequency signaling or some other type of signaling suitable for the applicable communication medium). In some examples, the communication and processing circuitry 3241 may send one or more of signals, messages, other information, or any combination thereof. In some examples, the communication and processing circuitry 3241 may send information via one or more channels. In some examples, the communication and processing circuitry 3241 may include functionality for a means for sending (e.g., means for transmitting).

The processor 3204 may include SPS configuration circuitry 3242 configured to perform SPS configuration-related operations as discussed herein (e.g., generating an SPS configuration and sending an RRC message indicating the SPS configuration). The SPS configuration circuitry 3242 may include functionality for a means for transmitting an message (e.g., an SPS configuration message and/or an SPS activation/deactivation message). The SPS configuration circuitry 3242 may further be configured to execute SPS configuration software 3252 included on the computer-readable medium 3206 to implement one or more functions described herein.

The processor 3204 may include scheduling circuitry 3243 configured to perform scheduling-related operations as discussed herein (e.g., sending a DCI that activates, deactivates, or reactivates SPS). The scheduling circuitry 3243 may include functionality for a means for transmitting a transmission (e.g., for an SPS occasion including a plurality of communication opportunities). The scheduling circuitry 3243 may further be configured to execute scheduling software 3253 included on the computer-readable medium 3206 to implement one or more functions described herein.

Figure 33:
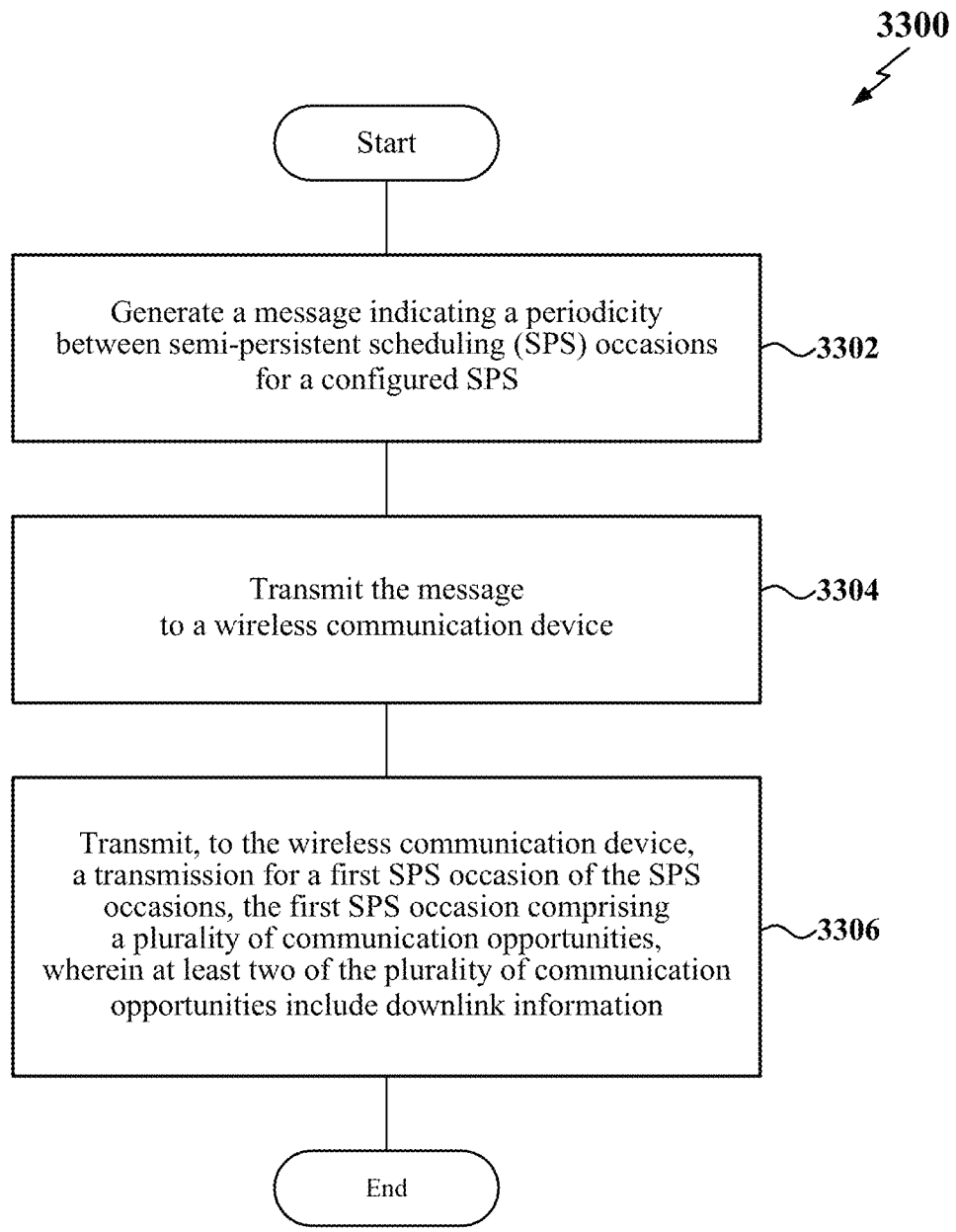
FIG. 33 is a flow chart illustrating an example wireless communication process for SPS communication according to some aspects of the disclosure.

FIG. 33 is a flow chart illustrating an example process 3300 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 3300 may be carried out by the base station 3200 illustrated in FIG. 32. In some examples, the process 3300 may be carried out by any suitable apparatus or means for carrying out the functions or algorithm described below.

At block 3302, a BS may generate a message indicating a periodicity between semi-persistent scheduling (SPS) occasions for a configured SPS. For example, the SPS configuration circuitry 1542, shown and described above in connection with FIG. 32, may generate an RRC message that schedules an SPS (e.g., for a cell and a BSP).

At block 3304, the BS may transmit the message to a wireless communication device. For example, the SPS configuration circuitry 3242 in cooperation with the communication and processing circuitry 1541 and the transceiver 3210, shown and described above in connection with FIG. 32, may broadcast, the RRC message, transmit the RRC message to the wireless communication device, or communicate the RRC message in some other way.

At block 3306, the BS may transmit, to the wireless communication device, a transmission for a first SPS occasion of the SPS occasions. The first SPS occasion may include a plurality of communication opportunities and at least two of the plurality of communication opportunities may include downlink information. For example, the scheduling circuitry 3243 in cooperation with the communication and processing circuitry 3241 and the transceiver 3210, shown and described above in connection with FIG. 32, may transmit an SPS occasion (according to the SPS periodicity), where the SPS occasion includes multiple communication opportunities.

In some examples, the downlink information may include first information in a first communication opportunity of the plurality of communication opportunities and second information in a second communication opportunity of the plurality of communication opportunities. The first communication opportunity may include a first communication sub-opportunity and the second communication opportunity may include a second communication sub-opportunity.

In some examples, the process may further include conducting a first hybrid automatic repeat request (HARQ) process for the first information and conducting a second HARQ process for the second information. In some examples, the process may further include receiving, from the wireless communication device, a physical uplink control channel (PUSCH) message that includes a first acknowledgement for the first information, and a second acknowledgement for the second information. In some examples, the process may further include, after receiving the PUSCH message, generating a composite a downlink control information (DCI) indicating a first resource for a first retransmission of the first information and second resource for a second retransmission of the second information and transmitting the DCI to the wireless communication device.

In some examples, the first information is for a first transport block and the second information is for a second transport block. In some examples, the first communication opportunity is two slots in length and the second communication opportunity is one slot in length. In some examples, the process may further include receiving, from the wireless communication device a first acknowledgement for the first information and a second acknowledgement for the second information.

In some examples, transmitting, to the wireless communication device, the transmission for the first SPS occasion of the SPS occasions may include transmitting the first information in the first communication opportunity on a first radio frequency (RF) band and transmitting the second information in the second communication opportunity on a second RF band that is different from the first RF band. In some examples, transmitting, to the wireless communication device, the transmission for the first SPS occasion of the SPS occasions may include transmitting the first information in the first communication opportunity via a first (RF) beam and transmitting the second information in the second communication opportunity on a second RF beam that is different from the first RF beam.

In some examples, the first communication opportunity and the second communication opportunity may include a plurality of communication sub-opportunities and transmitting, to the wireless communication device, the transmission for the first SPS occasion of the SPS occasions may include transmitting information in at least two of the plurality of communication sub-opportunities. In some examples, the process may further include conducting a first hybrid automatic repeat request (HARQ) process for a first communication sub-opportunity of the plurality of communication sub-opportunities and conducting a second HARQ process for a second communication sub-opportunity of the plurality of communication sub-opportunities. In some examples, transmitting, to the wireless communication device, the transmission for the first SPS occasion of the SPS occasions may include transmitting the first information in the first communication sub-opportunity on a first radio frequency (RF) band and transmitting the second information in the second communication sub-opportunity on a second RF band that is different from the first RF band. In some examples, transmitting, to the wireless communication device, the transmission for the first SPS occasion of the SPS occasions may include transmitting the first information in the first communication sub-opportunity via a first (RF) beam and transmitting the second information in the second communication sub-opportunity on a second RF beam that is different from the first RF beam.

In some examples, the process may further include transmitting a downlink control information (DCI) to the wireless communication device. The DCI may indicate at least one of a start and length indicator (SLIV) for the plurality of communication opportunities, a frequency domain resource allocation (FDRA) for the plurality of communication opportunities, a time domain resource allocation (TDRA) for the plurality of communication opportunities, a modulation and coding scheme (MCS) for the plurality of communication opportunities, a transmission configuration indicator (TCI) for the plurality of communication opportunities, or any combination thereof.

In some examples, the process may further include transmitting a downlink control information (DCI) to the wireless communication device. The DCI may indicate at least one of a first start and length indicator (SLIV) for the first communication opportunity and a second SLIV that is different from the first SLIV for the second communication opportunity, a first frequency domain resource allocation (FDRA) for the first communication opportunity and a second FDRA that is different from the first FDRA for the second communication opportunity, a first time domain resource allocation (TDRA) for the first communication opportunity and a second TDRA that is different from the first TDRA for the second communication opportunity, a first modulation and coding scheme (MCS) for the first communication opportunity and a second MCS that is different from the first MCS for the second communication opportunity, a first transmission configuration indicator (TCI) for the first communication opportunity and a second TCI that is different from the first TCI for the second communication opportunity, any combination thereof.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The following examples are illustrative only and aspects thereof may be combined with aspects of other embodiments or teaching described herein, without limitation.

Example 1 is a method of wireless communication at a UE, comprising: receiving a configuration for a plurality of SPS occasions each SPS occasion including multiple opportunities for a downlink transmission by a base station; and monitoring for the downlink transmission during one or more opportunity of an SPS occasion.

In Example 2, the method of Example 1 further includes that the plurality of SPS occasions are for a single SPS configuration.

In Example 3, the method of Example 1 or Example 2 further includes that the multiple opportunities of the SPS occasion are associated with a same HARQ process.

In Example 4, the method of any of Examples 1-3 further includes that each of the multiple opportunities corresponds to a slot starting from an offset for the SPS occasion.

In Example 5, the method of any of Examples 1-4 further includes that monitoring for the downlink transmission includes performing blind decoding for a PDSCH at each opportunity of the SPS occasion until the downlink transmission is successfully received.

In Example 6, the method of any of Examples 1-5 further includes that each of the multiple opportunities for the SPS occasion map to a single PUCCH resource for feedback, the method comprising: transmitting the feedback for each of the multiple opportunities for the SPS occasion in the single PUCCH resource.

In Example 7, the method of any of Examples 1-6 further includes that the feedback comprises HARQ feedback including at least one bit for each of the multiple opportunities for the SPS occasion.

In Example 8, the method of any of Examples 1-7 further includes receiving scheduling information for a retransmission in DCI indicating a HARQ process for the SPS occasion as an index for the retransmission.

In Example 9, the method of any of Examples 1-8 further includes performing HARQ combination of the retransmission with an opportunity of the SPS occasion having a highest detection metric.

In Example 10, the method of any of Examples 1-9 further includes that the DCI scheduling the retransmission further includes a time domain resource allocation for the retransmission, the method further comprising: determining an opportunity of the SPS occasion for HARQ combination with the retransmission based on the time domain resource allocation for the retransmission.

In Example 11, the method of any of Examples 1-10 further includes transmitting HARQ feedback having a shared bit for the multiple opportunities of the SPS occasion.

In Example 12, the method of any of Examples 1-11 further includes entering a sleep state between successfully receiving the downlink transmission in an opportunity of the SPS occasion and transmitting HARQ feedback or following transmitting the HARQ feedback.

In Example 13, the method of any of Examples 1-12 further includes receiving scheduling for individual PUCCH resources for each of the multiple opportunities of the SPS occasion.

In Example 14, the method of any of Examples 1-13 further includes that the individual PUCCH resources are limited to use for positive acknowledgments.

In Example 15, the method of any of Examples 1-14 further includes transmitting an ACK in an individual PUCCH resource, if the downlink transmission is successfully received; and refraining from sending feedback if the downlink transmission is not successfully received in any of the multiple opportunities of the SPS occasion.

In Example 16, the method of any of Examples 1-15 further includes that the individual PUCCH resources are limited to positive ACKs for an opportunity of the SPS occasion; and transmitting a NACK multiplexed with a PUSCH and corresponding to the opportunity of the SPS occasion.

In Example 17, the method of any of Examples 1-16 further includes that the SPS occasion comprises s opportunities, s being an integer number, the method further comprising: receiving scheduling for s−1 individual PUCCH resources for individual opportunities of the SPS occasion, wherein the individual PUCCH resources are limited to use for positive acknowledgments; and receiving scheduling for a last PUCCH resource following the SPS occasion for an ACK or a NACK.

In Example 18, the method of any of Examples 1-17 further includes that the last PUCCH resource comprises a different time, a different frequency, or a different format than the individual PUCCH resources.

In Example 19, the method of any of Examples 1-18 further includes transmitting a single ACK to the base station in an individual PUCCH resource or the last PUCCH resource if the downlink transmission is successfully received; and transmitting the NACK to the base station in the last PUCCH resource is the downlink transmission is not successfully received.

In Example 20, the method of any of Examples 1-19 further includes transmitting the ACK to the base station in an individual PUCCH resource and the last PUCCH resource if the downlink transmission is successfully received; and transmitting the NACK in the last PUCCH resource if the downlink transmission is not successfully received in the SPS occasion.

In Example 21, the method of any of Examples 1-20 further includes receiving scheduling for individual PUCCH resources that are limited to ACKs for each of the multiple opportunities of the SPS occasion and for an additional PUCCH resource following a last opportunity of the SPS occasion for an ACK or a NACK.

In Example 22, the method of any of Examples 1-21 further includes transmitting the ACK to the base station in an individual PUCCH resource and the additional PUCCH resource if the downlink transmission is successfully received; and transmitting the NACK in the additional PUCCH resource if the downlink transmission is not successfully received in the SPS occasion.

Example 23 is a device including one or more processors and one or more memories in electronic communication with the one or more processors storing instructions executable by the one or more processors to cause the device to implement a method as in any of Examples 1-22.

Example 24 is a system or apparatus including means for implementing a method or realizing an apparatus as in any of Examples 1-22.

Example 25 is a non-transitory computer readable medium storing instructions executable by one or more processors to cause the one or more processors to implement a method as in any of Examples 1-22.

Example 26 is a method of wireless communication at a base station, comprising: configuring a UE for a plurality of SPS occasions, each SPS occasion including multiple opportunities for downlink transmission by the base station; and transmitting a packet to the UE in an opportunity of an SPS occasion based on an arrival time of the packet.

In Example 27, the method of Example 26 further includes that the plurality of SPS occasions are for a single SPS configuration.

In Example 28, the method of Example 26 or Example 27 further includes that the multiple opportunities of the SPS occasion are associated with a same HARQ process.

In Example 29, the method of any of Examples 26-28 further includes that the base station transmits the packet to the UE in a single opportunity from the multiple opportunities of the SPS occasion.

In Example 30, the method of any of Examples 26-29 further includes that each of the multiple opportunities corresponds to a slot starting from an offset for the SPS occasion.

In Example 31, the method of any of Examples 26-30 further includes that each of the multiple opportunities for the SPS occasion map to a single PUCCH resource for feedback.

In Example 32, the method of any of Examples 26-31 further includes receiving HARQ feedback having at least one bit for each of the multiple opportunities for the SPS occasion.

In Example 33, the method of any of Examples 26-32 further includes scheduling a retransmission in DCI indicating a HARQ process for the SPS occasion as an index for the retransmission.

In Example 34, the method of any of Examples 26-33 further includes that the DCI scheduling the retransmission further includes a time domain resource allocation for the retransmission that indicates the opportunity of the SPS occasion for the UE to use for a HARQ combination with the retransmission.

In Example 35, the method of any of Examples 26-34 further includes receiving HARQ feedback having a shared bit for the multiple opportunities of the SPS occasion.

In Example 36, the method of any of Examples 26-35 further includes scheduling individual PUCCH resources for each of the multiple opportunities of the SPS occasion.

In Example 37, the method of any of Examples 26-36 further includes that the individual PUCCH resources are limited to use for positive acknowledgments.

In Example 38, the method of any of Examples 26-37 further includes receiving an ACK in an individual PUCCH resource, if the downlink transmission is successfully received; and scheduling a retransmission of the packet if a positive acknowledgment is not received in any of the individual PUCCH resources.

In Example 39, the method of any of Examples 26-38 further includes that the SPS occasion comprises s opportunities, s being an integer number, the method further comprising: scheduling s−1 individual PUCCH resources for individual opportunities of the SPS occasion, wherein the individual PUCCH resources are limited to use for positive acknowledgments; and scheduling a last PUCCH resource following the SPS occasion for an ACK or a NACK Example 40 is a device including one or more processors and one or more memories in electronic communication with the one or more processors storing instructions executable by the one or more processors to cause the device to implement a method as in any of Examples 26-39.

Example 41 is a system or apparatus including means for implementing a method or realizing an apparatus as in any of Examples 26-39.

Example 42 is a non-transitory computer readable medium storing instructions executable by one or more processors to cause the one or more processors to implement a method as in any of Examples 26-39.

Example 43 is a method of communication at a wireless communication device, the method comprising: receiving a message from a base station, the message indicating a periodicity between semi-persistent scheduling (SPS) occasions for a configured SPS; receiving, from the base station, a transmission for a first SPS occasion of the SPS occasions, the first SPS occasion comprising a plurality of communication opportunities; and decoding downlink information included in at least two of the plurality of communication opportunities.

In Example 44, the method of Example 43 includes that the downlink information comprises: first information in a first communication opportunity of the plurality of communication opportunities; and second information in a second communication opportunity of the plurality of communication opportunities.

In Example 45, the method of any of Examples 43 and 44 includes conducting a first hybrid automatic repeat request (HARQ) process for the first information; and conducting a second HARQ process for the second information in the second communication opportunity.

In Example 46, the method any of Examples 43-45 includes further comprising transmitting, to the base station, a physical uplink control channel (PUSCH) message comprising a first acknowledgement for the first information; and a second acknowledgement for the second information.

In Example 47, the method any of Examples 43-46 includes receiving a downlink control information (DCI) from the base station after transmitting the PUSCH message, the DCI indicating at least one of a first resource for a retransmission of the first information; a second resource for a retransmission of the second information; or a combination thereof.

In Example 48, the method of any of Examples 43-47 includes that the first information is for a first transport block, and the second information is for a second transport block.

In Example 49, the method of any of Examples 43-48 includes that the first communication opportunity is two slots in length; and the second communication opportunity is one slot in length.

In Example 50, the method of any of Examples 43-49 includes generating a first acknowledgement for the first information, and generating a second acknowledgement for the second information.

In Example 51, the method of any of Examples 43-50 includes that receiving, from the base station, the transmission for the first SPS occasion of the SPS occasions comprises receiving the first information in the first communication opportunity on a first radio frequency (RF) band, and receiving the second information in the second communication opportunity on a second RF band that is different from the first RF band.

In Example 52, the method of any of Examples 43-51 includes that receiving, from the base station, the transmission for the first SPS occasion of the SPS occasions comprises receiving the first information in the first communication opportunity via a first (RF) beam; and receiving the second information in the second communication opportunity on a second RF beam that is different from the first RF beam.

In Example 53, the method of any of Examples 43-52 includes that the first communication opportunity and the second communication opportunity comprise a plurality of communication sub-opportunities, and decoding the downlink information included in at least two of the plurality of communication opportunities comprises decoding information included in at least two of the plurality of communication sub-opportunities.

In Example 54, the method of any of Examples 43-53 includes that the first communication opportunity and the second communication opportunity comprise a plurality of communication sub-opportunities, the method further comprising conducting a first hybrid automatic repeat request (HARQ) process for a first communication sub-opportunity of the plurality of communication sub-opportunities; and conducting a second HARQ process for a second communication sub-opportunity of the plurality of communication sub-opportunities.

In Example 55, the method of any of Examples 43-54 includes that the first communication opportunity comprises a first communication sub-opportunity, the second communication opportunity comprises a second communication sub-opportunity, receiving, from the base station, the transmission for the first SPS occasion of the SPS occasions comprises: receiving the first information in the first communication sub-opportunity on a first radio frequency (RF) band; and receiving the second information in the second communication sub-opportunity on a second RF band that is different from the first RF band.

In Example 56, the method of any of Examples 43-55 includes that the first communication opportunity comprises a first communication sub-opportunity, the second communication opportunity comprises a second communication sub-opportunity, and receiving, from the base station, the transmission for the first SPS occasion of the SPS occasions comprises: receiving the first information in the first communication sub-opportunity via a first (RF) beam; and receiving the second information in the second communication sub-opportunity on a second RF beam that is different from the first RF beam.

In Example 57, the method of any of Examples 43-56 includes that a downlink control information (DCI) from the base station, the DCI indicating at least one of a first start and length indicator (SLIV) for the first communication opportunity and a second SLIV that is different from the first SLIV for the second communication opportunity; a first frequency domain resource allocation (FDRA) for the first communication opportunity and a second FDRA that is different from the first FDRA for the second communication opportunity; a first time domain resource allocation (TDRA) for the first communication opportunity and a second TDRA that is different from the first TDRA for the second communication opportunity; a first modulation and coding scheme (MCS) for the first communication opportunity and a second MCS that is different from the first MCS for the second communication opportunity; a first transmission configuration indicator (TCI) for the first communication opportunity and a second TCI that is different from the first TCI for the second communication opportunity, or any combination thereof.

In Example 58, the method of any of Examples 43-57 includes further comprising receiving a downlink control information (DCI) from the base station, the DCI indicating at least one of a start and length indicator (SLIV) for the plurality of communication opportunities, a frequency domain resource allocation (FDRA) for the plurality of communication opportunities, a time domain resource allocation (TDRA) for the plurality of communication opportunities, a modulation and coding scheme (MCS) for the plurality of communication opportunities, a transmission configuration indicator (TCI) for the plurality of communication opportunities, or any combination thereof.

Example 59 is a wireless communication device including a transceiver, a memory, and a processor communicatively coupled to the transceiver and memory, wherein the processor and the memory are configured to cause the device to implement a method as in any of Examples 43-58.

Example 60 is a wireless communication device, including means for receiving a message from a base station, the message indicating a periodicity between semi-persistent scheduling (SPS) occasions for a configured SPS, wherein the means for receiving is further configured to receive a transmission for a first SPS occasion of the SPS occasions, the first SPS occasion comprising a plurality of communication opportunities, and means for decoding downlink information included in at least two of the plurality of communication opportunities, In Example 61, the means for receiving and/or the means for decoding are configured to perform any of the functions identified in any of Examples 43-58.

Example 62 is an article of manufacture for use by a wireless communication device in a wireless communication network, the article comprising a computer-readable medium having stored therein instructions executable by one or more processors of the wireless communication device to perform any of the methods identified in any of Examples 43-58.

Example 63 is a method of wireless communication at a base station, the method comprising generating a message indicating a periodicity between semi-persistent scheduling (SPS) occasions for a configured SPS, transmitting the message to a wireless communication device, and transmitting, to the wireless communication device, a transmission for a first SPS occasion of the SPS occasions, the first SPS occasion comprising a plurality of communication opportunities, wherein at least two of the plurality of communication opportunities include downlink information.

In Example 64, the method of Example 63 includes that the downlink information comprises first information in a first communication opportunity of the plurality of communication opportunities, and second information in a second communication opportunity of the plurality of communication opportunities.

In Example 65, the method of any of Examples 63 and 64 includes conducting a first hybrid automatic repeat request (HARQ) process for the first information, and conducting a second HARQ process for the second information.

In Example 66, the method of any of Examples 63-65 includes receiving, from the wireless communication device, a physical uplink control channel (PUSCH) message comprising a first acknowledgement for the first information, and a second acknowledgement for the second information.

In Example 67, the method of any of Examples 63-66 includes, after receiving the PUSCH message, generating a composite a downlink control information (DCI) indicating a first resource for a first retransmission of the first information and second resource for a second retransmission of the second information, and transmitting the DCI to the wireless communication device.

In Example 68, the method of any of Examples 63-67 includes that the first information is for a first transport block; and the second information is for a second transport block.

In Example 69, the method of any of Examples 63-68 includes that the first communication opportunity is two slots in length, and the second communication opportunity is one slot in length.

In Example 70, the method of any of Examples 63-69 includes further comprising receiving, from the wireless communication device, a first acknowledgement for the first information, and a second acknowledgement for the second information.

In Example 71, the method of any of Examples 63-70 includes that the transmission for the first SPS occasion of the SPS occasions comprises, transmitting the first information in the first communication opportunity on a first radio frequency (RF) band, and transmitting the second information in the second communication opportunity on a second RF band that is different from the first RF band.

In Example 72, the method of any of Examples 63-71 includes that transmitting, to the wireless communication device, the transmission for the first SPS occasion of the SPS occasions comprises transmitting the first information in the first communication opportunity via a first (RF) beam, and transmitting the second information in the second communication opportunity on a second RF beam that is different from the first RF beam.

In Example 73, the method of any of Examples 63-72 includes that the first communication opportunity and the second communication opportunity comprise a plurality of communication sub-opportunities, and transmitting, to the wireless communication device, the transmission for the first SPS occasion of the SPS occasions comprises transmitting information in at least two of the plurality of communication sub-opportunities.

In Example 74, the method of any of Examples 63-73 includes that the first communication opportunity and the second communication opportunity comprise a plurality of communication sub-opportunities, the method further comprising conducting a first hybrid automatic repeat request (HARQ) process for a first communication sub-opportunity of the plurality of communication sub-opportunities, and conducting a second HARQ process for a second communication sub-opportunity of the plurality of communication sub-opportunities.

In Example 75, the method of any of Examples 63-74 includes that the first communication opportunity comprises a first communication sub-opportunity, the second communication opportunity comprises a second communication sub-opportunity, and transmitting, to the wireless communication device, the transmission for the first SPS occasion of the SPS occasions comprises: transmitting the first information in the first communication sub-opportunity on a first radio frequency (RF) band; and transmitting the second information in the second communication sub-opportunity on a second RF band that is different from the first RF band.

In Example 76, the method of any of Examples 63-75 includes that the first communication opportunity comprises a first communication sub-opportunity, the second communication opportunity comprises a second communication sub-opportunity, and transmitting, to the wireless communication device, the transmission for the first SPS occasion of the SPS occasions comprises: transmitting the first information in the first communication sub-opportunity via a first (RF) beam; and transmitting the second information in the second communication sub-opportunity on a second RF beam that is different from the first RF beam.

In Example 77, the method of any of Examples 63-76 includes transmitting a downlink control information (DCI) to the wireless communication device, the DCI indicating at least one of a first start and length indicator (SLIV) for the first communication opportunity and a second SLIV that is different from the first SLIV for the second communication opportunity, a first frequency domain resource allocation (FDRA) for the first communication opportunity and a second FDRA that is different from the first FDRA for the second communication opportunity, a first time domain resource allocation (TDRA) for the first communication opportunity and a second TDRA that is different from the first TDRA for the second communication opportunity, a first modulation and coding scheme (MCS) for the first communication opportunity and a second MCS that is different from the first MCS for the second communication opportunity, a first transmission configuration indicator (TCI) for the first communication opportunity and a second TCI that is different from the first TCI for the second communication opportunity, or any combination thereof.

In Example 78, the method of any of Examples 63-77 includes transmitting a downlink control information (DCI) to the wireless communication device, the DCI indicating at least one of a start and length indicator (SLIV) for the plurality of communication opportunities, a frequency domain resource allocation (FDRA) for the plurality of communication opportunities, a time domain resource allocation (TDRA) for the plurality of communication opportunities, a modulation and coding scheme (MCS) for the plurality of communication opportunities, a transmission configuration indicator (TCI) for the plurality of communication opportunities, or any combination thereof.

Example 79 is a base station including a transceiver, a memory, and at least one processor communicatively coupled to the transceiver and memory, wherein the processor and the memory are configured to perform any of the steps of Examples 64-78.

Example 80 is a base station including means for generating a message indicating a periodicity between semi-persistent scheduling (SPS) occasions for a configured SPS; and means for transmitting the message to a wireless communication device, wherein the means for transmitting is further for transmitting a transmission for a first SPS occasion of the SPS occasions, the first SPS occasion comprising a plurality of communication opportunities, wherein at least two of the plurality of communication opportunities include downlink information.

Example 81 is the base station of Example 74 including that the means for generating and/or the means for transmitting are configured to perform any of the functions of Examples 64-78.

Example 82 is an article of manufacture for use by a base station in a wireless communication network, the article including a computer-readable medium having stored instructions executable by one or more processors of the base station to perform any of the functions of Examples 64-78.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A user equipment (UE), comprising:
    one or more transceivers;
    one or more memories, individually or in combination, having instructions; and
    one or more processors, individually or in combination, configured to execute the instructions and cause the UE to:
        receive, via the one or more transceivers, a configuration associated with a plurality of semi-persistent scheduling (SPS) occasions, with each SPS occasion including multiple opportunities associated with downlink transmission, wherein the plurality of SPS occasions include a first SPS occasion, and wherein the first SPS occasion includes a first set of multiple opportunities associated with downlink transmission;
        receive, via the one or more transceivers, a first downlink transmission during one or more opportunities of the first set of multiple opportunities; and
        transmit, via the one or more transceiver after receiving the first downlink transmission, a hybrid automatic repeat request (HARQ) feedback via an uplink resource, wherein the uplink resource is a same resource associated with each opportunity of the first set of multiple opportunities.

2. The UE of claim 1, wherein the configuration comprises an indication of an offset time associated with a first opportunity of the first set of multiple opportunities, wherein the offset time is indicative of a slot start time relative to a scheduled arrival time of the first downlink transmission.

3. The UE of claim 2, wherein the slot start time occurs prior to the scheduled arrival time of the first downlink transmission.

4. The UE of claim 1, wherein the first downlink transmission is received via blind decoding each opportunity of the first set of multiple opportunities until the first downlink transmission is successfully received.

5. The UE of claim 1, wherein each of the first set of multiple opportunities associated with the first SPS occasion map to the same uplink resource associated with the HARQ feedback associated with the first downlink transmission.

6. The UE of claim 5, wherein the HARQ feedback comprises one bit associated with each opportunity of the first set of multiple opportunities.

7. The UE of claim 1, wherein the one or more processors, individually or in combination, are further configured to:

receive, via the one or more transceivers, a downlink control information (DCI) comprising scheduling information associated with a retransmission and an index configured to indicate a HARQ identifier associated with a second SPS occasion for the retransmission.

8. The UE of claim 7, wherein the one or more processors, individually or in combination, are further configured to:

perform HARQ combination of the retransmission with an opportunity of the second SPS occasion having a highest detection metric.

9. A base station, comprising:

one or more transceivers;

one or more memories, individually or in combination, having instructions; and one or more processors, individually or in combination, configured to execute the instructions and cause the base station to:

transmit, via the one or more transceivers, a configuration associated with a plurality of semi-persistent scheduling (SPS) occasions including a first SPS occasion, with each SPS occasion including multiple opportunities associated with downlink transmission, wherein the first SPS occasion includes a first set of multiple opportunities associated with downlink transmission;

transmit, via the one or more transceivers, a first downlink transmission during one or more opportunities of the first set of multiple opportunities associated with the first SPS occasion based on an arrival time of the first downlink transmission; and receive, via the one or more transceivers after the first downlink transmission, a hybrid automatic repeat request (HARQ) feedback via an uplink resource, wherein the uplink resource is a same resource associated with each opportunity of the first set of multiple opportunities.

10. The base station of claim 9, wherein the configuration comprises an indication of an offset time associated with a first opportunity of the first set of multiple opportunities, wherein the offset time is indicative of a slot start time relative to a scheduled arrival time of the first downlink transmission.

11. The base station of claim 9, wherein each of the first set of multiple opportunities associated with the first SPS occasion map to the same uplink resource associated with the HARQ feedback of the first downlink transmission.

12. A user equipment (UE), comprising:

one or more transceivers;

one or more memories, individually or in combination, having instructions; and one or more processors, individually or in combination, configured to execute the instructions and cause the UE to:

receive, via the one or more transceivers, a message indicating a periodicity between multiple semi-persistent scheduling (SPS) occasions associated with a configured SPS;

receive, via the one or more transceivers and according to the periodicity, downlink information during a first SPS occasion of the multiple SPS occasions and via at least two of a plurality of communication opportunities, wherein the first SPS occasion comprises the plurality of communication opportunities; and decode the downlink information.

13. The UE of claim 5, wherein the downlink information comprises:

first information in a first communication opportunity of the plurality of communication opportunities; and second information in a second communication opportunity of the plurality of communication opportunities.

14. The UE of claim 13, wherein the one or more processors, individually or in combination, are further configured to:

conduct a first hybrid automatic repeat request (HARQ) process associated with the first information; and conduct a second HARQ process associated with the second information in the second communication opportunity.

15. The UE of claim 13, wherein the one or more processors, individually or in combination, are further configured to transmit, a physical uplink control channel (PUSCH) message comprising:

a first acknowledgement associated with the first information; and a second acknowledgement associated with the second information.

16. The UE of claim 15, wherein the one or more processors, individually or in combination, are further configured to receive, via the one or more transceivers, a downlink control information (DCI) after transmitting the PUSCH message, the DCI indicating at least one of:

a first resource associated with a retransmission of the first information; or a second resource associated with a retransmission of the second information.

17. The UE of claim 13, wherein:

the first information is associated with a first transport block; and the second information is associated with a second transport block.

18. The UE of claim 13, wherein:

the first communication opportunity is two slots in length; and the second communication opportunity is one slot in length.

19. The UE of claim 13, wherein the is one or more processors, individually or in combination, are further configured to:

generate a first acknowledgement associated with the first information; and generate a second acknowledgement associated with the second information.

20. The UE of claim 13, wherein the one or more processors, individually or in combination, are further configured to:

receive, via the one or more transceivers, the first information in the first communication opportunity via a first radio frequency (RF) band; and receive, via the one or more transceivers, the second information in the second communication opportunity via a second RF band that is different from the first RF band.

21. A base station, comprising:

one or more transceivers;

one or more memories, individually or in combination, having instructions; and one or more processors, individually or in combination, configured to execute the instructions and cause the base station to:

generate a message indicating a periodicity between multiple semi-persistent scheduling (SPS) occasions associated with a configured SPS;

transmit the message via the one or more transceivers; and transmit, via the one or more transceivers according to the periodicity, a downlink transmission during a first SPS occasion of the multiple SPS occasions, the first SPS occasion comprising a plurality of communication opportunities, wherein the downlink transmission occupies at least two of the plurality of communication opportunities.

22. The base station of claim 21, wherein the downlink transmission comprises:

first information in a first communication opportunity of the plurality of communication opportunities; and second information in a second communication opportunity of the plurality of communication opportunities.

23. The base station of claim 22, wherein the one or more processors, individually or in combination, are further configured to:

conduct a first hybrid automatic repeat request (HARQ) process associated with the first information; and conduct a second HARQ process associated with the second information.

24. The base station of claim 22, wherein the one or more processors, individually or in combination, are further configured to receive, via the one or more transceivers, a physical uplink control channel (PUSCH) message comprising:

a first acknowledgement associated with the first information; and a second acknowledgement associated with the second information.

25. The base station of claim 24, wherein the one or more processors, individually or in combination, are further configured to, after receiving the PUSCH message:

generate composite downlink control information (DCI) indicating a first resource associated with a first retransmission of the first information and second resource associated with a second retransmission of the second information; and transmit the DCI.

26. The base station of claim 22, wherein:

the first information is associated with a first transport block; and the second information is associated with a second transport block.

* * * * *